US007859700B2

(12) United States Patent
Ito

(10) Patent No.: US 7,859,700 B2
(45) Date of Patent: Dec. 28, 2010

(54) IMAGE FORMING APPARATUS ASSOCIATING WITH OTHER APPARATUSES THROUGH NETWORK

(75) Inventor: Tatsuo Ito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 12/035,131

(22) Filed: Feb. 21, 2008

(65) Prior Publication Data

US 2008/0151301 A1  Jun. 26, 2008

(30) Foreign Application Priority Data

| Aug. 20, 2001 | (JP) | ............................. 2001-249279 |
| Nov. 9, 2001 | (JP) | ............................. 2001-344977 |
| Aug. 14, 2002 | (JP) | ............................. 2002-236657 |
| Aug. 14, 2002 | (JP) | ............................. 2002-236658 |
| Aug. 14, 2002 | (JP) | ............................. 2002-236659 |
| Aug. 14, 2002 | (JP) | ............................. 2002-236660 |

(51) Int. Cl.
*G06F 3/12* (2006.01)

(52) U.S. Cl. ....................... 358/1.15; 358/1.9; 358/409; 715/733; 715/735

(58) Field of Classification Search ....... 358/1.11–1.16, 358/1.9, 409, 448, 1.2; 715/733, 735
See application file for complete search history.

(56) References Cited

U.S. PATENT DOCUMENTS

| 5,418,889 | A | | 5/1995 | Ito |
| 5,727,135 | A | | 3/1998 | Webb et al. |
| 5,802,259 | A | | 9/1998 | Sugai |
| 5,805,777 | A | * | 9/1998 | Kuchta ....................... 358/1.13 |
| 5,933,582 | A | | 8/1999 | Yamada |
| 6,426,798 | B1 | * | 7/2002 | Yeung ....................... 358/1.13 |
| 6,452,695 | B1 | * | 9/2002 | Casey et al. .................. 358/1.6 |
| 6,614,546 | B1 | * | 9/2003 | Kurozasa ................... 358/1.15 |
| 6,665,573 | B1 | | 12/2003 | Blackman |
| 6,782,402 | B1 | * | 8/2004 | Hidaka et al. ...................... 1/1 |
| 6,912,059 | B1 | * | 6/2005 | Takahashi .................. 358/1.15 |
| 2003/0208691 | A1 | * | 11/2003 | Smart et al. ................. 713/201 |

FOREIGN PATENT DOCUMENTS

| EP | 0 689 157 | 12/1995 |
| EP | 0 853 301 | 7/1998 |
| EP | 0 886 206 | 12/1998 |
| EP | 0 915 414 | 5/1999 |
| EP | 0 965 908 A2 | 12/1999 |
| JP | 5-122424 | 5/1993 |
| JP | 7-44474 | 2/1995 |
| JP | 8-115193 | 5/1996 |

(Continued)

*Primary Examiner*—Chan S Park
(74) *Attorney, Agent, or Firm*—Oblon, Spivak, McClelland, Maier & Neustadt, L.L.P.

(57) ABSTRACT

In an image forming apparatus, screen information for displaying a plurality of function options available for a predetermined process is generated. A screen generating program and option information showing the plurality of function options is transmitted in response to an request from an apparatus that is connected through a network and the user uses. The predetermined process is conducted by using a hardware resource when receiving the setting parameter indicating the function option set by the user from the plurality of the function options that the apparatus displays by executing said screen generating program, from the apparatus.

12 Claims, 48 Drawing Sheets

FOREIGN PATENT DOCUMENTS

| | | |
|---|---|---|
| JP | 8-186670 | 7/1996 |
| JP | 8-293955 | 11/1996 |
| JP | 8-329005 | 12/1996 |
| JP | 9-311838 | 12/1997 |
| JP | 10-49472 | 2/1998 |
| JP | 11-31051 | 2/1999 |
| JP | 11-234468 | 8/1999 |
| JP | 2000-6496 | 1/2000 |
| JP | 2000-10747 | 1/2000 |
| JP | 2000-174964 | 6/2000 |
| JP | 2001-186301 | 7/2001 |
| WO | WO 01/20472 | 3/2001 |

\* cited by examiner

FIG.4

| | DISPLAY PROCESS | INPUT PROCESS | IMAGE PROCESS | OUTPUT PROCESS |
|---|---|---|---|---|
| PROCESS PATTERN 1 | SF-APPARATUS | SF-APPARATUS | MF-APPARATUS | SF-APPARATUS |
| PROCESS PATTERN 2 | SF-APPARATUS | MF-APPARATUS | MF-APPARATUS OR SF-APPARATUS | MF-APPARATUS |
| PROCESS PATTERN 3 | SF-APPARATUS | SF-APPARATUS | MF-APPARATUS OR SF-APPARATUS | MF-APPARATUS |
| PROCESS PATTERN 4 | SF-APPARATUS | MF-APPARATUS | MF-APPARATUS OR SF-APPARATUS | SF-APPARATUS |

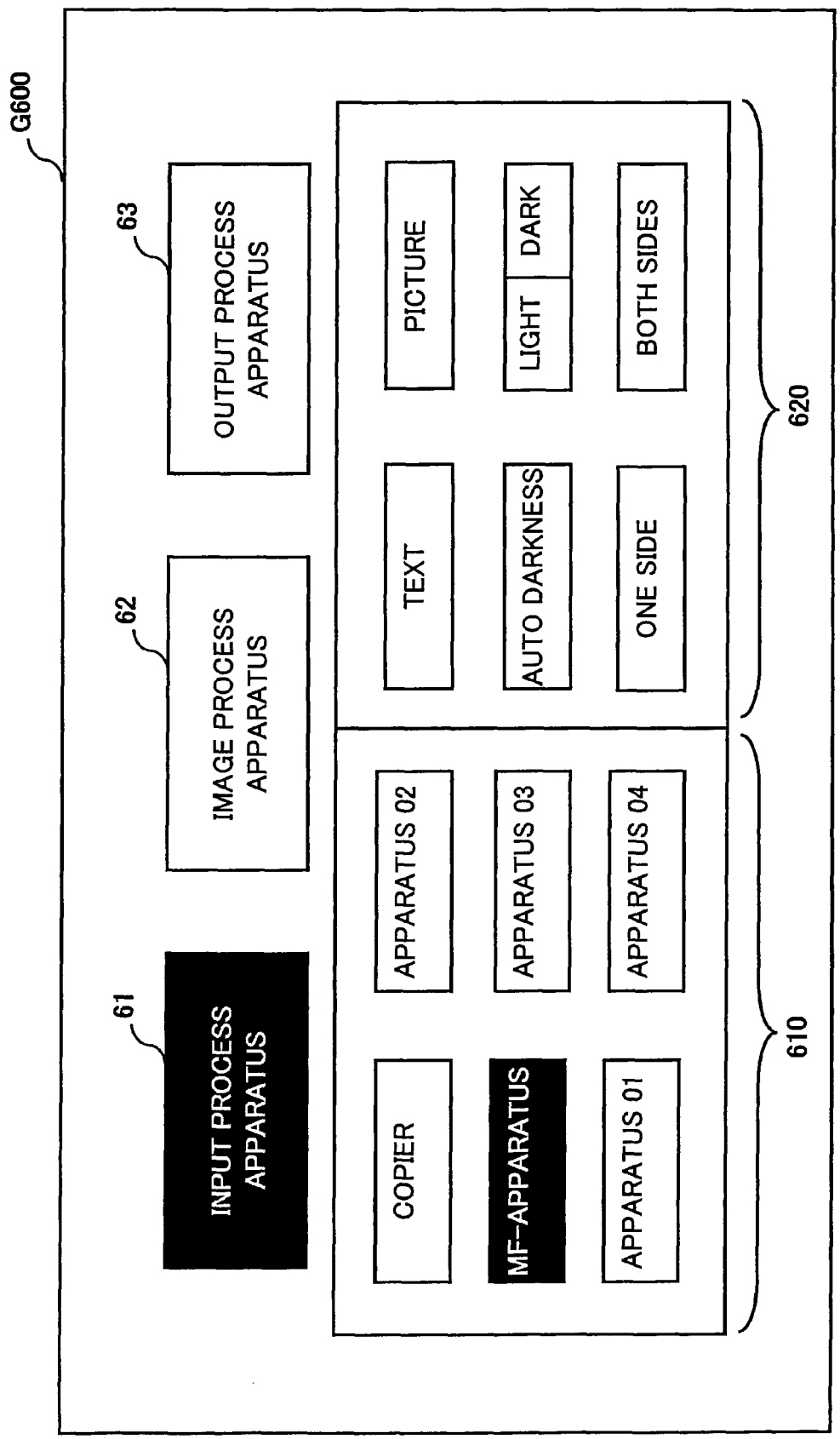

IMAGE FORMING APPARATUS ASSOCIATING WITH OTHER APPARATUSES THROUGH NETWORK

This present application is a Divisional Application of Ser. No. 10/223,427, filed Aug. 20, 2002 now U.S. Pat. No. 7,359,074, which claims the benefit of priority from the prior Japanese Patent Application Nos. 2001-249279 filed Aug. 20, 2001; 2001-344977 filed Nov. 9, 2001; 2002-236657 filed Aug. 14, 2002; 2002-236658 filed Aug. 14, 2002; 2002-236659 filed Aug. 14, 2002; and 2002-236660 filed Aug. 14, 2002, entire contents of which are hereby incorporated by reference.

BACKGROUND OF THE INVENTION

1. Field of the Invention

The present invention generally relates to apparatuses for forming an image and methods thereof, and more particularly to an apparatus for forming an image associating with other apparatuses through a network and a method thereof, in which an image input/output apparatus, such as a copier, a facsimile or a like connected through the network to each other, for inputting and outputting an image, an image outputting apparatus such as a printer for outputting an image, an image storing apparatus such as a file server, various databases or a like, or an image processing apparatus or an image input/output apparatus for sending image data to the other image processing apparatus which can be associated with each other through the network.

Also, the present invention relates to an apparatus for forming an image associating with other apparatuses through a network and a method thereof, so that based on the image data received from the other image processing apparatus or the image input/output apparatus, the image processing apparatus or the image input/output apparatus outputs an image, conducts a predetermined image process, or stores the image data by associating with each other.

2. Description of the Related Art

For example, Japanese Laid-Open Patent Application No. 2000-6496 discloses an invention as a conventional technique for processing the image data for the image processing apparatus or image input/output apparatus connected through the network. Objects of the invention disclosed by Japanese Laid-Open Patent Application No. 2000-6496 are to provide the image processing apparatus connectable to an information outputting apparatus through the network in that when an image is output to all apparatuses on the network, an output image quality can be maintained. In the invention of Laid-Open Patent Application No. 2000-6496, correction data for an image process is obtained through the network, an optimum image correction is conducted to output, and then, have the apparatuses connected through the network output the image based on image data.

SUMMARY OF THE INVENTION

It is a general object of the present invention to provide an apparatus for forming an image associating with other apparatuses and a method thereof in which the above-mentioned problems are eliminated.

A more specific object of the present invention is to provide an apparatus for forming an image associating with other apparatuses through a network and a method thereof, in which an image input/output apparatus, such as a copier, a facsimile or a like connected through the network to each other, for inputting and outputting an image, an image outputting apparatus such as a printer for outputting an image, an image storing apparatus such as a file server, various databases or a like, or an image processing apparatus or an image input/output apparatus for sending image data to the other image processing apparatus which can be associated with each other through the network.

The above objects of the present invention are achieved by an image forming apparatus, comprising: a screen generating part generating screen information allowing a user to set at least one function option from a plurality of function options available for a predetermined process; a transmitting part transmitting a screen generating program realizing the screen generating part and option information showing the plurality of function options in response to an request from an apparatus that is connected through a network and the user uses; a process controlling part controlling the predetermined process by using a hardware resource for conducting the predetermined process based on a setting parameter when receiving, from the apparatus, the setting parameter indicating the function option set by the user from the plurality of the function options displayed at the apparatus by executing the screen generating program.

According to the present invention, since the screen generating program and the option information are transmitted the apparatus used by the user through the network, the user at the apparatus can set desired function options by utilizing a screen of the image forming apparatus through the network. In addition, it is possible for the user to have the image forming apparatus conduct the process through the network. Therefore, the apparatus used by the user is not required to have the screen generating programs providing the same screens as the image forming apparatus in order to utilize the process provided by the image forming apparatus. Moreover, the apparatus used by the user is not required to have the same process as the image forming apparatus.

The above objects of the present invention are achieved by an image forming apparatus, including: a screen generating part generating screen information allowing a user to set at least one first function option from a plurality of first function options available for a predetermined process; a replacing part replacing the screen generating part by executing a screen generating program based on option information showing a plurality of second function options sent from the apparatus; and a process requesting part requesting the predetermined process of the apparatus by sending a setting parameter showing at least one second function option set by the user from a screen displayed based on the screen information generated by the screen generating part, which is replaced by the replacing part.

According to the present invention, since an original screen generating part can be replaced by the screen generating program and the option information received from the apparatus (multi-functional image forming apparatus) connected through the network.

The above objects of the present invention are achieved by an image forming apparatus, including: a screen generating program generating screen information allowing the user to set at least one function option, based on option information showing a plurality of function option available for a predetermined process; a screen Web service providing process part providing the screen generating program and the option information as a first process result for a request received from an apparatus, that is connected through a network and the user uses; and a process Web service providing process part providing controlling the predetermined process by utilizing a hardware resource for conducting the predetermined process based on the setting parameter, and providing a result of the predetermined process as a second process result, when receiving a setting parameter indicating the function option set by the user from the plurality of the function options displayed at the apparatus by executing the screen generating program.

According to the present invention, as the Web service, it is possible to provide the screen generating program and the option information to the apparatus used by the user through the network, and to provide a process result of conducting the predetermined process when the setting parameter is received from the apparatus.

The above objects of the present invention are achieved by an image forming apparatus, including:
a Web server part controlling a request and a response with an apparatus connected through a network and an internal processing part; a Web browser part issuing the request by an input of the user and displaying the response received from the Web server part; and a Web service client part sending the request from the Web server part to the apparatus in accordance with a predetermined message exchanging protocol, and receiving the response for the request from the apparatus in accordance with the predetermined message exchanging protocol.

According to the present invention, since the image forming apparatus includes the Web server part, the Web browser part, and the Web service client part, it is possible to process the request and the response between the Web browser part and the internal processing part, and between the apparatus (multi-functional image forming apparatus) connected through the network and the apparatus itself.

The above objects of the present invention are achieved by an image forming apparatus, including: a screen generating part generating coordinate parameter showing a plurality of display components corresponding a plurality of function options to display at a display unit and position coordinates for arranging the plurality of display components based on option information showing the plurality of the function options available for a predetermined process; a transmitting part transmitting the option information and the coordinate parameter in response to an request from an apparatus that is connected through a network and the user uses; a process controlling part controlling the predetermined process by using a hardware resource for conducting the predetermined process based on a setting parameter when receiving, from the apparatus, the setting parameter indicating the function option set by the user from the plurality of the function options that the apparatus displays by using the coordinate parameter.

According to the present invention, since the option information and the coordinate parameter are transmitted the apparatus used by the user through the network, the user at the apparatus can set desired function options by utilizing a screen of the image forming apparatus through the network. In addition, it is possible for the user to have the image forming apparatus conduct the process through the network. Therefore, the apparatus used by the user is not required to have the screen generating programs providing the same screens as the image forming apparatus in order to utilize the process provided by the image forming apparatus. Moreover, the apparatus used by the user is not required to have the same process as the image forming apparatus.

The above objects of the present invention are achieved by an image forming apparatus, including: a screen generating part generating a first coordinate parameter showing a plurality of display components corresponding a plurality of first function options to display at a display unit and position coordinates for arranging the plurality of display components based on first option information showing the plurality of the first function options available for a predetermined process; a replacing part replacing the first coordinate parameter with second coordinate parameter showing a plurality of display components corresponding a plurality of second function options available for an apparatus selected by a user and position coordinates for arranging the plurality of display components, the position coordinates and the second coordinate parameter sent from the apparatus connected through a network; and a process requesting part requesting the apparatus to conduct the predetermined process by sending a setting parameter indicating at least one second function option that is set by the user from the plurality of the second function options displayed using the second coordinate parameter.

According to the present invention, the screen generating part, that generates the first coordinate parameter for displaying the function option of the image forming apparatus itself, can display the screen by using the second parameter for displaying the function options of the apparatus selected by the user and connected through the network. Moreover, the setting parameter indicating the second function options that is set by the user is sent to the apparatus. Therefore, it is possible to request the apparatus to conduct a process in accordance with the setting parameter. For example, even if the functions of this image forming apparatus are lower than those of the apparatus selected by the user and connected through the network, the user can utilize higher functions of the apparatus selected by the user from the image forming apparatus.

The above objects of the present invention are achieved by an image forming apparatus, including:
a screen Web service providing process part providing the option information showing a plurality of function options available for a predetermined process, and a coordinate parameter showing a plurality of display components corresponding to the plurality of the function options to display at a display unit and position coordinates for arranging the plurality of the display components, as a first process result for a request received from an apparatus, that is connected through a network and the user uses; and a process Web service providing process part controlling the predetermined process by utilizing a hardware resource for conducting the predetermined process based on the setting parameter, and providing a result of the predetermined process as a second process result, when receiving a setting parameter indicating the function option set by the user from the plurality of the function options displayed at the apparatus by using the coordinate parameter.

According to the present invention, it is possible for the image forming apparatus to provide functions as Web services to apparatuses connected through the network.

The above objects of the present invention are achieved by an image forming apparatus, including: a screen Web service providing process part providing a coordinate parameter showing a plurality of display components corresponding to the plurality of the function options to display at a display unit and position coordinates for arranging the plurality of the display components, as a first process result for a request received from an apparatus, that is connected through a network and the user uses; and a process Web service providing process part controlling the predetermined process by utilizing a hardware resource for conducting the predetermined process and providing a result of the predetermined process as a second process result, based on a setting parameter generated so as to indicate the function option corresponding to the setting position coordinate, when receiving, from the apparatus, a setting position coordinate of the function option set by the user from a screen that the apparatus displays using the coordinate parameter.

According to the present invention, the screen generating part, that generates the first coordinate parameter for displaying the function option of the image forming apparatus itself, can display the screen by using the second parameter for displaying the function opt ions of the apparatus selected by the user and connected through the network. Moreover, the setting parameter indicating the second function options that is set by the user is sent to the apparatus. Therefore, it is possible to request the apparatus to conduct a process in accordance with the setting parameter. For example, even if the functions of this image forming apparatus are lower than those of the apparatus selected by the user and connected through the network, the user can utilize higher functions of the apparatus selected by the user from the image forming apparatus.

The above objects of the present invention are achieved by an image forming apparatus, including:

a Web service client part controlling a process request requesting an apparatus, that is connected through a network, to conduct a predetermined process and a process response providing a process result for the process request from the apparatus, in accordance with a predetermined message exchanging protocol; a screen processing part displaying a screen at a display unit based on a coordinate parameter showing a plurality of display components corresponding to a plurality of function options to display available for the predetermined process of the apparatus at a display unit and position coordinates for arranging the plurality of the display components, the coordinate parameter obtained from the apparatus; and a controlling part instructing the screen processing part to display the screen based on the process response concerning a screen display sent from the Web service client part, and instructing the Web service client part to send the process request to the apparatus in response to an event sent from the screen processing part.

According to the present invention, even if the functions of the image forming apparatus as Web service client is lower than those of an apparatus selected by the user and connected through the network, the user can utilize higher functions of the apparatus selected by the user from the image forming apparatus.

The above objects of the present invention are achieved by an image forming apparatus, including: a screen generating part generating screen information for displaying a plurality of function options based on option information showing the plurality of the function options available for a predetermined process; a transmitting part transmitting the option information in response to an request from an apparatus that is connected through a network and the user uses; a process controlling part controlling the predetermined process by using a hardware resource for conducting the predetermined process based on a setting parameter when receiving, from the apparatus, the setting parameter indicating the function options set by the user from the plurality of the function options that the apparatus displays by using the option information.

According to the present invention, since the option information is transmitted the apparatus used by the user through the network, the user at the apparatus can set desired function options by utilizing a screen of the image forming apparatus through the network. In addition, it is possible for the user to have the image forming apparatus conduct the process through the network. Therefore, the apparatus used by the user is not required to have the screen generating programs providing the same screens as the image forming apparatus in order to utilize the process provided by the image forming apparatus. Moreover, the apparatus used by the user is not required to have the same process as the image forming apparatus.

The above objects of the present invention are achieved by an image forming apparatus, including: a screen generating part generating first screen information for displaying a plurality of function options based on first option information showing the plurality of the first function options available for a predetermined process; a replacing part replacing the first screen information with second screen information for displaying a plurality of second function options available for an apparatus selected by a user, the second screen information sent from the apparatus connected through a network; and a process requesting part requesting the apparatus to conduct the predetermined process by sending a setting parameter indicating at least one second function options that are set by the user from the plurality of the second function options displayed based on the second screen information.

According to the present invention, the screen generating part, that generates the first screen information for displaying the function options of the image forming apparatus itself, can display the screen by using the second screen information for displaying the function options of the apparatus selected by the user and connected through the network. Moreover, the setting parameter indicating the second function options that are set by the user is sent to the apparatus. Therefore, it is possible to request the apparatus to conduct a process in accordance with the setting parameter. For example, even if the functions of this image forming apparatus are lower than those of the apparatus selected by the user and connected through the network, the user can utilize higher functions of the apparatus selected by the user from the image forming apparatus.

The above objects of the present invention are achieved by an image forming method, including the steps of: (a) generating screen information for displaying a plurality of function options based on option information showing the plurality of the function options available for a predetermined process; (b) transmitting the option information in response to an request from an apparatus that is connected through a network and the user uses; (c) controlling the predetermined process by using a hardware resource for conducting the predetermined process based on a setting parameter when receiving,, from the apparatus, the setting parameter indicating the function options set by the user from the plurality of the function options that the apparatus displays by using the option information.

According to the present invention, since the option information are transmitted the apparatus used by the user through the network, the user at the apparatus can set desired function options by utilizing a screen of the image forming apparatus through the network. In addition, it is possible for the user to have the image forming apparatus conduct the process through the network. Therefore, the apparatus used by the user is not required to have the screen generating programs providing the same screens as the image forming apparatus in order to utilize the process provided by the image forming apparatus. Moreover, the apparatus used by the user is not required to have the same process as the image forming apparatus.

The above objects of the present invention are achieved by an image forming apparatus, including: a system information obtaining part obtaining system information concerning hardware resource, that is available to configure a system and used to determine a plurality of function options selectively set for a predetermined process conducted by utilizing the hardware resource; a transmitting part transmitting the system information in response to an request from an apparatus that is connected through a network and the user uses; a process controlling part controlling the predetermined process by using a hardware resource for conducting the predetermined process based on a setting parameter when receiving, from the apparatus, the setting parameter indicating the function option set by the user from the plurality of the function options that the apparatus displays by using the system information.

According to the present invention, since the system information is transmitted the apparatus used by the user through the network, the user at the apparatus can set desired function options by utilizing a screen of the image forming apparatus through the network. In addition, it is possible for the user to have the image forming apparatus conduct the process through the network. Therefore, the apparatus used by the user is not required to have the screen generating programs providing the same screens as the image forming apparatus in order to utilize the process provided by the image forming apparatus. Moreover, the apparatus used by the user is not required to have the same process as the image forming apparatus.

The above objects of the present invention are achieved by an image forming apparatus, including: a screen generating part generating first screen information for displaying a plurality of function option based on first option information showing the plurality of the first function options available for a predetermined process; a replacing part replacing the first screen information with second screen information for displaying a plurality of second function options available for an apparatus selected by a user, wherein the second screen information generated based on system information concerning hardware resource available to configure a system, the predetermined process is conducted by utilizing the hardware resource at the apparatus, the second screen information is sent from the apparatus connected through a network; and a process requesting part requesting the apparatus to conduct the predetermined process by sending a setting parameter indicating at least one second function option that is set by the user from the plurality of the second function options displayed based on the second screen information.

According to the present invention, the screen generating part, that generates the first screen information for displaying the function options of the image forming apparatus itself, can display the screen by using the second screen information for displaying the function options of the apparatus selected by the user and connected through the network. Moreover, the setting parameter indicating the second function options that is set by the user is sent to the apparatus. Therefore, it is possible to request the apparatus to conduct a process in accordance with the setting parameter. For example, even if the functions of this image forming apparatus are lower than those of the apparatus selected by the user and connected through the network, the user can utilize higher functions of the apparatus selected by the user from the image forming apparatus.

The above objects of the present invention are achieved by an image forming method, comprising the steps of: (a) obtaining system information concerning hardware resource, that is available to configure a system and used to determine a plurality of function options selectively set for a predetermined process conducted by utilizing the hardware resource; (b) transmitting the system information in response to an request from an apparatus that is connected through a network and the user uses; (c) controlling the predetermined process by using a hardware resource for conducting the predetermined process based on a setting parameter when receiving, from the apparatus, the setting parameter indicating the function option set by the user from the plurality of the function options that the apparatus displays by using the system information.

According to the present invention, since the system information is transmitted the apparatus used by the user through the network, the user at the apparatus can set desired function options by utilizing a screen of the image forming apparatus through the network. In addition, it is possible for the user to have the image forming apparatus conduct the process through the network. Therefore, the apparatus used by the user is not required to have the screen generating programs providing the same screens as the image forming apparatus in order to utilize the process provided by the image forming apparatus. Moreover, the apparatus used by the user is not required to have the same process as the image forming apparatus.

BRIEF DESCRIPTION OF THE DRAWINGS

In the following, embodiments of the present invention will be described with reference to the accompanying drawings.

FIG. 4 is a diagram showing the process patterns in a case of utilizing the higher functions of the MF-apparatus;

FIG. 5 is a diagram showing the example of the input screen;

DESCRIPTION OF THE PREFERRED EMBODIMENTS

In the following, embodiments of the present invention will be described with reference to the accompanying drawings.

First Embodiment

Figure 1:
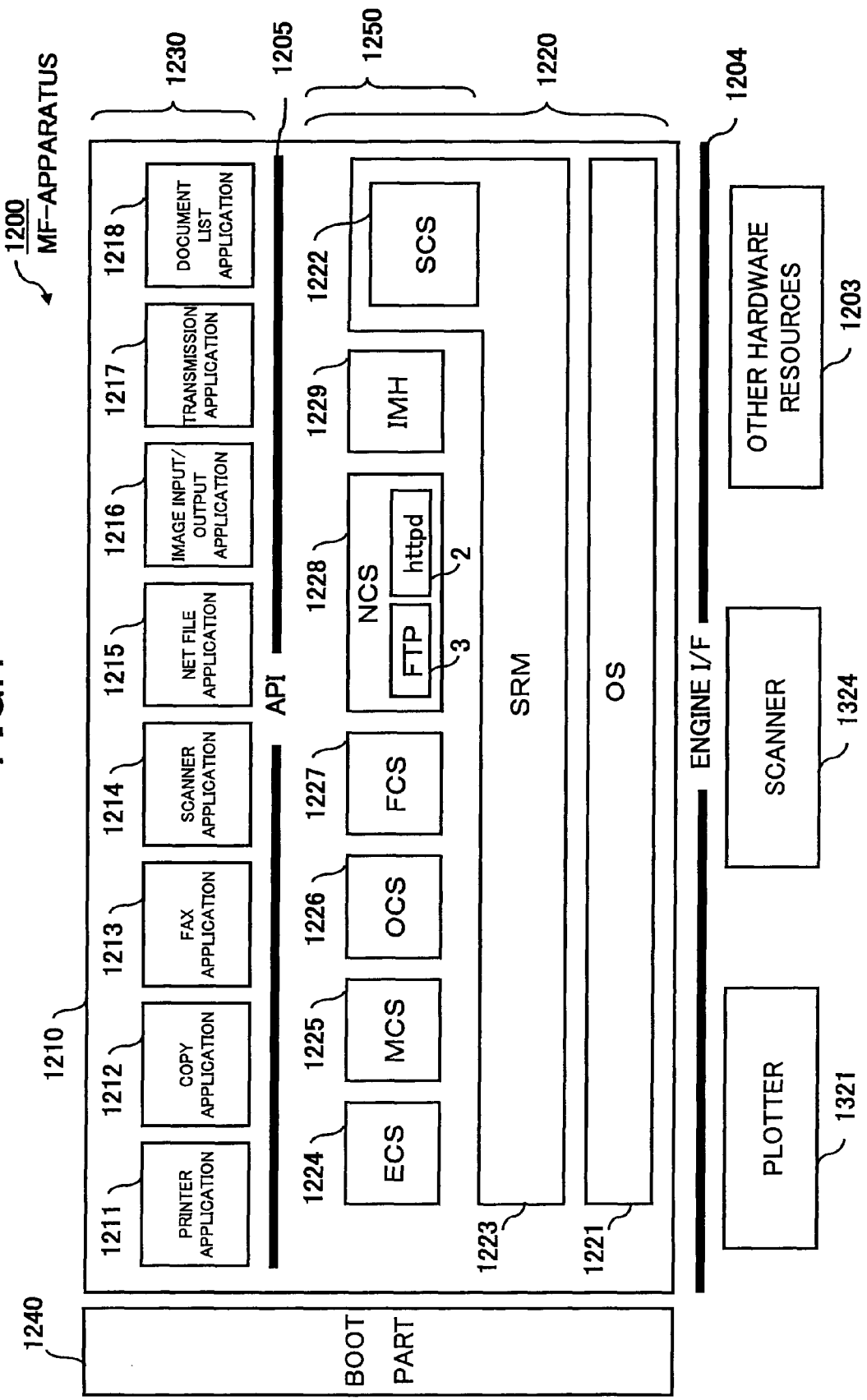
FIG. 1 is a block diagram showing the functional configuration of the MF-apparatus integrating multiple image forming functions according to a first embodiment of the present invention.

A functional configuration of an image forming apparatus according to a first embodiment of the present invention, which integrates multiple image forming functions, is shown as FIG. 1. Hereinafter, the image forming apparatus is called an MF-apparatus (Multi-Functional image forming apparatus). FIG. 1 is a block diagram showing the functional configuration of the MF-apparatus integrating multiple image forming functions according to the first embodiment of the present invention.

In FIG. 1, an MF-apparatus 1200 includes software 1210 including a platform 1220, an application 1230, and a plotter 1321 as a hardware resource for conducting a printing process, a scanner 1324 as a hardware resource for conducting a scanning process.

A boot part 1240 is executed first when the MF-apparatus 1200 is powered on, and the boot part 1240 activates the platform 1220 and the application 1230.

An API (Application Program Interface) 1205 provides an interface between the application 1230 and the platform 1220. The platform 1220 receives a process request from the application 1230 sent via the API 1205, and manages one or a plurality of the hardware resources. The platform 1220 includes an SRM (system resource manager) 1223 for mediating an obtaining request from a control service 1250 and an OS (Operating System) 1221.

The control service 1250 is formed by a plurality of service modules. In detail, the control service 1250 includes an SCS (System control service) 1222, an ECS (Engine Control Service) 1224, an MCS (Memory Control Service) 1225, an OCS (Operation panel Control Service) 1226, an FCS (FAX Control Service) 1227, an NCS (Network Control Service) 1228, and an IMH (Imaging Memory Handler) 1229.

The OS 1221 is an operating system such as UNIX™, and executes each software of the platform 1220 and the application 1230 as a process in parallel. By using UNIX™ as an open source, a program can be secured, an application to a network can be realized, and a source code of UNIX™ can be easily obtained. In addition, royalty of the OS 1221 and TCP/IP are not required. Also, an outsourcing can be easily realized.

SRM 1223 as well as SCS 1222 controls a system and manages hardware resources via an engine interface 1204 and a like, mediates a request from upper layers utilizing hardware resources: an engine part such as the scanner 1324, the plotter 1321, and the like, a memory, an HDD file, host I/Os (a centro I/F, a network I/F, an IEEE1394 I/F, RS232C I/F, and a like) and control the hardware resources based on the request.

In detail, the SRM 1223 determines whether or not a hardware resource respective to the request is available to a user (that is, the hardware resource is being used for another request). When the hardware resource is available, the SRM 1223 informs the upper layer conducing the request that the hardware resource respective to the request is available to use. In addition, the SRM 1223 may conduct a utilization scheduling of the hardware resources in respect to the request sent from the upper layers, and directly conducts an indication of the request (for example, operations for conveying paper sheets or forming an image by a printer engine (the plotter 1321), an operation of securing memory, an operation of generating a file, or a like).

The SCS 1222 conducts a plurality of functions: an application management (function 1), an operation panel control (function 2), a system screen display (a job list screen, a counter display screen, and a like) (function 3), an LED display (function 4), a resource management (function 5), an interruption application control (function 6), and a like. In detail, the application management (function 1) conducts processes for registering an application and informing information related to the registration of the application to other applications. The operation panel control (function 2) conducts an exclusive control for a use right of the operation panel in respect with the applications. The system screen display (function 3) displays a warning screen corresponding to a state of the engine part, in response to the request from the application having the use right of the operation panel. The LED display (function 4) controls a display of a system LED such as a warning LED, an application key, and a like. The resource management (function 5) provides service due to the exclusive control of the engine resources (the scanner 1324, a stapler (not shown), and a like) that should be exclusive when the ECS 1224 (application) executes a job. The interruption application control (function 6) conducts a control or service for a priority operation in respect to a special application.

The ECS 1224 controls the engine part such as the plotter 1321, the scanner 1324, other hardware resources 1203, and a like, and conducts an image reading operation and a printing operation, a state informing operation, a jam recovering operation, and a like.

The MCS 1225 conducts a memory control. In detail, the MCS 1225 obtains and releases an image memory, utilizes a hard disk device (HD), compresses and expands an image data.

The OCS 1226 is a module for controlling the operation panel as a communicating part between an operator (user) and a controller of the MF-apparatus 1200. The OCS 1226 conducts a process for informing the controller an event occurred by a key operation of the operator, a process for providing library functions in order for each application to build a GUI, a process for managing GUI information for each application, and a process for reflecting a display to the operation panel.

The FCS 1227 provides the API 1205 for a facsimile sending/receiving operation to ¥ from each application using a PSTN/ISDN, for a registering/quoting operation in respect to various facsimile data managed in a BKM (BacKup SRAM), for a facsimile reading operation, for a facsimile receiving and printing operation, and for an integrated sending/receiving operation.

The NCS 1228 is a module group for providing service in order for the application requiring a network I/O to share the network I/O. The NCS 1228 distributes data received in accordance with each protocol from the network to each application, and mediates for the applications when the application send data to the network. For example, the NCS 1228 includes at least an httpd (HyperText Transfer Protocol Daemon) 2 for communicating with apparatuses connected through the network, and an FTP 2 (File Transfer Protocol) 3 for transmitting files related to image input/output interfaces.

The IMH 1229 maps image data from a virtual memory area to a physical memory area. When a process is activated, the IMH 1229 conducts a system call, maps the virtual memory area for the process, and releases the virtual memory area mapped for the process when the process is terminated.

The application 1230 includes a plurality of applications: a printer applications 1211 for a printer having a Page Description Language (PDL), PCL and Post Script (PS), a copy application 1212 for a copier, an FAX application 1213 for a facsimile, a scanner application 1214 for a scanner, a net file application 1215 for a network file, an image input/output application 1216 for controlling an image input/output, a transmission application 1217 for transmitting image input/output interface files, and a document list application 1218 for providing a list of documents managed in the MF-apparatus 1200. Since each of the applications 1211 through 1218 is executed using each process on the platform 1220, a screen display control program, which conducts a screen control, a key operation control, a job generation, and a like, is a main function. In addition, a new application can be loaded by the network to which the NCS 1228 is connected. Also, each application can be deleted and added.

As described above, the MF-apparatus 1200 has the platform 1220 centralize and manage necessary processes to be shared among the applications.

Figure 2:
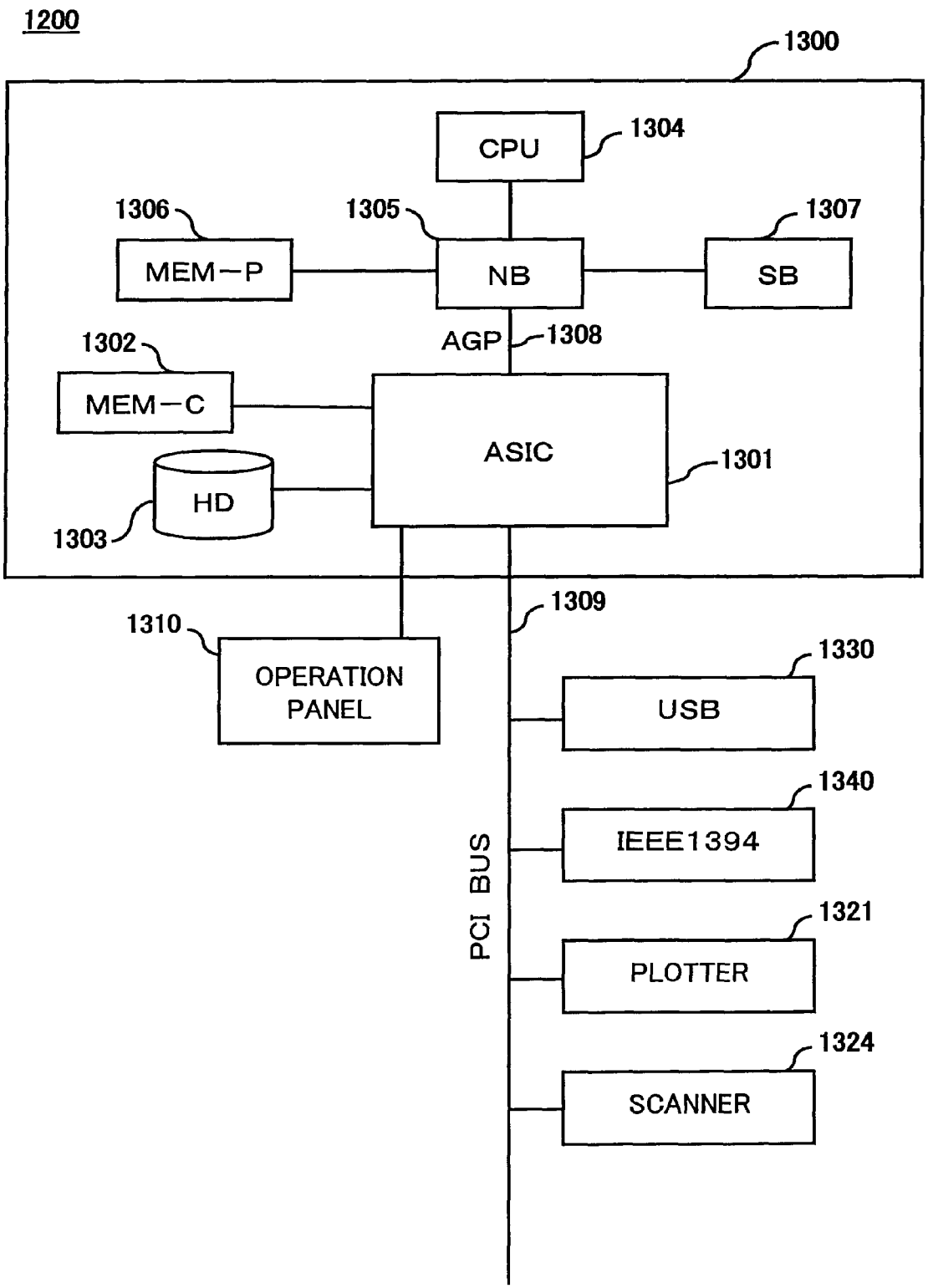
FIG. 2 is a block diagram showing the hardware configuration of the MF-apparatus shown in FIG. 1.

Next, a hardware configuration of the MF-apparatus 1200 will be described. FIG. 2 is a block diagram showing the hardware configuration of the MF-apparatus shown in FIG. 1. As shown in FIG. 2, in the MF-apparatus 1200, an operation panel 1310, a USB (Universal Serial Bus) 1330, the IEEE1394 1340, the plotter 1321, the scanner 1324 are connected to an ASIC (Application Specified IC) 1301 of a controller 1300 by a PCI (Peripheral Component Interconnect) bus 1309.

The controller 1300 connects the ASIC 1301 to a MEM-C 1302 and a HD (Hard Disk) 1303, and connects the ASIC 1301 to a CPU 1304 via an NB 1305 of a CPU chip set. Because the CPU 1304 itself is not disclosed.

It should be noted that the ASIC 1301 is connected to the NB 1305 via an AGP (Accelerated Graphics Port) 1308, instead of simply connecting via the PCI bus 1309. Because a connection via the PCI bus 1309, which is slower, ends up to too low performance to execute and control a plurality of processes forming the platform 1220 and the application 1230 shown in FIG. 1.

The CPU 1304 controls the entire MF-apparatus 1200. In detail, the CPU 1304 activates and executes the SCS 1222, the SRM 1223, the ECS 1224, the MCS 1225, the OCS 1226, the FCS 1227, the NCS 1228, and the IMH 1229, all of which form the platform 1220 on the OS 1221, as processes, respectively. Also, the CPU 1304 activates and executes the printer application 1211, the copy application 1212, the FAX application 1213, the scanner application 1214, the net file application 1215, the image input/output application 1216, transmission application 1217, and the document list application 1218. Also, the OS 1221 controls the scanner 1324, the plotter 1321, and other hardware resources 1203.

In view that the OS 1221 of the MF-apparatus 1200 directly controls each of the hardware resources 1321, 1324, and 1203, the OS 1221 differs from an operating system of a personal computer (PC) or a like. Because generally, the PC controls a scanner, a printer, or a like as an image forming apparatus, which is connected thereto; but the PC cannot control hardware resources inside the image forming apparatus.

The NB 1305 serves as a bridge to connect the CPU 1304 with an MEM-P 1306, an SB 1307, and the ASIC 1301, respectively. The MEM-P 1306 is a system memory used as a drawing memory of the MF-apparatus 1200. The SB 1307 is a bridge to connect the NB 1305 with a ROM (Read Only Memory), a PCI device, and a peripheral device. The MEM-C 1302 is a local memory used as an image buffer for a copy and a coding buffer. The ASIC 1301 is an IC (Integrated Circuit) used for the image process including hardware parts.

The HD 1303 is storage to store image data, programs, font data, forms, and a like. The operation panel 1310 is an operation part to receive an input operation from the operator and display information for the operator.

Therefore, in the ASIC 1301, a RAM interface to connect to the MEM-C 1302 and a hardware interface to connect to the HD 1303 are provided. When the image data is input or output to or from the MEM-C 1302 or the HD 1303, the ASIC 1301 switches to the RAM interface or the hardware interface.

The AGP 1308 is a bus interface for a graphic accelerator card, which is provided to improve a speed of a graphic process. The AGP 1308 can realize improved speed of the graphic accelerator card by directly accessing the system memory by a higher throughput.

Figure 3:
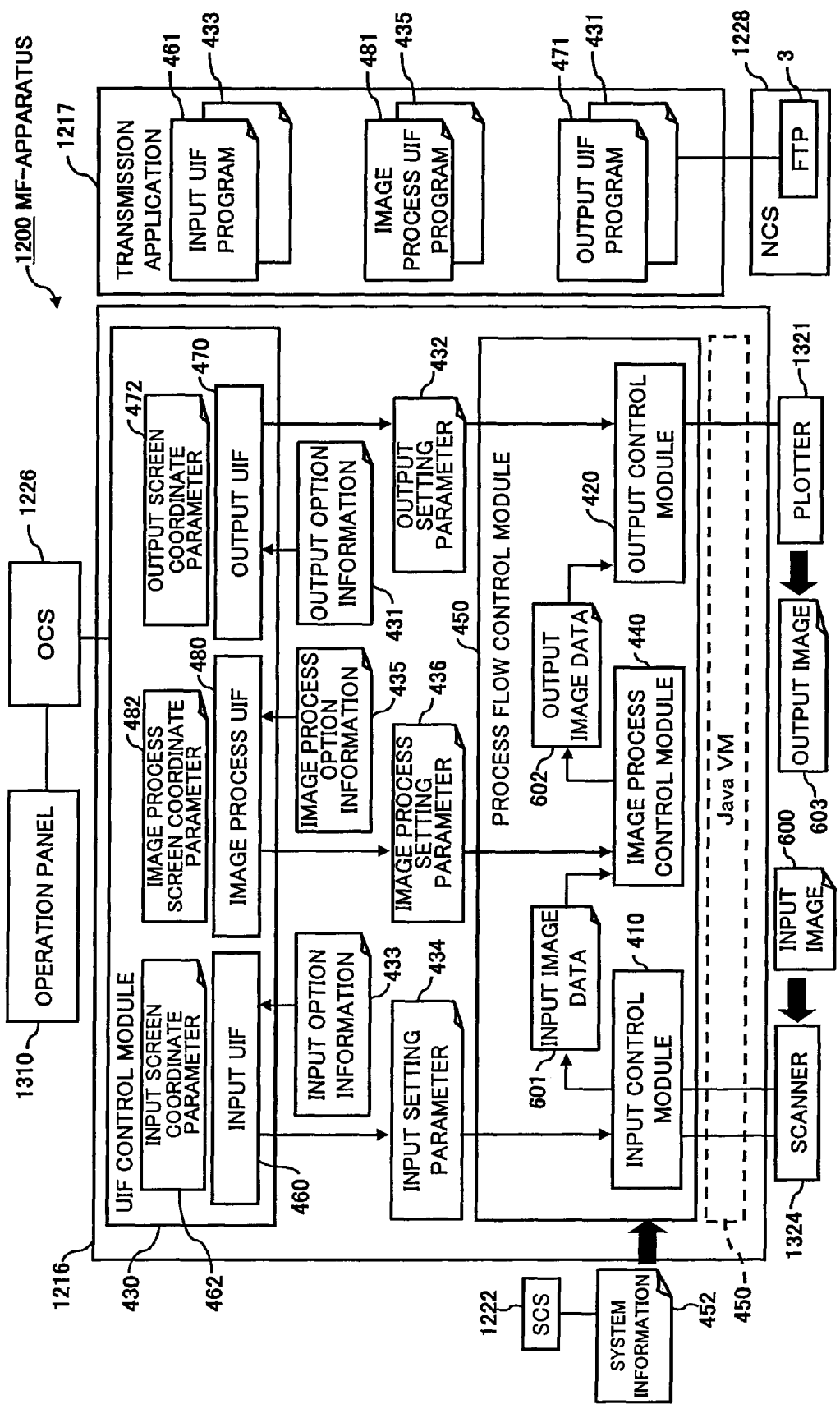
FIG. 3 is a diagram showing functional configurations of the image input/output application and the transmission application according to the first embodiment of the present invention.

Functional configurations of the image input/output application 1216 and the transmission application 1217, which other apparatuses connected to the MF-apparatus 1200 through the network can utilize an input process, an image process, and an output process provided by the MF-apparatus 1200 having the functional configuration shown in FIG. 1 and the hardware configuration shown in FIG. 2, will be described. FIG. 3 is a diagram showing functional configurations of the image input/output application 1216 and the transmission application 1217. In FIG. 3, the image input/output application 1216 mainly includes a process flow control module 450 for controlling process flows of the input process, the image process, and the output process, and a UIF (User InterFace) control module 430 for controlling a screen flow to display information at an operation panel 1310 through the OCS 1226.

The process flow control module 450 includes an input control module 410 for controlling the scanner 1324 as an image reading apparatus for inputting an image, an output control module 420 for controlling the plotter 1321 as the image forming apparatus for outputting the image, and an image process module 440 for conducting the image process to input image data 601 and generating output image data 602. The process flow control module 450 controls each process flow of the input process, the image process, and the output process conducted by the input control module 410, the output control module 420, and the image process module 440, respectively, or controls a series of processes thereof as a single process of the entire process. For example, when the input process, the image process, and the output process are consecutively conducted in the MF-apparatus 1200, the process flow control module 450 controls so that each process is conducted in accordance with a predetermined process flow. In addition, as described later, when the input process, the output process, or the image process is specifically required, the process flow control module 450 controls the input control module 410, the output control module 420, or the image process module 440 so as to conduct a required process alone in accordance with the predetermined process flow.

The UIF control module 430 includes an input UIF 460 for providing an input screen, an output UIF 470 for providing an output screen, and an image process UIF 480 for providing an image process screen. The UIF control module 430 controls the input UIF 460, the output UIF 470, and the image process UIF 480 so as to display a predetermined screen at the operation panel 1310 through the OCS 1226 in accordance with a display flow.

In FIG. 3, first, a method, in which the UIF control module 430 controls to display the input screen, the image process screen, and the output screen at the operation panel 1310 of the MF-apparatus 1200, will be described.

When the MF-apparatus 1200 is booted, the process flow control module 450 obtains an available apparatus configuration of the scanner 1324, the plotter 1321, and the like as system information 452 from the SCS 1222. The input control module 410 determines functions for the input process, which the scanner 1324 can provide, from the system information 452. For example, the input control module 410 determines and obtains a document feeder function, both sides reading function, and a like as input option information 433. The input UIF 460 of the UIF control module 430 generates an input screen coordinate parameter 462 including images such as texts, buttons, icons, and a like forming the input screen and showing position coordinates where the images are arranged, based on the input option information 433 obtained by the input control module 410. The input screen displays functions, which the scanner 1324 can provide, for the input process. The input screen coordinate parameter 462 generated by the input UIF 460 is sent to the OCS 1226 by the UIF control module 430. Based on the input screen coordinate parameter 462, the OCS 1226 displays the input screen at the operation panel 1310. When the user sets desired functions from the input screen displayed at the operation panel 1310, the position coordinates displaying the images of texts, buttons, icons, or the like selected by the user are informed to the input UIF 460 of the UIF control module 430 through the OCS 1226.

Based on the input option information 433 and the input screen coordinate parameter 462, the input UIF 460 informs the functions corresponding to the position coordinates informed from the OCS 1226 as an input setting parameter 434 to the input control module 410, and also instructs the input control module 410 to input an image. Based on the input setting parameter 434, the input control module 410 executes the scanner application 1214 and controls the scanner 1324. Then, the input control module 410 reads in an input image 600 and executes the function set by the user in respect to the input image 600. As a result of an execution of the scanner 1324 controlled by the input control module 410, the input image data 601 is generated.

Also, the image process module 440 determines functions for the image process, which the MF-apparatus 1200 can provide, from the system information 452. For example, the image process module 440 determines and obtains a two-in-one printing function or a copy function, a frame eliminating function, a reverse function, a stamp function, and a like as an image process option information 435, and sends the image process option information 435 to the image process UIF 480. The image process UIF 480 of the UIF control module 430 generates an image process screen coordinate parameter 482 including images such as texts, buttons, icons, and a like forming the image process screen and showing position coordinates where the images are arranged, based on the image process option information 435 sent from the image process module 440. The image process screen displays functions, which the MF-apparatus 1200 can provide, for the image process. The image process screen coordinate parameter 482 generated by the image process UIF 480 is sent to the OCS 1226 by the UIF control module 430. Based on the image process screen coordinate parameter 482, the OCS 1226 displays the image process screen at the operation panel 1310. When the user sets desired functions from the image process screen displayed at the operation panel 1310, the position coordinates displaying the images of texts, buttons, icons, or a like selected by the user are informed to the image process UIF 480 of the UIF control module 430 through the OCS 1226.

Based on the image process option information 435 and the image process screen coordinate parameter 482, the image process UIF 480 informs the functions corresponding to the position coordinates informed from the OCS 1226 as an image process setting parameter 436 to the image process module 440, and also instructs the image process module 440 to conduct the image process in respect to the input image data 601. The image process module 440 executes the image process in respect to the input image data 601 generated by the input control module 410. As a result, the image process module 440 generates the output image data 602.

Similarly, when the MF-apparatus 1200 is booted, the output control module 420 determines functions for the output process, which the plotter 1321 can provide, from the system information 452. For example, the output control module 420 determines and obtains finisher functions such as a punching function, a staple function, or a like, a sorting function, a stack function, a print number setting function, types of sheet trays, a both-side sheet supplying function, and a like as output option information 431. The output UIF 470 of the UIF control module 430 generates an output screen coordinate parameter 472 including images such as texts, buttons, icons, and a like forming the output screen and showing position coordinates where the images are arranged, based on the output option information 431 obtained by the output control module 420. The output screen displays functions, which the plotter 1321 can provide, for the output process. The output screen coordinate parameter 472 generated by the output UIF 470 is sent to the OCS 1226 by the UIF control module 430. Based on the output screen coordinate parameter 472, the OCS 1226 displays the output screen at the operation panel 1310. When the user sets desired functions from the output screen displayed at the operation panel 1310, the position coordinates displaying the images of texts, buttons, icons, or a like selected by the user are informed to the output UIF 470 of the UIF control module 430 through the OCS 1226.

Based on the output option information 431 and the output screen coordinate parameter 472, the output UIF 470 informs the functions corresponding to the position coordinates informed from the OCS 1226 as an output setting parameter 432 to the output control module 420, and also instructs the output control module 420 to output the output image data 602. Based on the output setting parameter 432, the output control module 420 executes the printer application 1211 and controls the plotter 1321 to form the output image data 602 generated by the image process module 440 to a paper sheet or a like and output the paper sheet on which an image is formed, from the plotter 1321.

For example, the UIF control module 430 changes a screen flow so as to display a screen for setting a frame width to eliminate when the image process screen is displayed at the operation panel 1310, or so as to display a screen showing positions of staples when the output screen is displayed at the operation panel 1310. Also, the input option information 433, the image process option information 435, and the output option information 431 include programs for controlling the operation panel 1310. the input option information 433 and the output option information 431 as described above are information of a scanner operation including sheet information and also include information related to an operation (control) of an ADF (Automatic Document Feeding device). The output option information 431 is information related to the finisher function of a printing form. Thus, the output option information 431 is similar information when a copy process is conducted.

In a case in which a regular copy is conducted at the MF-apparatus 1200, from a screen displayed at operation panel 1310, an input setting, for example, a setting of a one-side printed sheet or a both-side printed sheet, or a like, is conducted for the input process. And an image process setting, for example, a setting of frame elimination, is conducted for the image process. Subsequently, an output setting, for example, a setting of a staple or the tray, is conducted for the image process. Then, a copy is started when a start button is pressed.

By a copy start, the input control module 410 receives the input setting parameter 434, and starts to input the input image 600 in accordance with the input setting parameter 434. The input control module 410 generates the input image data 601 by inputting the input image 600 to the MF-apparatus 1200. The image process module 440 conducts image process in respect to the input image data 601 in accordance with the image process setting parameter 436 and generates the output image data 602. The output image data 602 is sent to the output control module 420. The output image data 602 is output from the plotter 1321 by the output control module 420 in accordance with the output setting parameter 432.

In order for another apparatuses connected to the MF-apparatus 1200 through the network to utilize the functions for the input process, the image process, and the output process provided by the MF-apparatus 1200, in response to a request of a UIF program from another apparatus, the transmission application 1217 transmits a respective UIF program by the FTP 3 of the NCS 1228.

When the transmission application 1217 receives a request of an input UIF program from another apparatus connected through the network, the transmission application 1217 transmits the input option information 433 obtained by the input control module 410 when the MF-apparatus 1200 is booted, and an input UIF program 461 realizing the input UIF 460 simultaneously by the FTP 3 to the other apparatus. Similarly, when the transmission application 1217 receives a request of an image process UIF program or an output UIF program from the other apparatus connected through the network, the transmission application 1217 simultaneously transmits an image process UIF program 481 and the image process option information 435, or output UIF program 471 and the output option information 431 by the FTP 3 to the other apparatus.

The other apparatus downloads and executes the UIF programs 461, 471, and 481, respectively. Therefore, the user using the other apparatus can select a plurality of functions provided by the MF-apparatus 1200 at a side of the other apparatus. In addition, a setting parameter showing functions set by the user is sent to the MF-apparatus 1200. The MF-apparatus 1200 replaces the setting parameter received from the other apparatus with a respective setting parameter of the input setting parameter 434, the image process setting parameter 436, and the output setting parameter 432. Therefore, it is possible for the MF-apparatus 1200 to conduct a process in accordance with the setting parameter set by the user using the other apparatus.

In the functional configuration of the image input/output application 1216 shown in FIG. 3, the input control module 410, the image process module 440, the output control module 420, and the UIF control module 430 may be realized by Java™ programs. In this case, a Java VM (Virtual Memory) 450, which is shown by dashed lines, may be provided to execute the Java™ programs. The input UIF program 461, the image process UIF program 481, and the output UIF program 471 are also provided by the Java™ programs. Also, the input option information 433, the image process option information 435, and the output option information 431 are provided in a data structure readable by the Java™ programs. In the other apparatus connected through the network to the MF-apparatus 1200, if the Java™ programs can be executable, the input UIF program 461, the image process UIF program 481, and the output UIF program 471 can be provided without depending on hardware of the other apparatus.

For example, in a case in which the other apparatus connected to the MF-apparatus 1200 through the network has a lower function than that of the MF-apparatus 1200 or only a single function (hereinafter, called a SF-apparatus (single function image processing apparatus)), this SF-apparatus downloads and executes the input UIF program 461, the image process UIF program 481, or the output UIF program 471 of the MF-apparatus 1200. Therefore, it is possible for the SF-apparatus to provide the user higher functions provided by the MF-apparatus 1200. Process patterns for utilizing the higher functions of the MF-apparatus 1200 at the SF-apparatus will be described with reference to FIG. 4. FIG. 4 is a diagram showing the process patterns in a case of utilizing the higher functions of the MF-apparatus 1200. It is presumed that the SF-apparatus is used by the user, that is, the SF-apparatus conducts a display process for the user. The input process, the image process, or the output process is conducted by the SF-apparatus or the MF-apparatus 1200.

First, a first process pattern, in which the input process is conducted by the SF-apparatus, the image process is conducted by the MF-apparatus 1200, and the output process is conducted by the SF-apparatus, will be described. For example, as for a state in which the process pattern 1 is conducted, it can be considered that the user wants to use the frame eliminating function of for the image process of the MF-apparatus 1200; but the MF-apparatus 1200 is located at a far distance from the user and the SF-apparatus is located near the user, or the MF-apparatus 1200 is being used by another user.

Next, a process pattern 2, in which the input process is conducted by the MF-apparatus 1200, the image process is conducted by the MF-apparatus 1200 or the SF-apparatus, and the output process is conducted by the MF-apparatus 1200, will be described. For example, as for a state in which the process pattern 2 is conducted, it can be considered that the user wants to use the ADF provided to the MF-apparatus 1200 but not the SF-apparatus as a function for the input process, and wants to use the staple function of the MF-apparatus 1200 as a function for the output process. Alternatively, the user wants to use the frame elimination function provided by the MF-apparatus 1200 but not the SF-apparatus. In this state, the image process is conducted by the MF-apparatus 1200.

Moreover, a process pattern 3 will be described in which the input process is conducted by the SF-apparatus, the image process is conducted by the MF-apparatus 1200 or the SF-apparatus, the output process is conducted by the MF-apparatus 1200. For example, as for a state in which the process pattern 3 is conducted, it can be considered that the user wants to use the staple function of the MF-apparatus 1200 for the output process after the input process is conducted by the SF-apparatus. Moreover, the user wants to use the frame eliminating function for the image process provided by the MF-apparatus 1200 but not the SF-apparatus.

Furthermore, a process pattern 4, in which the input process is conducted by the MF-apparatus 1200, the image process is conducted by the MF-apparatus 1200 or the SF-apparatus, and the output process is conducted by the SF-apparatus, will be described. For example, as for a state in which the process pattern 4 is conducted, it can be considered that the user wants to use the ADF provided at the MF-apparatus 1200 but not a SF-apparatus as the function for the input process. In addition, in a case in that the user wants to use the frame elimination function provided by the MF-apparatus 1200 but not the SF-apparatus, the image process is conducted by the MF-apparatus 1200.

Also, as other process patterns, it can be considered that the display process is conducted by the MF-apparatus 1200 or other combinations. However, the object of the present invention can be described well by the process patterns 1 through 4.

Examples of screens and process flows for displaying the functions of the MF-apparatus 1200 at the operation panel of the SF-apparatus will be described, according to the first embodiment of the present invention. In the following explanations, it is assumed that the SF-apparatus is a copier. For the sake of convenience, examples of the screen displayed at the operation panel of the SF-apparatus will be described. However, since the input UIF program 461, the output UIF 471, and the image process UIF 481 for displaying the screens are provided from the MF-apparatus 1200, it is possible to similarly display the screen shown in FIGS. 5, 7, and 9 at the operation panel 1310 of the MF-apparatus 1200.

First, an example of the input screen by the input UIF program 461 and the input option information 433 will be described with reference to FIG. 5. FIG. 5 is a diagram showing the example of the input screen. In FIG. 5, the input screen G600 includes a button 61 for indicating an apparatus for conducting the input process, a button 62 for indicating an apparatus for conducting the image process, a button 63 for indicating an apparatus for conducting the output process, a display area 610 for showing a list of apparatuses existing on the network and allowing the user to select one of the apparatuses, and a display area 620 for showing functions processed by the apparatus selected by the user from the display area 610 and allowing the user to select one of the functions.

In the input screen G600, when the user selects the button 61, the display area 610 displays the list of the apparatuses that exist on the network and are available for the input process. For example, the display area 610 displays "COPIER" as the single functional image process apparatus itself, "MF-APPARATUS" as the MF-apparatus 1200, "APPARATUS 01", "APPARATUS 02", "APPARATUS 03", and "APPARATUS 04" as apparatus names. For example, when the user selects "MF-apparatus", the display area 620 displays the function that can be provided by the MF-apparatus 1200.

For example, the display area 620 displays "TEXT" for reading in the input image 600 by a text mode, "PICTURE" for reading in the input image 600 by a picture mode, "AUTO DARKNESS" for allowing "MF-APPARATUS" to determine a darkness of the input image 600, "LIGHT" and "DARK" for allowing the user to determine the darkness of the input image 600, "ONE SIDE" for reading in one side of the input image 600, and "BOTH SIDES" for reading in both sides of the input image 600. For example, when the user selects "PICTURE", "AUTO DARKNESS", and "BOTH SIDES", the input setting parameter showing "PICTURE", "AUTO DARKNESS", and "BOTH SIDES" is generated, and transmitted to the MF-apparatus 1200. The MF-apparatus 1200 sets the input setting parameter received from the SF-apparatus 100 as the input setting parameter 434, and the input control module 410 controls the scanner 1324 to read in the input image 600 in accordance with the input setting parameter 434.

Figure 6:
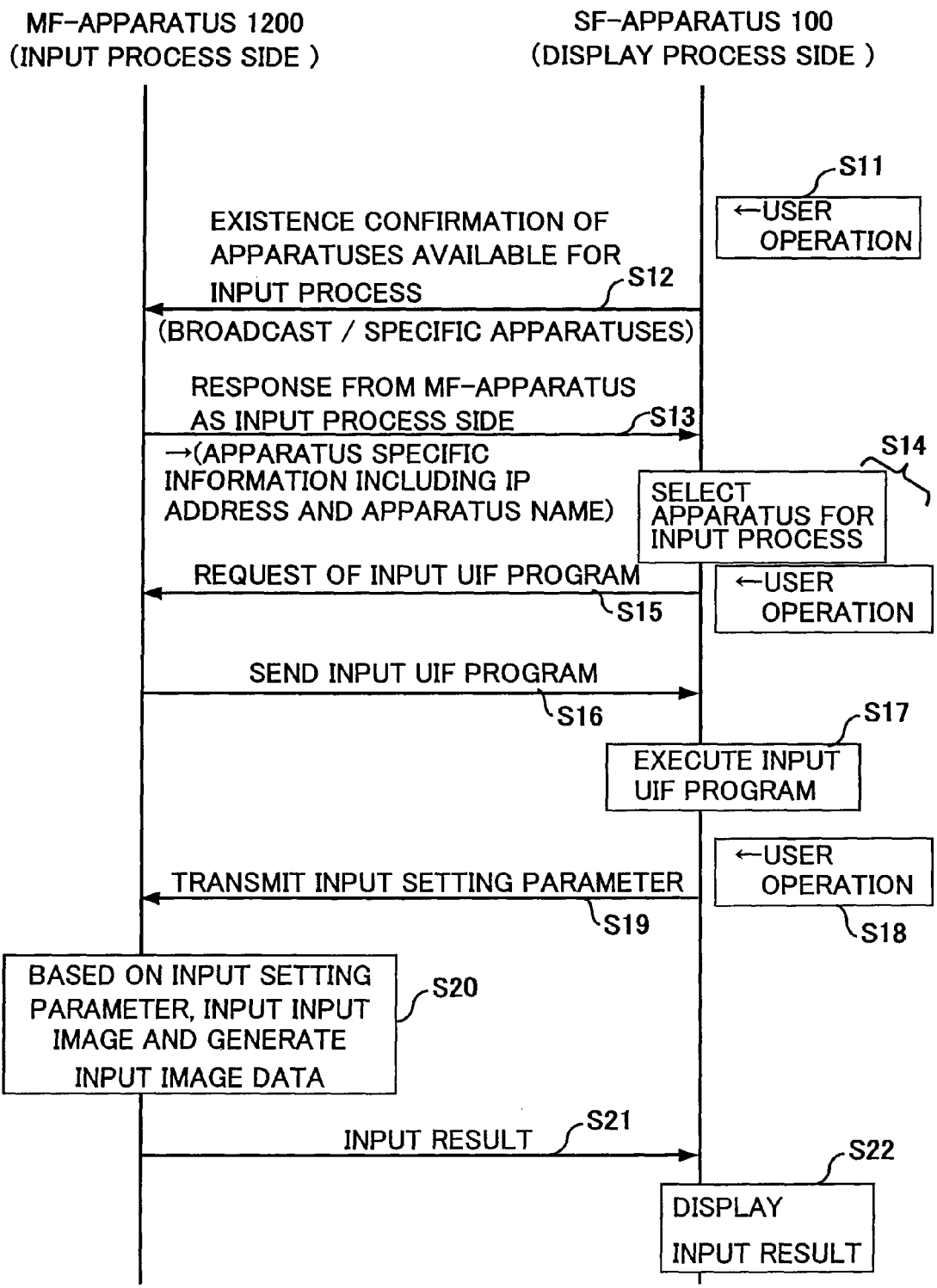
FIG. 6 is a flowchart diagram for explaining the process flow to realize a display of the input screen of the MF-apparatus at an SF-apparatus, according to the first embodiment of the present invention.

A process flow, which is conducted between the MF-apparatus 1200 and the SF-apparatus 100 in response to operations of the user at the input screen G600, will be described with reference to FIG. 6. FIG. 6 is a flowchart diagram for explaining the process flow to realize a display of the input screen G600 of the MF-apparatus 1200 at the SF-apparatus 100.

In FIG. 6, when the user selects the button 61 to indicate one apparatus for conducting the input process at the input screen G600 (step S11), the SF-apparatus 100 confirms existence of available apparatuses for the input process in respect to all apparatuses connected through the network (step S12). A method for confirming the existence of the available apparatuses may confirm all apparatuses existing on the network by a broadcast. Alternatively, the method may confirm specific apparatuses set beforehand. In response to an existence confirmation from the SF-apparatus 100, the MF-apparatus 1200 existing on the network replies to the SF-apparatus 100 with apparatus specific information including an IP address identifying the MF-apparatus 1200, an apparatus name, and a like (step S13). When the SF-apparatus 100 receives the apparatus specific information from the MF-apparatus 1200 and other apparatuses on the network, the SF-apparatus 100 displays the list of the apparatus names in the display area 610 at the input screen G600.

For example, the user selects the MF-apparatus 1200 as the apparatus for conducting the input process from the display area 610 (step S14), the SF-apparatus 100 requests the input UIF program 461 of the MF-apparatus 1200 (step S15). The MF-apparatus 1200 sends the input UIF program 461 and the input option information 433 to the SF-apparatus 100 by the FTP 3 in response to the request from the SF-apparatus 100 (step S16).

When the SF-apparatus 100 receives the input UIF program 461 and the input option information 433 from the MF-apparatus 1200, the SF-apparatus 100 executes the input UIF program 461 (step S17). By this execution, the functions that can be provided by the MF-apparatus 1200 are displayed in the display area 620 of the input screen G600 at the operation panel of the SF-apparatus. From the display area 620 displaying the functions, for example, the user selects "PICTURE", "AUTO DARKNESS", and "ONE SIDE" (step S18), the input UIF program 461 generates the input setting parameter showing "PICTURE", "AUTO DARKNESS", and "ONE SIDE", and the input setting parameter is transmitted to the MF-apparatus 1200 (step S19).

The MF-apparatus 1200 sets the input setting parameter 434 received from the SF-apparatus 100 as the input setting parameter 434. Subsequently, the input control module 410 reads in the input image 600 from the scanner 1324 in accordance with the input setting parameter 434, and generates the input image data 601 (step S20).

Since the image input/output application 1216 sets the input setting parameter received from the SF-apparatus 100 as the input setting parameter 434, the input control module 410 can conduct the input process as if the user sets at the operation panel 1310 of the MF-apparatus 1200. When the MF-apparatus 1200 completes the input process, the MF-apparatus 1200 sends an input result to the SF-apparatus 100 (step S21). At the operation panel, the SF-apparatus 100 displays the input result received from the MF-apparatus 1200 at the operation panel (step S22).

Therefore, it is possible for the user to select the desired functions from the list of the functions, which the MF-apparatus 1200 can provide, displayed at the operation panel of the SF-apparatus. Also, it is possible to have the MF-apparatus 1200 conduct the input process based on the desired functions of the user. For example, even if the SF-apparatus 100 does not have "PICTURE" function, it is possible for user to have the MF-apparatus 1200 conduct the input process by "PICTURE" function as one of the input setting parameter 434, from the SF-apparatus.

In FIG. 6, as for the input process, the process flow between the SF-apparatus 100 and the MF-apparatus 1200 is described. Also, the process flow shown in FIG. 6 can be realized between two MF-apparatuses 1200 and between two SF-apparatuses 100.

Figure 7:
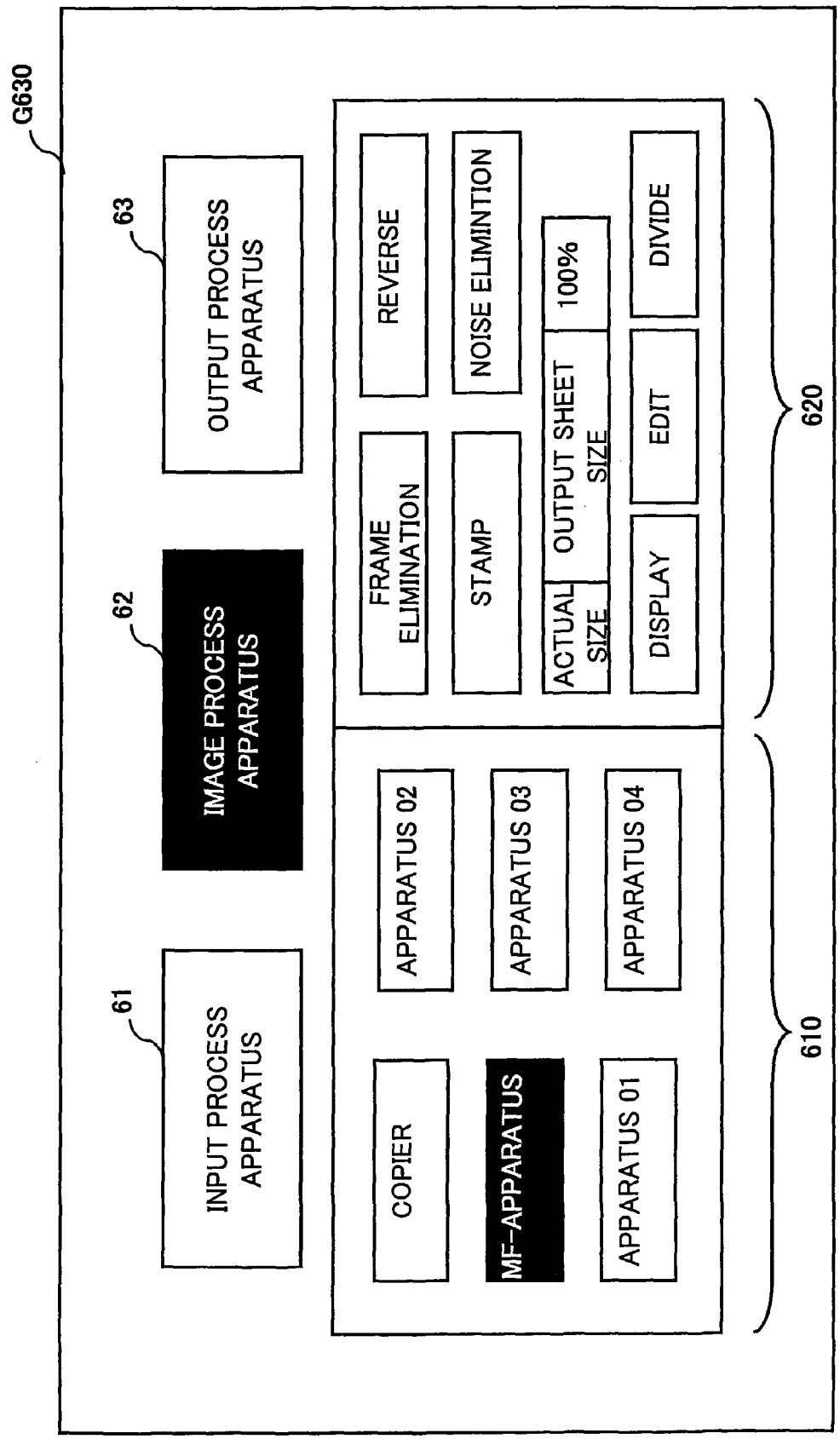
FIG. 7 is a diagram showing the example of the image process screen.

Next, an example of the image process screen based on the image process UIF program 481 and the image process option information 435 will be described with reference to FIG. 7. FIG. 7 is a diagram showing the example of the image process screen. In FIG. 7, an image process screen G630 has the same screen structure as the input screen G600. In FIG. 7, parts that are the same as the ones in FIG. 5 are indicated by the same reference numerals and the explanation thereof will be omitted. In the image process screen G630, when the user selects the button 62, the list of the apparatuses, which exist on the network and can conduct the image process, is displayed in the display area 610. When the user selects "MF-APPARATUS", the functions, which can be set for the image process, are displayed in the display area 620.

For example, the display area 620 displays "FRAME ELIMINATION" for eliminating shadows of a periphery of a sheet, "REVERSE" for copying by reversing image colors, "STAMP" for stamping the sheet to show that the image process is conducted, "NOISE ELIMINATION" for correcting noises for the input image, "ACTUAL SIZE" for processing the input image by a actual size, "OUTPUT SHEET SIZE" for processing the input image by an output sheet size, "100%" for allowing the user to indicate a magnification of the image by a ten-key, "DISPLAY" for indicating the image process including a displaying process, "EDIT" for repeating the image in a single sheet or synthesizing different images in a single sheet, "DIVIDE" for processing two pages at right and left sides into a single sheet, and alike. For example, when the user selects "FRAME ELIMINATION", "ACTUAL SIZE", and "DIVIDE", the image process setting parameter indicating "FRAME ELIMINATION", "ACTUAL SIZE", and "DIVIDE" is generated. The image process setting parameter is sent to the MF-apparatus 1200. The MF-apparatus 1200 sets the image process setting parameter received from the SF-apparatus 100 as the image process setting parameter 436. Accordingly, the image process module 440 conducts the image process in respect to the input image data 601 in accordance with the image process setting parameter 436 and generates the output image data 602.

Figure 8:
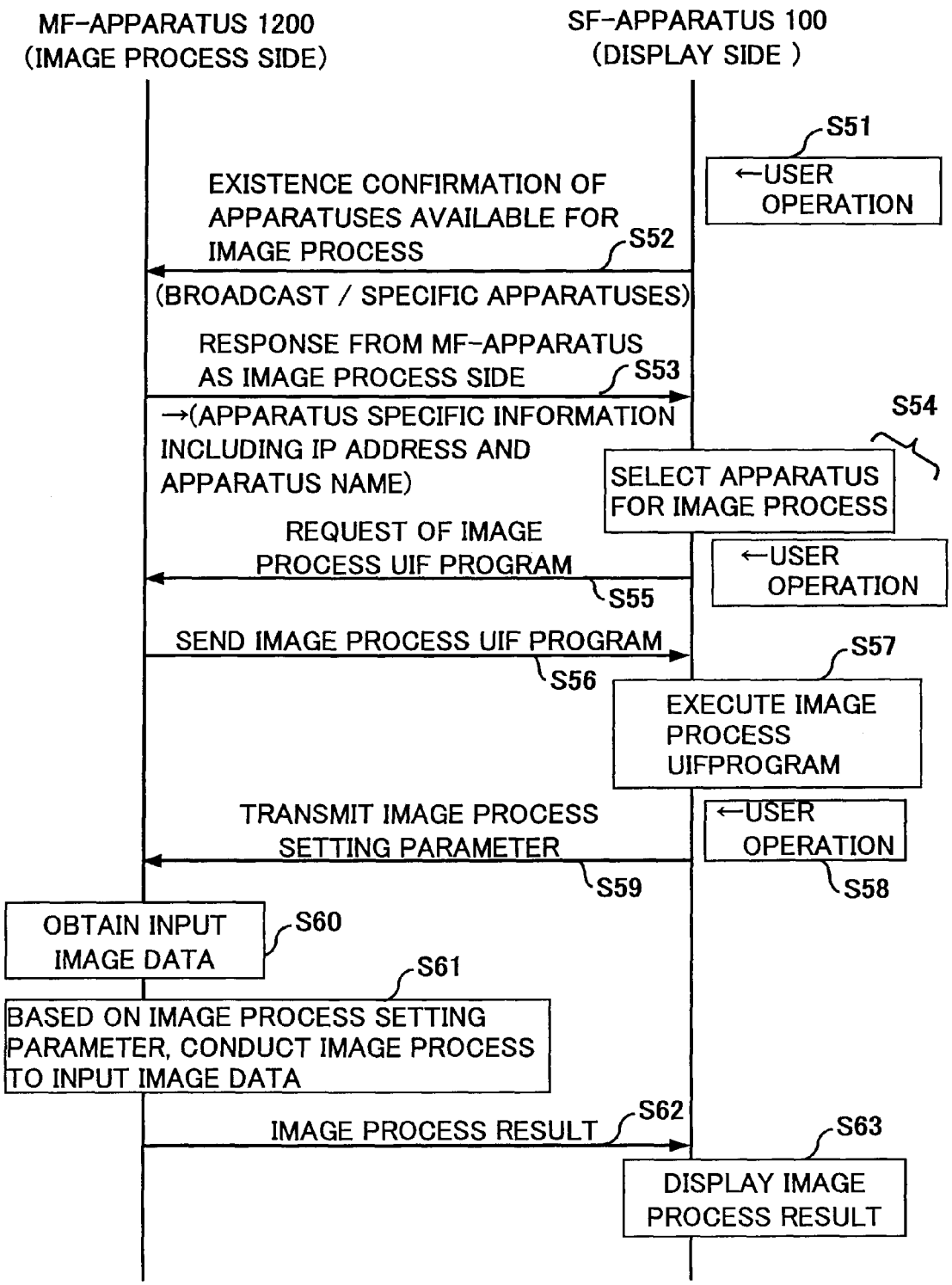
FIG. 8 is a flowchart diagram for explaining the process flow to realize a display of the image process screen of the MF-apparatus at the SF-apparatus, according to the first embodiment of the present invention.

A process flow between the MF-apparatus 1200 and the SF-apparatus 100 in accordance with operations of the user at the image process screen G630 will be described with reference to FIG. 8. FIG. 8 is a flowchart diagram for explaining the process flow to realize a display of the image process screen of the MF-apparatus 1200 at the SF-apparatus.

In FIG. 8, when the user selects the button 62 to indicate one apparatus for conducting the image process at the image process screen G630 displayed at the operation panel of the SF-apparatus 100 (step S51), the SF-apparatus 100 confirms existence of available apparatuses for the image process in respect to all apparatuses connected through the network (step S52). The method for confirming the existence of the available apparatuses can be the same method described in a case of the process flow for realizing a display of the input screen in FIG. 6. In response to an existence confirmation from the SF-apparatus, the MF-apparatus 1200 existing on the network replies to the SF-apparatus 100 with apparatus specific information including an IP address identifying the MF-apparatus 1200, an apparatus name, and a like (step S53). When the SF-apparatus 100 receives the apparatus specific information from the MF-apparatus 1200 and other apparatuses on the network, the SF-apparatus 100 displays the list of the apparatus names in the display area 610 at the image process screen G630.

For example, the user selects the MF-apparatus 1200 as the apparatus for conducting the image process from the display area 610 (step S54), the SF-apparatus 100 requests the image process UIF program of the MF-apparatus 1200 (step S55). The MF-apparatus 1200 sends the image process UIF program 481 and the image process option information 435 to the SF-apparatus 100 by the FTP 3 in response to the request from the SF-apparatus 100 (step S56).

When the SF-apparatus 100 receives the image process UIF program 481 and the image process option information 435 from the MF-apparatus 1200, the SF-apparatus 100 executes the image process UIF program 481 (step S57). By this execution, the functions that can be provided by the MF-apparatus 1200 are displayed in the display area 620 of the image process screen G630 at the operation panel of the SF-apparatus. From the display area 620 displaying the functions, for example, the user selects "FRAME ELIMINATION", "ACTUAL SIZE", and "DIVIDE" (step S58), the image process UIF program 481 generates the image process setting parameter showing "FRAME ELIMINATION", "ACTUAL SIZE", and "DIVIDE", and the image process setting parameter is transmitted to the MF-apparatus 1200 (step S59).

The MF-apparatus 1200 obtains the input image data 601 (step S60). When the input process is not conducted by the MF-apparatus 1200, the MF-apparatus 1200 obtains the input image data 601 from the SF-apparatus. The image input/output application 1216 sets the image process setting parameter received from the SF-apparatus 100 as the image process setting parameter 436. The image process module 440 conducts the image process in respect to the input image data 601 in accordance with the image process setting parameter 436 and generates the output image data 602 (step S61).

Since the image input/output application 1216 sets the image process setting parameter received from the SF-apparatus 100 as the image process setting parameter 436, the image process module 440 can conduct the image process as if the user sets at the operation panel 1310 of the MF-apparatus 1200. When the MF-apparatus 1200 completes the image process, the MF-apparatus 1200 sends an image process result to the SF-apparatus 100 (step S62). At the operation panel, the SF-apparatus 100 displays the image process result received from the MF-apparatus 1200 (step S63).

In FIG. 8, as for the image process, the process flow between the SF-apparatus 100 and the MF-apparatus 1200 is described. Also, the process flow shown in FIG. 8 can be realized between two MF-apparatuses 1200 and between two SF-apparatuses. It is possible for the user to select the desired functions from the list of the functions, which the MF-apparatus 1200 can provide, displayed at the operation panel of the SF-apparatus. Also, it is possible to have the MF-apparatus 1200 conduct the image process based on the desired functions of the user.

Figure 9:
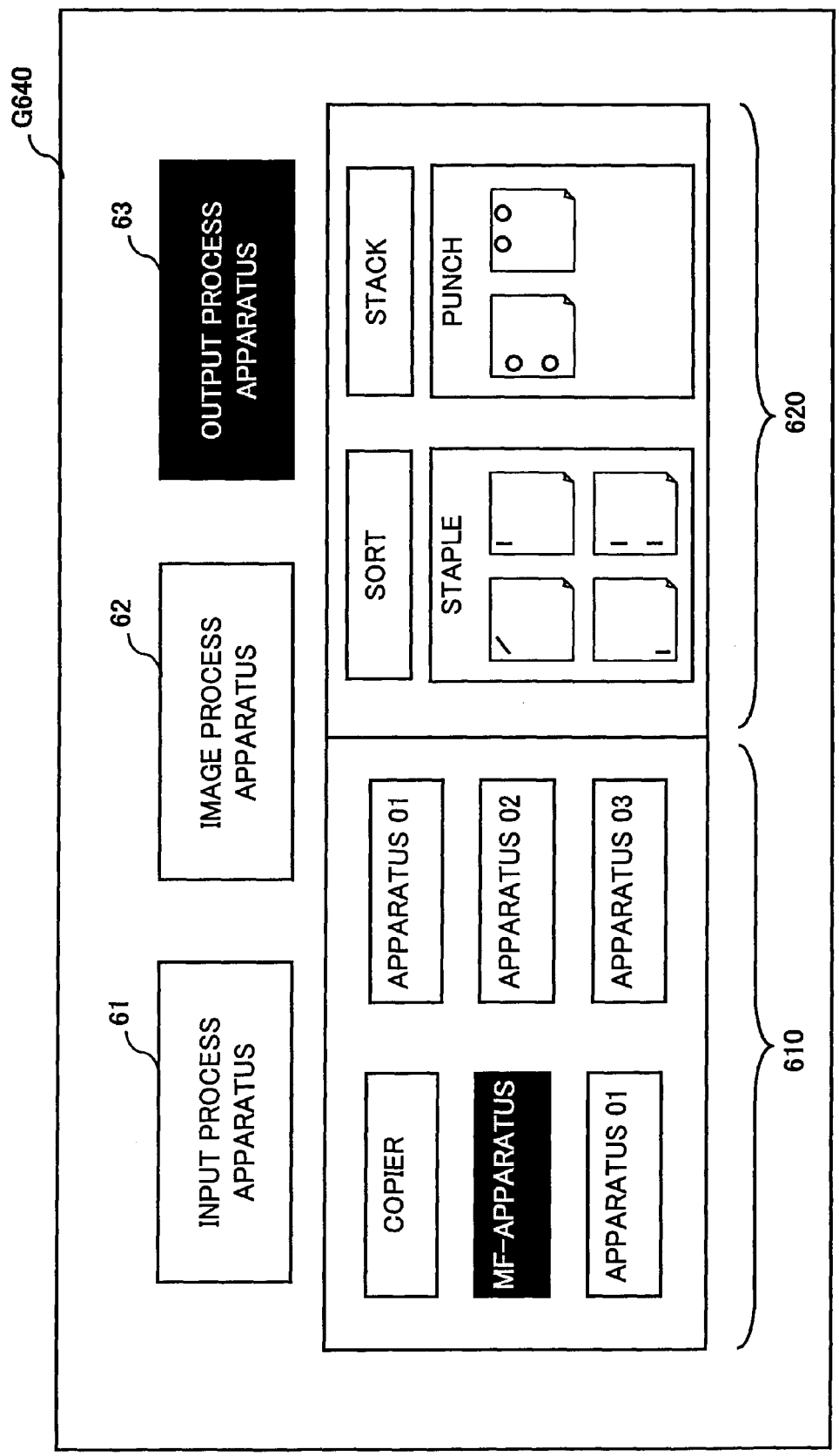
FIG. 9 is a diagram showing the example of the output screen.

Next, an example of the output screen based on the output UIF program 471 and the output option information 432 will be described with reference to FIG. 9. FIG. 9 is a diagram showing the example of the output screen. In FIG. 9, an output screen G640 has the same screen structure as the input screen G600. In FIG. 9, parts that are the same as the ones in FIG. 5 are indicated by the same reference numerals and the explanation thereof will be omitted.

In the output screen G640, when the user selects the button 63, the list of the apparatuses, which exist on the network and can conduct the output process, is displayed in the display area 610. When the user selects "MF-APPARATUS", the functions, which can be set for the output process, are displayed in the display area 620.

For example, the display area 620 displays "SORT" for output in a page order for each document set, "STACK" for output for each page, "STAPLE" showing four stapling methods by four icons, "PUNCH" showing two punching methods by two icons, and a like. For example, when the user selects one of four icons showing the four stapling methods, the output setting parameter indicating "SORT" and one of methods of "STAPLE" is generated. The output setting parameter is sent to the MF-apparatus 1200. The image input/output application 1216 of the MF-apparatus 1200 sets the output setting parameter received from the SF-apparatus 100 as the output setting parameter 432. Accordingly, the output control module 420 conducts the output process in respect to the output image data 602 in accordance with the output setting parameter 432 so as to form an image on a sheet as the output image 603 and outputs the output image 603 by the plotter 1321.

Figure 10:
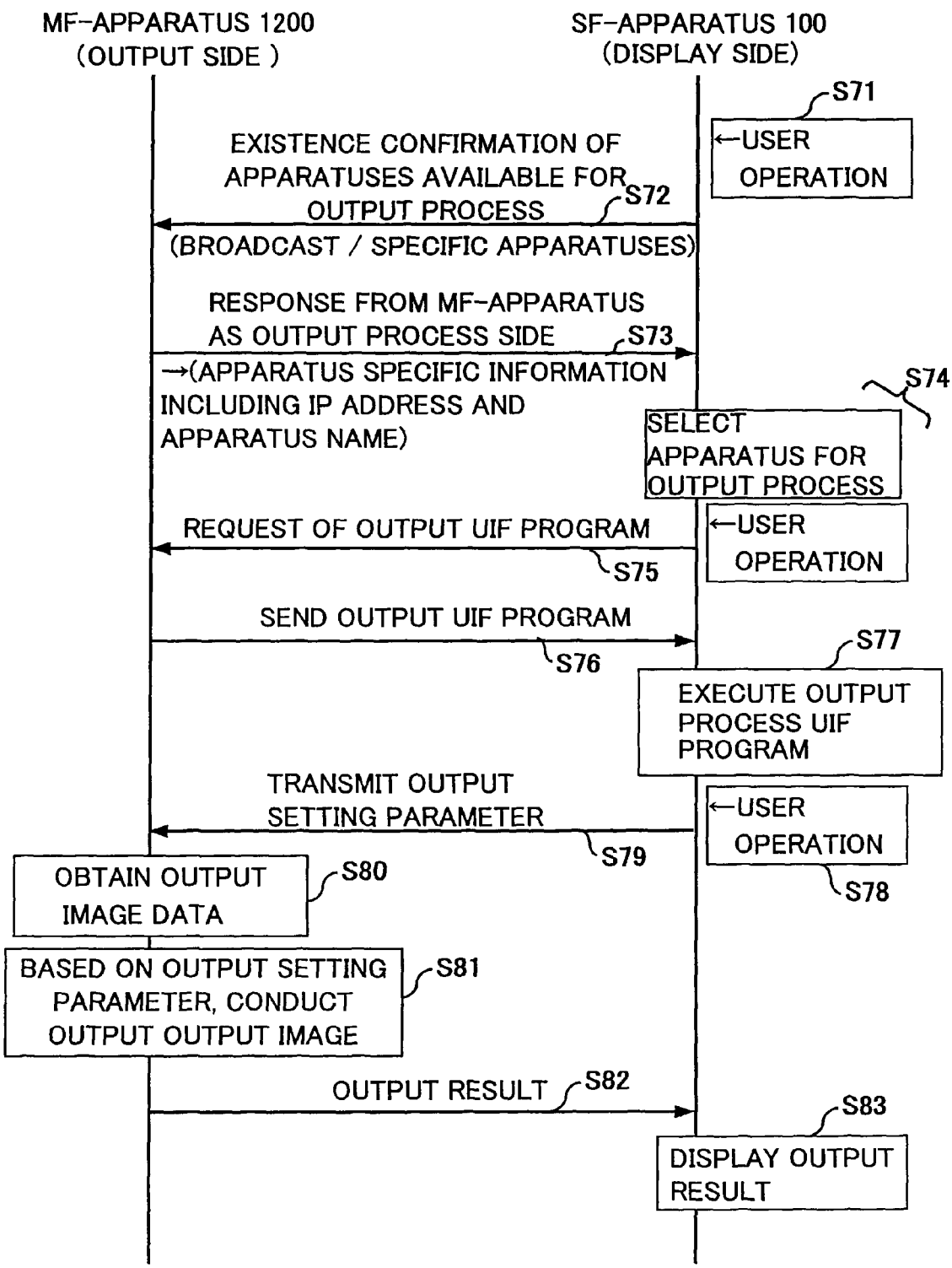
FIG. 10 is a flowchart diagram for explaining the process flow to realize a display of the output screen of the MF-apparatus at the SF-apparatus, according to the first embodiment of the present invention.

A process flow between the MF-apparatus 1200 and the SF-apparatus 100 in accordance with operations of the user at the output screen G640 will be described with reference to FIG. 10. FIG. 10 is a flowchart diagram for explaining the process flow to realize a display of the output screen of the MF-apparatus at the SF-apparatus.

In FIG. 10, when the user selects the button 63 to indicate one apparatus for conducting the output process at the output screen G640 displayed at the operation panel of the SF-apparatus 100 (step S71), the SF-apparatus 100 confirms existence of available apparatuses for the output process in respect to all apparatuses connected through the network (step S72). The method for confirming the existence of the available apparatuses can be the same method described in a case of the process flow for realizing the display of the input screen G600 in FIG. 6. In response to an existence confirmation from the SF-apparatus 100, the MF-apparatus 1200 existing on the network replies to the SF-apparatus 100 with apparatus specific information including an IP address identifying the MF-apparatus 1200, an apparatus name, and a like (step S73). When the SF-apparatus 100 receives the apparatus specific information from the MF-apparatus 1200 and other apparatuses on the network, the SF-apparatus 100 displays the list of the apparatus names in the display area 610 at the output screen G640.

For example, the user selects the MF-apparatus 1200 as the apparatus for conducting the output process from the display area 610 (step S74), the SF-apparatus 100 requests the output UIF program 471 of the MF-apparatus 1200 (step S75). The MF-apparatus 1200 sends the output UIF program 471 and the output option information 431 to the SF-apparatus 100 by the FTP 3 in response to the request from the SF-apparatus 100 (step S76).

When the SF-apparatus 100 receives the output UIF program 471 and the output option information 431 from the MF-apparatus 1200, the SF-apparatus 100 executes the output UIF program 471 (step S77). By this execution, the functions that can be provided by the MF-apparatus 1200 are displayed in the display area 620 of the output screen G640 at the operation panel of the SF-apparatus. From the display area 620 displaying the functions, for example, the user selects one of four icons corresponding to the four stapling methods (step S78), the output UIF program 471 generates the output setting parameter indicating "SORT" and "STAPLE", and then the output setting parameter is transmitted to the MF-apparatus 1200 (step S79).

The MF-apparatus 1200 obtains the output image data 602 (step S80). When the output process is not conducted by the MF-apparatus 1200, the MF-apparatus 1200 obtains the output image data 602 from the single functional processing apparatus. The output setting parameter, which is received from the SF-apparatus, is set to be the output setting parameter 432. Then, the output control module 420 conducts the output process in respect to the output image data 602 in accordance with the output setting parameter 432 so as to form an image on the sheet as the output image 603 and then outputs the output image 603 (step S81).

Since the output setting parameter received from the SF-apparatus 100 is set as the output setting parameter 432, the output control module 420 can conduct the output process as if the user set at the operation panel 1310 of the MF-apparatus 1200. When the MF-apparatus 1200 completes the output process, the output result is sent to the SF-apparatus 100 (step S82). At the operation panel, the SF-apparatus 100 displays the output result received from the MF-apparatus 1200 (step S83).

In FIG. 10, as for the output process, the process flow between the SF-apparatus 100 and the MF-apparatus 1200 is described. Also, the process flow shown in FIG. 10 can be realized between two MF-apparatuses 1200 and between two SF-apparatuses. It is possible for the user to select the desired functions from the list of the functions, which the MF-apparatus 1200 can provide, displayed at the operation panel of the SF-apparatus. Also, it is possible to have the MF-apparatus 1200 conduct the output process based on the desired functions of the user.

Figure 11:
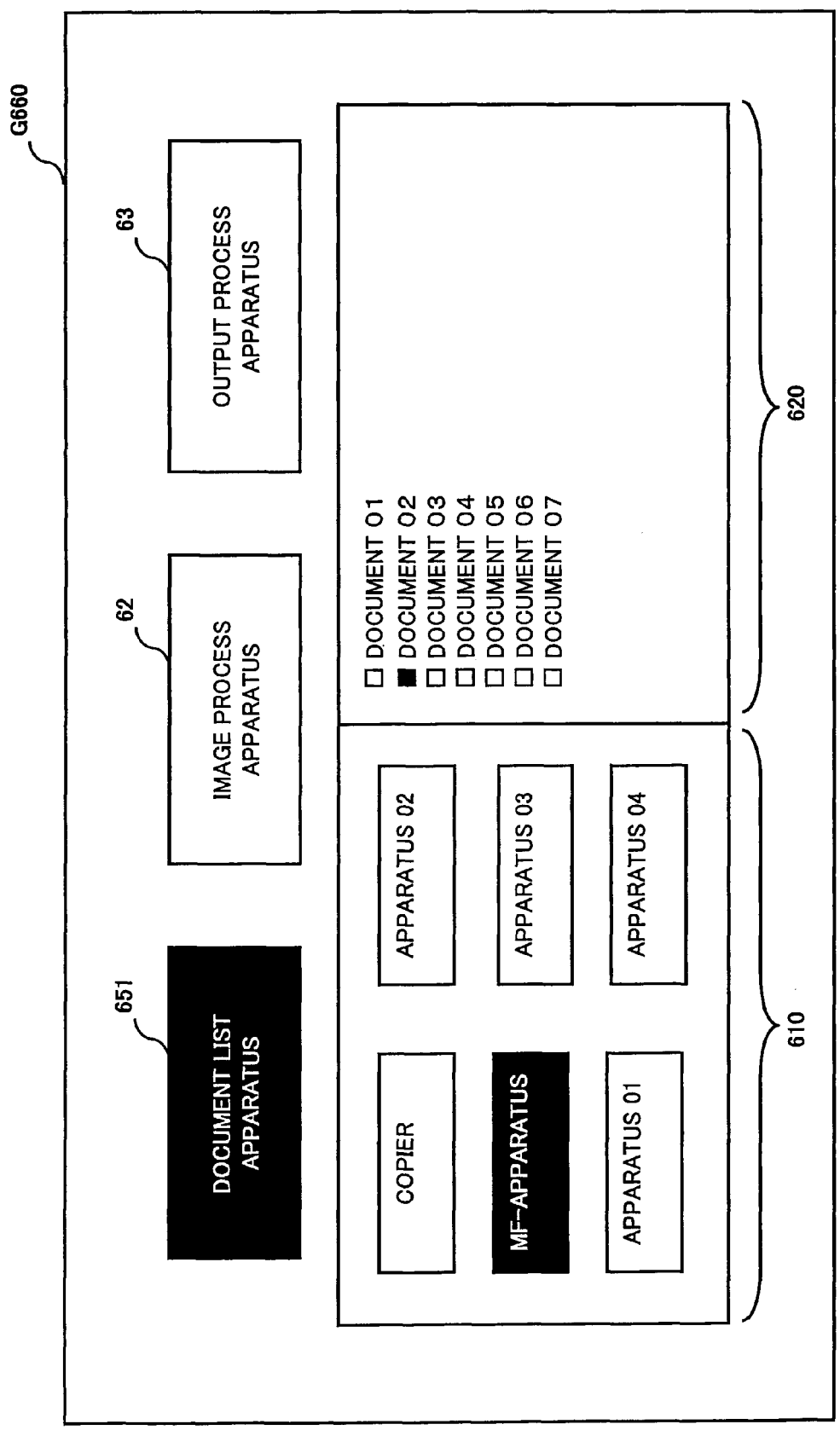
FIG. 11 is a diagram showing the example of the document list screen.

Next, an example of a document list screen provided by the document list application 1218 of the MF-apparatus 1200 will be described. FIG. 11 is a diagram showing the example of the document list screen. In FIG. 11, a document list screen G660 has the same screen structure as the input screen G600.

In FIG. 11, parts that are the same as the ones in FIG. 5 are indicated by the same reference numerals and the explanation thereof will be omitted. The document list screen G660 includes a button 651 for indicating one apparatus for displaying a document list, instead of the button 61 for indicating one apparatus for the input process at the input screen G600. In the document list screen G660, when the user selects the button 651, the list of the apparatuses, which exist on the network and can store documents, is displayed in the display area 610 in the same manner as the input screen G600. When the user selects "MF-APPARATUS", the list of the documents stored in the MF-apparatus 1200 is displayed in the display area 620.

For example, the display area 620 displays "DOCUMENT 01", "DOCUMENT 02", "DOCUMENT 03", . . . , "DOCUMENT 07", as the document names. For example, when the user selects "DOCUMENT 02" and then selects the buttons 62 and 63, it is possible for the user to have desired apparatuses conduct the image process and the output process, respectively.

Figure 12:
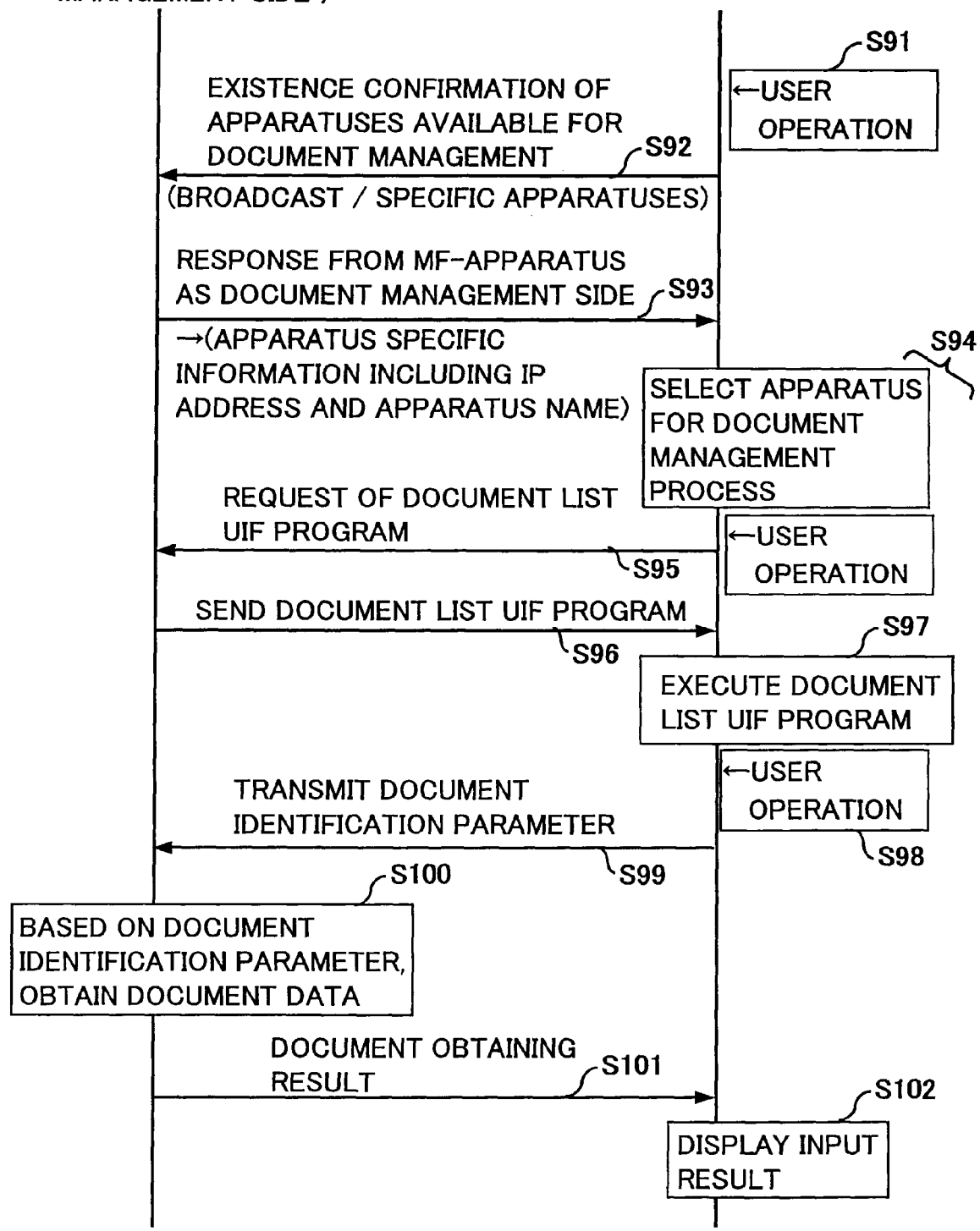
FIG. 12 is a flowchart diagram for explaining the process flow to realize a display of the document list screen of the MF-apparatus at the SF-apparatus, according to the first embodiment of the present invention.

A process flow between the MF-apparatus 1200 and the SF-apparatus 100 in accordance with operations of the user at the document list screen G660 will be described with reference to FIG. 12. FIG. 12 is a flowchart diagram for explaining the process flow to realize a display of the document list screen of the MF-apparatus at the SF-apparatus. The document list application 1217 has a similar functional configuration to the image input/output application 1216. The document list application 1217 includes a UIF control module for controlling a display flow of the document list UIF that generates screen information configuring a screen for the document list, and a control module for obtaining document information specifying each document stored in HD 1303.

In FIG. 12, when the user selects the button 651 to indicate one apparatus for managing the documents at the document list screen G660 displayed at the operation panel of the SF-apparatus 100 (step S91), the SF-apparatus 100 confirms existence of available apparatuses for the output process in respect to all apparatuses connected through the network (step S92). The method for confirming the existence of the available apparatuses can be the same method described in the case of the process flow for realizing the display of the input screen G600 in FIG. 8. In response to an existence confirmation from the SF-apparatus, the MF-apparatus 1200 existing on the network replies to the SF-apparatus 100 with apparatus specific information including an IP address identifying the MF-apparatus 1200, an apparatus name, and a like (step S93). When the SF-apparatus 100 receives the apparatus specific information from the MF-apparatus 1200 and other apparatuses on the network, the SF-apparatus 100 displays the list of the apparatus names in the display area 610 at the document list screen G660.

For example, the user selects the MF-apparatus 1200 as the apparatus for conducting the output process from the display area 610 (step S94), the SF-apparatus 100 requests a document list UIF program of the MF-apparatus 1200 (step S95). The MF-apparatus 1200 sends the document list UIF program and document list option information to the SF-apparatus 100 by the FTP 3 in response to the request from the SF-apparatus 100 (step S96).

When the SF-apparatus 100 receives the document list UIF program and the document list option information from the MF-apparatus 1200, the SF-apparatus 100 executes the document list UIF program (step S97). By this execution, the documents that can be provided by the MF-apparatus 1200 are displayed in the display area 620 of the document list screen G660 at the operation panel of the SF-apparatus. From the display area 620 displaying the documents, for example, the user selects "DOCUMENT 02" (step S98), the document list UIF program generates the document list setting parameter indicating "DOCUMENT 02". The document list setting parameter is transmitted to the MF-apparatus 1200 (step S99).

The MF-apparatus 1200 sets the document list setting parameter received from the SF-apparatus 100 as a document list setting parameter of the MF-apparatus 1200, and then obtains the document information from the HD 1303 in accordance with the document list setting parameter by the control module (step S100). The document list setting parameter received from the SF-apparatus 100 as the document list setting parameter of the MF-apparatus 1200. Therefore, the control module can conduct a process concerning the document list as if the user sets at the operation panel 1310 of the MF-apparatus 1200. The MF-apparatus 1200 sends a document obtaining result to the SF-apparatus 100 (step S101). At the operation panel, the SF-apparatus 100 displays the document obtaining result received from the MF-apparatus 1200 (step S102).

In FIG. 12, as for the output process, the process flow between the SF-apparatus 100 and the MF-apparatus 1200 is described. Also, the process flow shown in FIG. 12 can be realized between two MF-apparatuses 1200 and between two SF-apparatuses. It is possible for the user to select the desired documents from the list of the documents, which the MF-apparatus 1200 can provide, displayed at the operation panel of the SF-apparatus. Also, it is possible to have the MF-apparatus 1200 conduct the image process or the output process based on the document information of the desired documents by the user.

The process patterns 1 through 4 based on various combinations of the input process, the image process, and the output process shown in FIG. 4 using user interfaces, which are realized by the screens G600, G630, and G640 described in FIG. 6 through FIG. 12, will be described in detail with reference to FIG. 13 through FIG. 16. For example, an SF-apparatus (SF-apparatus) 100 shown in FIG. 13 through FIG. 16 is a single copier having only a copying function. For example, the SF-apparatus 100 includes an input processing part 102 for reading in the input image 600 formed on a sheet, an image processing part 104 for conducting the image process in respect to the input image data generated by reading in the input image 600, an output processing part 106 for forming output image data 603, which the image process is conducted to, on the sheet and outputting the sheet as the output image 603, an operation panel 120 operated by the user, and an operation controlling part 110 for controlling a display of the operation panel 120.

Moreover, the operation controlling part 110 includes at least an input UIF 112 for providing screen information to display the input screen G600 as shown FIG. 5, an image process UIF 113 for providing the screen information to display the image process screen G630 as shown in FIG. 7, an output UIF 114 for providing the screen information to display the output screen G640 as shown in FIG. 9, an OCS 116 for controlling the operation panel 120 based on the screen information provided from each of the input UIF 112, the image process UIF 113, and the output UIF 114, in respect to the operation panel 120.

Furthermore, when each user interface program realizing the input UIF 112, the image process UIF 113, and the output UIF 114 is a Java™ program, the operation controlling part 110 includes a Java™ VM 118. In the SF-apparatus 100, all process parts including the OCS 116, the input UIF 112, the image process UIF 113, and the output UIF 114 can be realized by the Java™ programs. In this case, even if the OCS 116 is not included in the SF-apparatus 100, the SF-apparatus 100 can be compatible to the MF-apparatus 1200.

In FIG. 13 through FIG. 16, parts shown by dashed lines other than the Java™ VM 450 and the Java™ VM 118 are originally provided in the MF-apparatus 1200 and the SF-apparatus 100 but not used in each of the process patterns 1 through 4. In addition, parts shown by double lines are replaced with data file sent from the MF-apparatus 1200 or the SF-apparatus 100.

Process Pattern 1

Figure 13:
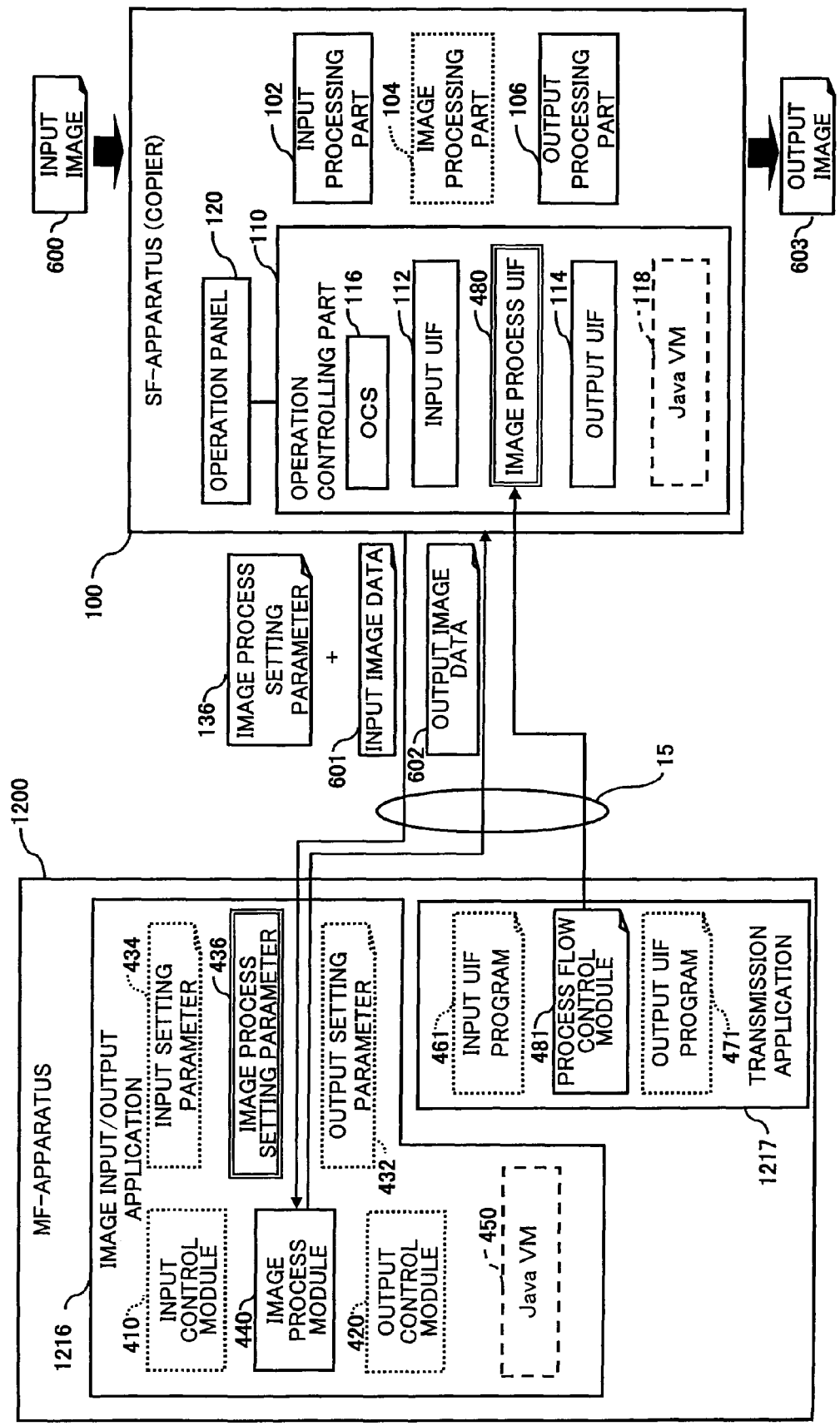
FIG. 13 is a diagram showing an example of the process pattern 1 shown in FIG. 4, according to the first embodiment of the present invention.

FIG. 13 is a diagram showing an example of the process pattern 1 shown in FIG. 4. In FIG. 3, the display process, the input process, and the output process are conducted by the SF-apparatus 100, and only the image process is conducted by the MF-apparatus 1200.

First, when the user selects the SF-apparatus 100 itself as an apparatus for the input process at the operation panel 120, by the input UIF 112 originally provided in the SF-apparatus 100, the functions for the input process that the SF-apparatus 100 can provide are displayed at the operation panel 120. When the user selects the functions, the input UIF 112 generates the input setting parameter (not shown) showing the functions set by the user. The input processing part 102 reads in the input image 600 in accordance with the input setting parameter (not shown) that is generated by the input UIF 112 so as to indicate the function set by the user and generates the input image data 601.

Next, when the user selects the MF-apparatus 1200 as an apparatus for conducting the image process from the operation panel 120, in accordance with the process flow shown in FIG. 8, the image process UIF 113 is replaced with the image process UIF 480 of the MF-apparatus 1200 realized by the image process UIF program 481 and the image process option information 435 that are obtained from the MF-apparatus 1200. The image process UIF 480 displays the function that the MF-apparatus 1200 can provide, at the operation panel 120 through the OCS 116. When the user selects the functions, the image process 480 generates an image process setting parameter 136 indicating the function set by the user. The SF-apparatus 100 transmits the input image data 601 generated by the image process setting parameter 136 and the input processing part 102, to the MF-apparatus 1200. The input image data 601 can be transmitted in response to a request from the image input/output application 1216 of the MF-apparatus 1200.

The image input/output application 1216 of the MF-apparatus 1200 replaces the image process setting parameter 436 with the image process setting parameter 136 received from the SF-apparatus 100. And the image process module 440 conducts the image process in respect to the input image data 601 received from the SF-apparatus 100 based on the image process setting parameter 436, and generates the output image data 602 as a result. The output image data 602 is transmitted to the SF-apparatus 100. The output image data 602 can be transmitted in response to a request from the SF-apparatus 100.

When the user selects the SF-apparatus 100 itself as an apparatus for the output process at the operation panel 120, by the output UIF 114 originally provided in the SF-apparatus 100, the functions for the output process that the SF-apparatus 100 can provide are displayed, at the operation panel 120. When the user selects the functions, the output UIF 114 generates the output setting parameter (not shown) indicating the functions set by the user. The output processing part 106 forms the output image data 602 on the sheet in accordance with the output setting parameter (not shown) that is generated by the output UIF 114 so as to indicate the functions set by the user, and then outputs the output image 603.

As described above, the user can have the MF-apparatus 1200 conduct the image process only through a network 15.

Process Pattern 2

Figure 14:
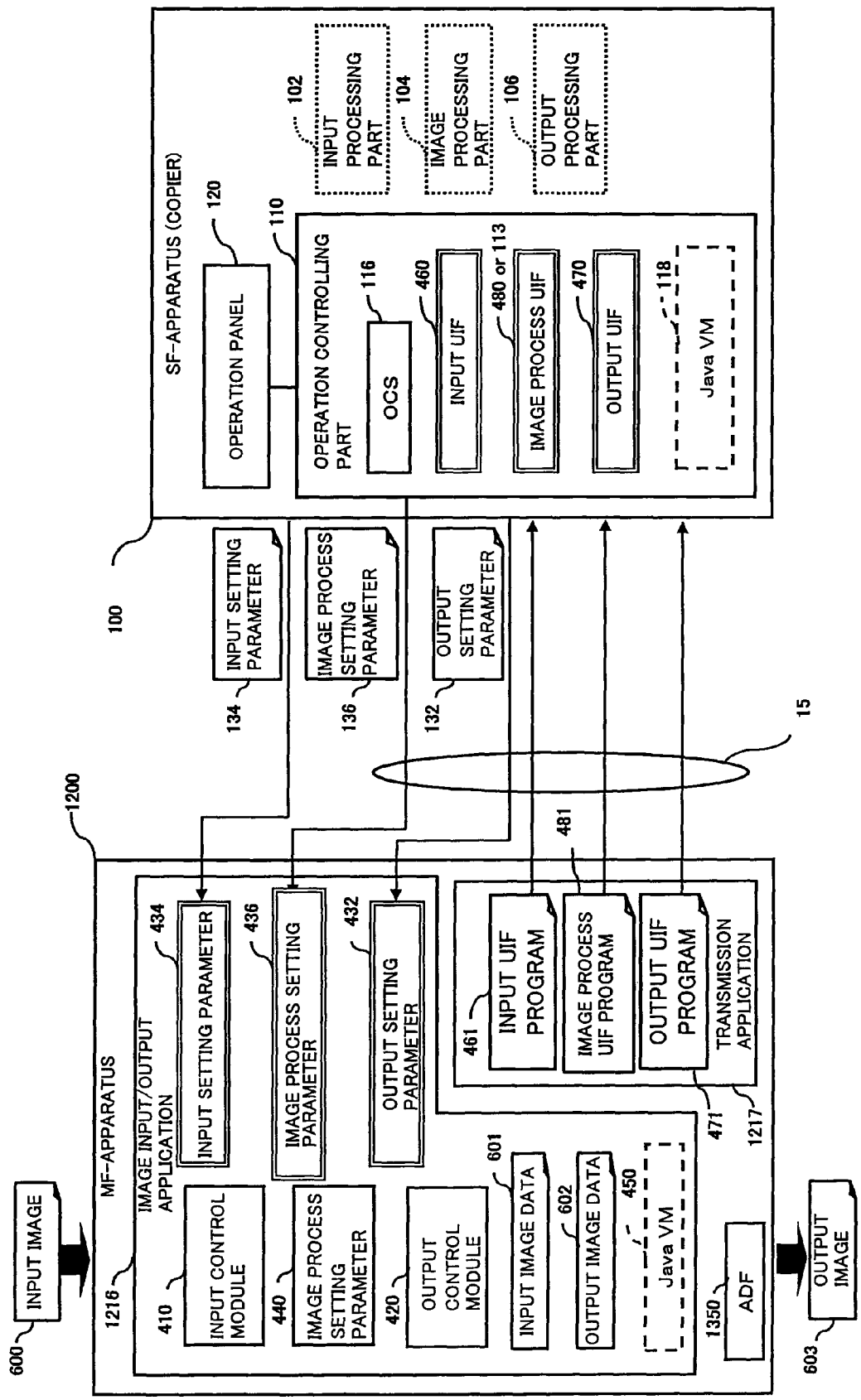
FIG. 14 is a diagram showing an example of the process pattern 2 shown in FIG. 4, according to the first embodiment of the present invention.

FIG. 14 is a diagram showing an example of the process pattern 2 shown in FIG. 4. In FIG. 14, only the display process is conducted by the SF-apparatus 100, and the input process, the image process, and the output process are conducted by the MF-apparatus 1200.

In FIG. 14, when the user selects the MF-apparatus 1200 as an apparatus for the input process, the image process, and the output process at the operation panel 120 of the SF-apparatus 100, in accordance with the process flow shown in FIG. 6, the original input UIF 112 (not shown) is replaced with the input UIF 460 of the MF-apparatus 1200 realized by the input UIF program 461 and the input option information 433 that are obtained from the MF-apparatus 1200. The input UIF 460 displays the functions for the input process that the MF-apparatus 1200 can provide, at the operation panel 120 through the OCS 116. After that, the input setting parameter 134, which is generated by the input UIF 460 so as to indicate the functions set by the user, is sent to the MF-apparatus 1200.

In the MF-apparatus 1200, the input setting parameter 113 is replaced as the input setting parameter 434 of the image input/output application 1216. The input control module 410 reads in the input image 600 and generates the input image data 601 at the MF-apparatus 1200.

Similarly, in accordance with the process flow shown in FIG. 8, the image process UIF 480, which replaces the original image process UIF 113 (not shown) at the SF-apparatus 100, displays the image process screen of the MF-apparatus 1200. The image process setting parameter 436 of the MF-apparatus 1200 is replaced with the image process setting parameter 136 that indicates the functions for the image process set by the user from the image process screen of the MF-apparatus 1200 and is received from the SF-apparatus 100. The image process module 440 generates the output image data 602 based on the image process setting parameter 436.

Similarly, in accordance with the process flow shown in FIG. 10, the output UIF 470, which replaces the original output UIF 114 (not shown) at the SF-apparatus 100, displays the output screen of the MF-apparatus 1200. The output setting parameter 432 of the MF-apparatus 1200 is replaced with the output setting parameter 132, that indicates the functions for the image process set by the user from the image process screen of the MF-apparatus 1200 and is received from the SF-apparatus 100. The output control module 420 outputs the output image data 602 based on the output setting parameter 432.

As described above, it is possible for the user to have the MF-apparatus 1200 conduct all of the input process, the image process, and the output process through the network 15. Alternatively, the image process can be conducted at the SF-apparatus 100. In this case, the SF-apparatus 100 may obtain the input image data 601 from the MF-apparatus 1200, and send the output image data 602 generated after the image process is conducted to the input image data 601, as well as the output setting parameter 132.

Process Pattern 3

Figure 15:
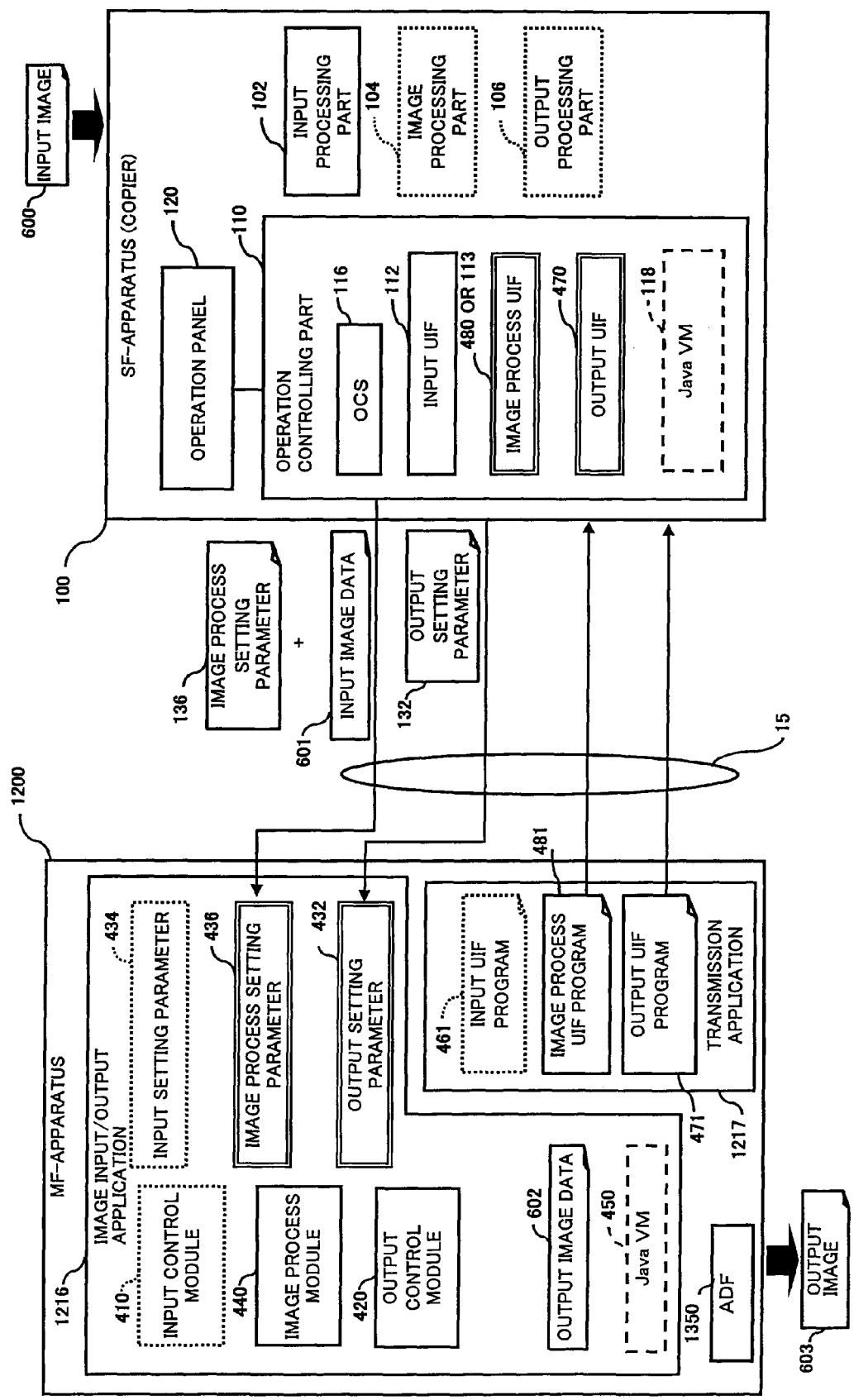
FIG. 15 is a diagram showing an example of the process pattern 3 shown in FIG. 4, according to the first embodiment of the present invention.

FIG. 15 is a diagram showing an example of the process pattern 3 shown in FIG. 4. In FIG. 15, the display process and the input process are conducted the SF-apparatus 100 and the image process and the output process are conducted by the MF-apparatus 1200.

In FIG. 15, when the user selects the SF-apparatus 100 as an apparatus for conducting the input process at the operation panel 120 of the SF-apparatus 100 and selects the MF-apparatus 1200 as an apparatus for the image process and the output process, the input processing part 102 of the SF-apparatus 100 reads in the input image 600, and generates the input image data 601. After that, similar to the process pattern 1 shown in FIG. 13, the image process UIF 113 (not shown) originally provided in the SF-apparatus 100 is replaced with an image process UIF 480 of the MF-apparatus 1200. After that, in the image input/output application 1216 of the MF-apparatus 1200, in accordance with the image process setting parameter 436 replaced with the image process setting parameter 136 received from the SF-apparatus 100, the image process module 440 generates the output image data 602. Moreover, similar to the process pattern 2 shown in FIG. 14, the original output UIF 114 (not shown) of the SF-apparatus 100 is replaced with the output UIF 470 of the MF-apparatus 1200. After that, in the image input/output application 1216 of the MF-apparatus 1200, in accordance with the output setting parameter 432 replaced with the output setting parameter 132 received from the SF-apparatus 100, the output control module 420 outputs the output image 603.

As described above, the user can conduct the input process alone at the SF-apparatus 100, and have the MF-apparatus 1200 conduct the image process and the output process. Alternatively, the image process can be conducted by the SF-apparatus 100. In this case, the SF-apparatus 100 may send the output image data 602 generated after the image process is conduct to the input image data 601 generated by the input processing part 102, with the output setting parameter 132.

The Process Pattern 4

Figure 16:
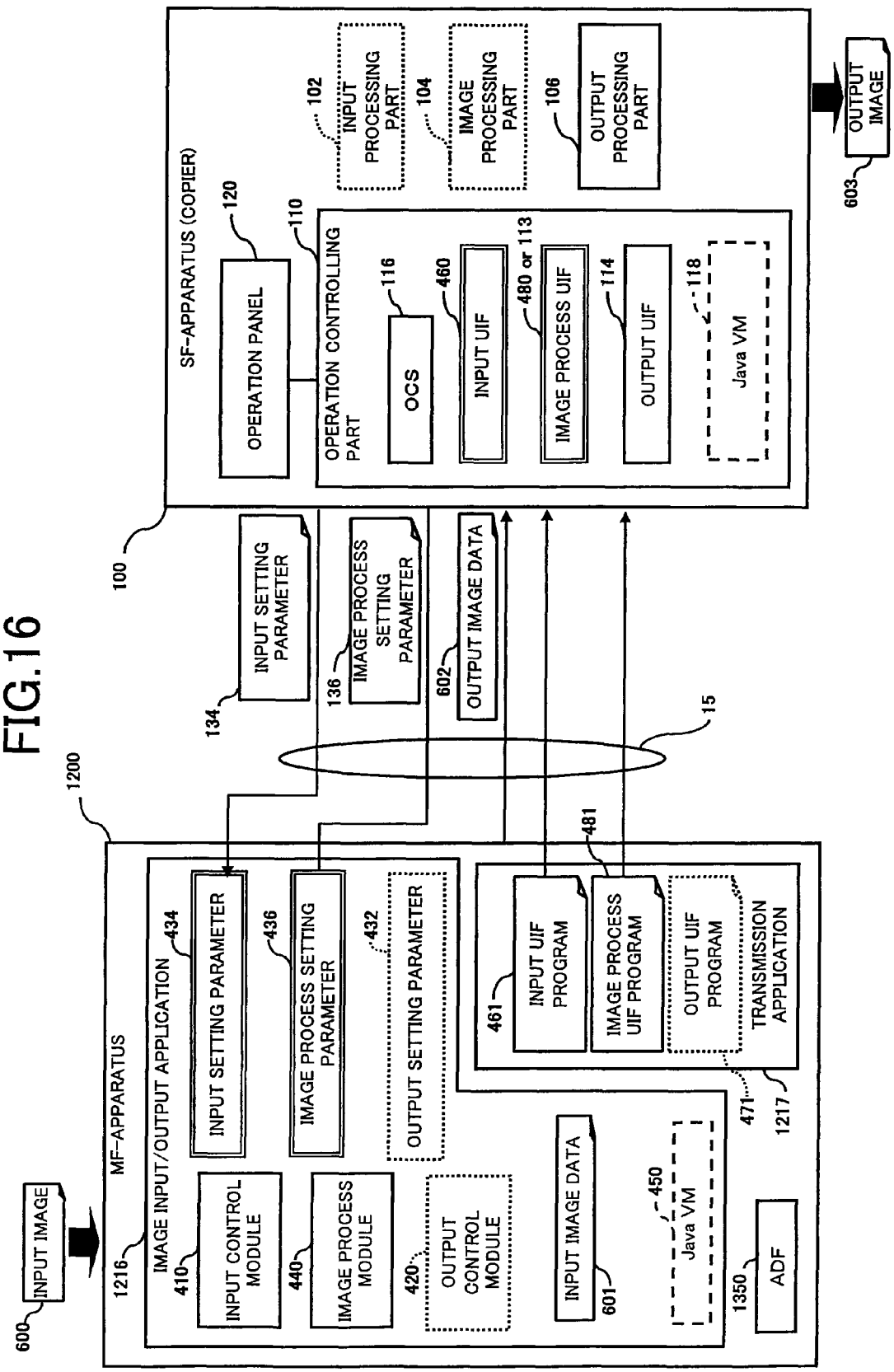
FIG. 16 is a diagram showing an example of the process pattern 4 shown in FIG. 4, according to the first embodiment of the present invention.

FIG. 16 is a diagram showing an example of the process pattern 4 shown in FIG. 4. In FIG. 16, the display process and output process are conducted by the SF-apparatus 100, and the input process and the image process are conducted by the MF-apparatus 1200.

In FIG. 16, when the user selects the SF-apparatus 100 as an apparatus for conducting the input process and the output process at the operation panel 120 of the SF-apparatus 100, and selects the MF-apparatus 1200 as an apparatus for conducting the image process, similar to the process pattern 2 shown in FIG. 14, the input UIF 112 (not shown) originally provided in the SF-apparatus 100 is replaced with the input UIF 460 of the MF-apparatus 1200. After that, in the image input/output application 1216 of the MF-apparatus 1200, in accordance with the input setting parameter 434 replaced with the input setting parameter 134 received from the SF-apparatus 100, the input control module 410 generates the input image data 601. Moreover, the original image process UIF 113 (not shown) of the SF-apparatus 100 is replaced with the image process UIF 480 of the MF-apparatus 1200. After that, in the image input/output application 1216 of the MF-apparatus 1200, in accordance with the image process setting parameter 436 replaced with the image process setting parameter 136 received from the SF-apparatus 100, the image process module 440 generates the output image data 602. Subsequently, when the SF-apparatus 100 obtains the output image data 602 from the MF-apparatus 1200, the output process is conducted by the output processing part 106, and outputs the output image 603.

As described above, it is possible for the user at the SF-apparatus 100 to have the MF-apparatus 1200 conduct the input process and the image process. Alternatively, the image process can be conducted by the SF-apparatus 100. In this case, the SF-apparatus 100 obtains the input image data 601 from the MF-apparatus 1200, and sends the output image data 602 generated after the image process is conducted to the input image data 601, with the output setting parameter 132.

Regarding the process patterns 1 through 4, a case is described in that the MF-apparatus 1200 and the SF-apparatus 100 are connected to each other through the network 15. Alternatively, the present invention can be applied to more than three image processing apparatuses connecting to each other through the network 15.

As described above, in the first embodiment, it is possible to input the input image 600 by utilizing an option (the ADF, a both sides ADF, or a like) pertaining to the MF-apparatus 1200 connected to any image processing apparatus through the network 15. For example, by using the MF-apparatus 1200 having the both sides ADF 1350, the user can consecutively input the input image 600 (a plurality of documents) having an image on both sides, and also can output from the SF-apparatus 100 (copier) having only a press board.

Moreover, by using an option (finisher such as a punch or a stapler) pertaining to the MF-apparatus 1200, the user can output the output image 603 at the MF-apparatus 1200 connected to any SF-apparatus 100 through the network 15. For example, by using higher functions by full options, it is possible to output the output image 603 from the copier having a single function or a personal computer (PC). Since the output UIF program 471 and the output setting parameter 432 are obtained through the network 15, a new user interface is not required for the SF-apparatus 100 at which the user operates. Accordingly, the user can instruct by the same operation under the interface provided by the MF-apparatus 1200 anywhere. Also, when a new function is added to the MF-apparatus 1200 connected to the network 15, even if the SF-apparatus 100 where the user operates, the user can utilize the interface for operating the new function of the MF-apparatus 1200 and operate as if the user uses the MF-apparatus 1200.

Furthermore, if the MF-apparatus 1200 having higher functions exists on the network 15, by sending the input image data 601 to the MF-apparatus 1200 and the output image data 602 to the SF-apparatus 100, even the SF-apparatus 100, which does not have the image process as the higher functions, can realize the same higher functions as the MF-apparatus 1200. In this case, means for providing and setting the higher functions for the image process is not required for the SF-apparatus 100 as an operation side. Accordingly, the user operates in the same way at any SF-apparatus 100.

In the first embodiment, on the network 15, only the plotter 1321 of the MF-apparatus 1200 as an output option, the scanner 1324 of the MF-apparatus 1200 as an input option, and the SF-apparatus 100 (copier) as the input option and the output option are provided, but a plurality of the input options and the output options can be provided. All options, for example, the apparatuses connected through the network 15 and the scanner, the printer, the copier, and the like can be shared as the functions. Also, as the output, it is not limited to printing on the sheet, but as an electronic data, output data can be stored to a server for managing a document. Also, the input side can be a document management server for managing the electronic data, instead of the paper sheet. As described above, by storing as a document, an existing image data can be utilized. Accordingly, data frequently used by the user are simply maintained on the network 15, it is possible to utilize the data in many output methods by various options.

Second Embodiment

In a second embodiment, an MF-apparatus 1200W provides equivalent processes to those in the first embodiment, as Web service. The MF-apparatus 1200W providing the Web service will be described according to the second embodiment of the present invention.

A functional configuration and a hardware configuration of the MF-apparatus 1200W providing Web services concerning the image process according to the second embodiment are the same as those of the MF-apparatus 1200 in the first embodiment. In the second embodiment, an IP-screen Web service providing process part 244 and an IP-Web service providing process parts 344, that will be described later, conduct processes corresponding to the image input/output application 1216. In the second embodiment, an input screen, an image process screen, and an output screen are provided to a Web browser, and the MF-apparatus 1200W provides the input process, the image process, and the output process as the Web services based on settings of the user. The MF-apparatus 1200W providing the Web services will be described with reference to FIGS. 17, 18, and 19. In process examples described in FIGS. 17, 18, and 19, on a network 15, it is assumed that at least three image processing apparatuses; the MF-apparatus 1200, the other MF-apparatus equivalent to the MF-apparatus 1200, and the SF-apparatus 100W, are connected to each other. In the process examples, it is also assumed that the input process is conducted by the SF-apparatus 100W, the image process is conducted by the MF-apparatus 1200, and the output process is conducted by the other MF-apparatus.

Figure 17:
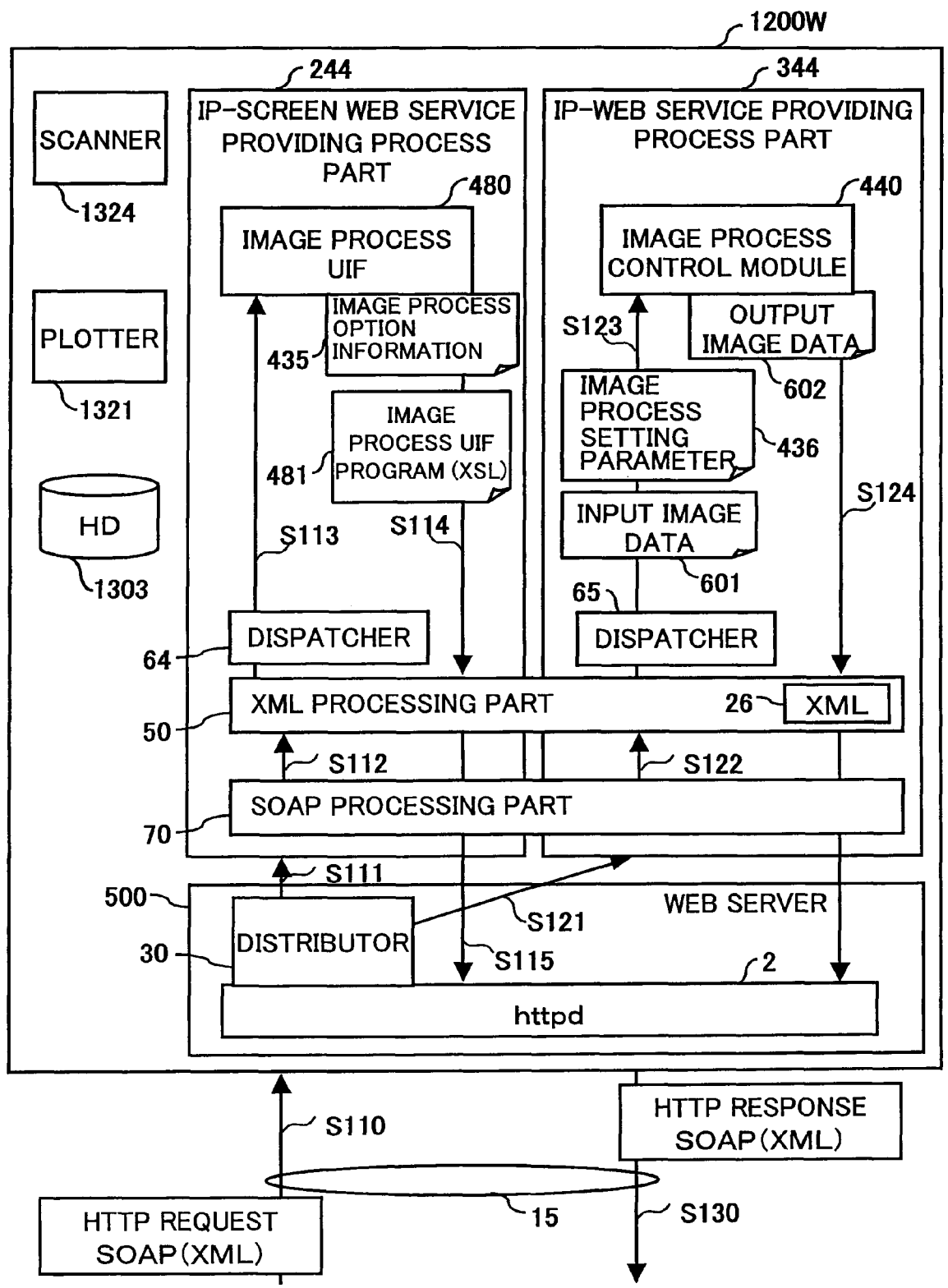
FIG. 17 is a diagram showing a functional configuration of the MF-apparatus providing the Web service concerning the image process, according to a second embodiment of the present invention, according to a second embodiment of the present invention.

FIG. 17 is a diagram showing a functional configuration of the MF-apparatus providing the Web service concerning the image process, according to the second embodiment of the present invention. In FIG. 17, for the sake of convenience, the Web service concerning the image process will be described, but other Web services concerning the input process, the output process, and a document list process as described in FIG. 11 and FIG. 12 can be realized in a similar functional configuration.

In FIG. 17, the MF-apparatus 1200W includes an IP-screen (Image Process screen) Web service providing process part 244, an IP-Web service (Image Process Web service) providing process part 344 for executing the image process, and a Web server 500 for controlling communications with apparatuses connected through the network 15 by an HTTP request and an HTTP response in accordance with HTTP (Hypertext Transfer Protocol).

The Web server 500 includes a distributor 30 for distributing a process to the Web service providing process part 244 or 344 corresponding to an URI (Uniform Resource Identifier) or an URL (Uniform Resource Locator) indicated by the HTTP request, and an httpd (Hypertext Transfer Protocol Daemon) 2 for controlling a communication in accordance with HTTP. Also, the MF-apparatus 1200W includes an SOAP (Simple Object Access Protocol) processing part 70 for analyzing the HTTP request and creating the HTTP response in accordance with SOAP, and XML (eXtensible Markup Language) processing part 50 for processing a message in accordance with XML, which are shared with the Web service providing process part 244 and 344. Moreover, the Web service providing process part 244 and 344 include dispatchers 64 and 65, respectively, for separately obtaining parameters and a data file in the message and dispatching the parameters and the data file thereto.

For example, when the httpd 2 of the MF-apparatus 1200W receives the HTTP request indicating a request of the image process UIF program from the image process apparatus (for example, the SF-apparatus 100W) connected through the network 15 in accordance with the SOAP (step S110), the request is sent to the IP-screen Web service providing process part 244 by the distributor 30 (step S111). The IP-screen Web service providing process part 244 processes the HTTP request by the SOAP processing part 70 (step S112), and furthermore, the message described in XML in a SOAP body in XML processing part 50. Subsequently, the request of the image process UIF program is dispatched to the image process UIF 480 by the dispatcher 64 (step S113).

The image process UIF program 481, which is described based on an XSLT (Extensible Style sheet Language Transform), and image process option information 435 provided from the image process UIF 480 are sent to the XML processing part 50 (step S114). The IP-screen Web service providing process part 244 creates an XML 26 describing the image process option information 435 in XML by the XML processing part 50, includes the XML 26 indicating the image process option information 435 and an XSL of the image process UIF program 481 in an SOAP body by the SOAP processing part 70, and then requests the httpd 2 to send the HTTP response (step S115). The httpd 2 sends the HTTP response to the SF-apparatus 100W (step S130).

After sending the image process UIF program 481 and the image process option information 435, the Web server 500 distributes an image process request indicated in the HTTP request to the IP-Web service providing process part 344 by the distributor 30 when the image process request is sent as the HTTP request from the SF-apparatus 100W (step S121). The IP-Web service providing process part 344 processes the HTTP request requesting the image process by the SOAP processing part 70 (step S122). Subsequently, The IP-Web service providing process part 344 processes the message described in XML in the SOAP body by the XML processing part 50, separately obtains the image process setting parameter 436 and the input image data 601 attached with the message by the dispatcher 65, and sends the image process request to the image process module 440 (step S123).

The image process module 440 conducts the image process in respect to the input image data 601 in accordance with the image process setting parameter 436 (step S124). The XML 26 as the message is created by describing a process result of the image process by the XML processing part 50, and the output image data 602 is attached with the message by the SOAP processing part 70. Then, the Web server 500 sends the XML 26 as HTTP response to the MF-apparatus 100 by the httpd 2 (step S130).

By similar process flows to the IP-screen Web service providing process part 244 and the IP-Web service providing process part 344, it is possible to provide processes by the input UIF 460 and the input control module 410, and processes by the output UIF 470 and the output control module 420, as the Web services to the apparatuses connected to through the network 15. Also, the document list process can be provided as one of the Web services. It should be noted that the apparatuses are not limited to the image processing apparatus but the Web service can be provided to any computerized apparatus.

Figure 18:
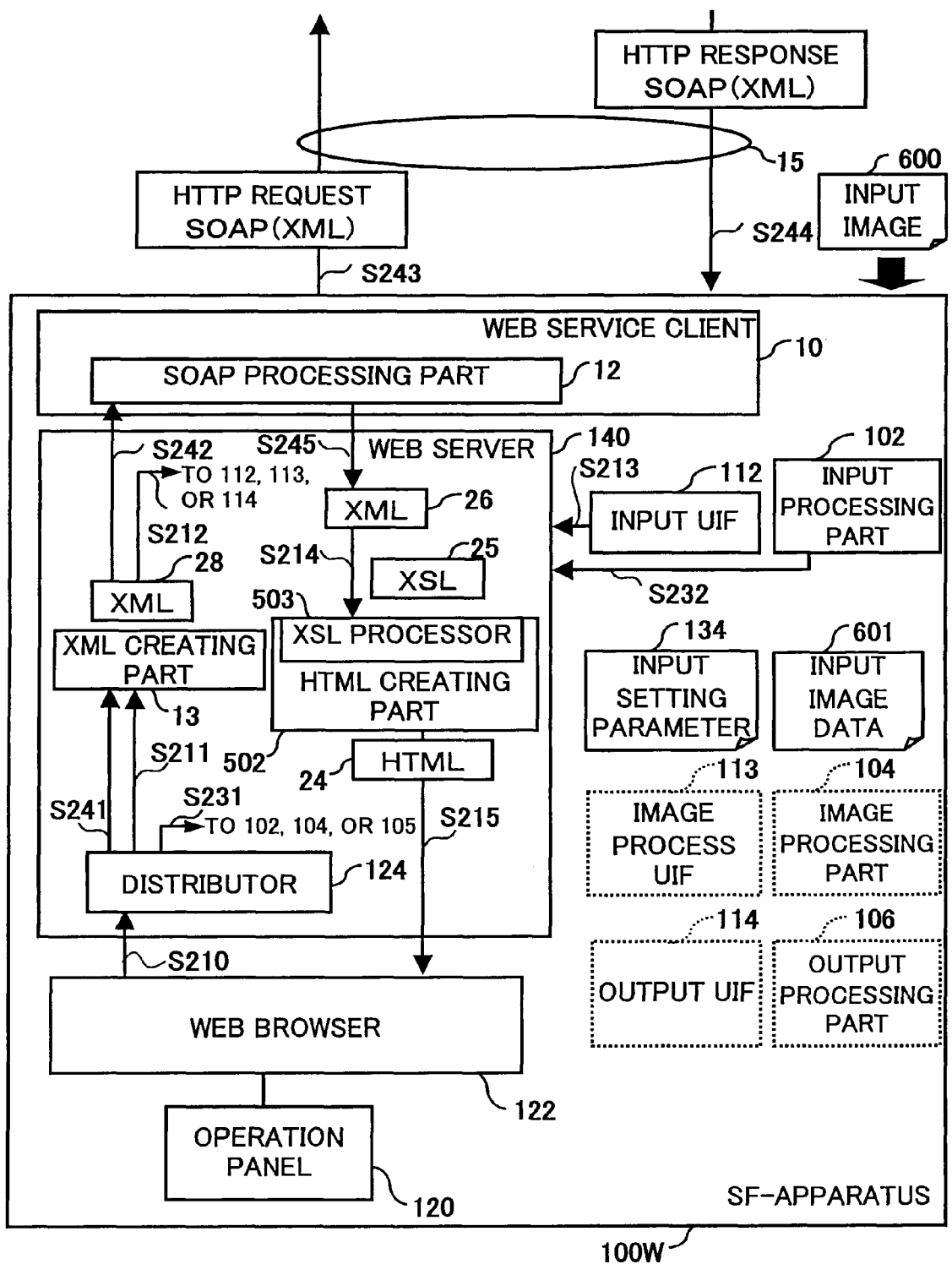
FIG. 18 is a diagram showing the example of the functional configuration of the SF-apparatus including a Web browser according to the second embodiment of the present invention, according to the second embodiment of the present invention.

Next, an example of a functional configuration of the SF-apparatus 100W connected to the MF-apparatus 1200W providing the Web service through the network 15 will be described. FIG. 18 is a diagram showing the example of the functional configuration of the SF-apparatus including a Web browser according to the second embodiment of the present invention. In FIG. 18, parts shown by dashed lines are originally provide in the SF-apparatus 100W but not used in this process example. In FIG. 18, the SF-apparatus 100W mainly includes an input processing part 102 for inputting an image, an image processing part 104 for conducting the image process, an output processing part 106 for outputting the image, an input UIF 112 for providing input image data, an image process UIF 113 for providing image process screen data, the output UIF 114 for providing output screen data, a Web service client 10 including a SOAP processing part 12, a Web server 140, a Web browser 122, and an operation panel 120.

The Web server 140 includes a distributor 124 for distributing a process in response to a request when the user inputs data to the Web browser 122, an XML creating part 13, and an HTML (HyperText Markup Language) creating part 502 for creating an HTML 24 by transforming an XML 26 based on an XSL 25 by the XSL processor 503.

For example, when the user selects the SF-apparatus 100W as an apparatus for the input process at the operation panel 120, a request of the input UIF is set from the Web browser 122 to the distributor 124 of the Web server 140 (step S210). When the distributor 124 receives the request from the Web browser 122, the distributor 124 determines whether the request is a request of the user interface or one in respect to the processing parts 102, 104, and 106. In this case, it is determined that the request from the Web browser 122 is one of the user interface, the request is sent to the XML creating part 13 of the Web server 140 (step S211). The XML creating part 13 creates an XML 28 describing the request in XML. The Web server 140 sends the request to the input UIF 112 when the XML creating part 13 determines that the request is a request of the input UIF of the SF-apparatus 100W itself (step S212).

The input UIF 112 sends the XML 26 indicating the input screen data described in XML and the XSLT 25 for transforming to the HTML 24 to the Web server 140 (step S213). The Web server 140 sends the XML 26 and the XSL 25 received as a response to the HTML creating part 502 (step S214). The HTML creating part 502 creates the HTML 24 by the XSL processor 503 based on the XML 26 and the XSL 25. The HTML 24 created by the HTML creating part 502 is provided to the Web browser 122 and then the input screen is displayed at the operation panel 120 of the SF-apparatus 100W (step S215).

When the user sets the functions for the input process at the input screen displayed at the operation panel 120, the Web server 140 receives a request from the Web browser 122 by the distributor 124 (step S210). In this case, the distributor 124 determines that the request of the user indicates the input process, and the input setting parameter 434 is sent to the input processing part 102 (step S231). The input processing part 102 reads in the input image 600 in accordance with the input setting parameter 134, generates the input image data 601, and sends the XML 26 describing an input process result and the XSL 25 for transforming to the HTML 24 to the Web server 140 (step S232). By conducting the steps S214 and S215, the input process result is displays at the operation panel 120.

When the user selects the MF-apparatus 1200W as an apparatus for the image process, the Web browser 122 sends a request corresponding to a selection of the user to the distributor 124 of the Web server 140 (step S210). In this case, the distributor 124 determines that the request is a request of the user interface, the distributor 124 sends the request to the XML creating part 13 (step S241). In this case, when the XML creating part 13 determines that the request is a request to the other apparatus other than the SF-apparatus 100W, the web server 140 sends the request to the SOAP processing part 12 of the Web service client 10 (step S242). The SOAP processing part 12 sends the HTTP request including the XML 28 as a message to the MF-apparatus 1200W connected through the network 15 in accordance with the SOAP (step S243).

When the Web service client 10 receives the HTTP response from the MF-apparatus 1200W (step S244), the SOAP processing part 12 separately obtains the XML 26 and the XSL 26 from the SOAP body and sends to the Web server 140 (step S245). In this case, the XML 26 describes the image process option information 435 shown in FIG. 17, the XSL 26 includes the image process UIF program 481 shown in FIG. 17, and HTML 24 created by transforming the XML 26 includes the image process UIF program 481 and the image process option information 435. As the same as described above, the steps S214 and S215 are conducted. Accordingly, it is possible to realize the image process UIF 480 of the MF-apparatus 1200W at the operation panel 120 of the SF-apparatus 100W by the Web browser 122.

Similarly, it is possible to realize the output UIF of the other image processing apparatus connected through the network 15. As described above, the image process setting parameter 436 and the output setting parameter 432 are sent to the MF-apparatus 1200W by the steps S241 through S243, and a process result is displayed at the operation panel 120 by the steps S214 and S215.

Figure 19:
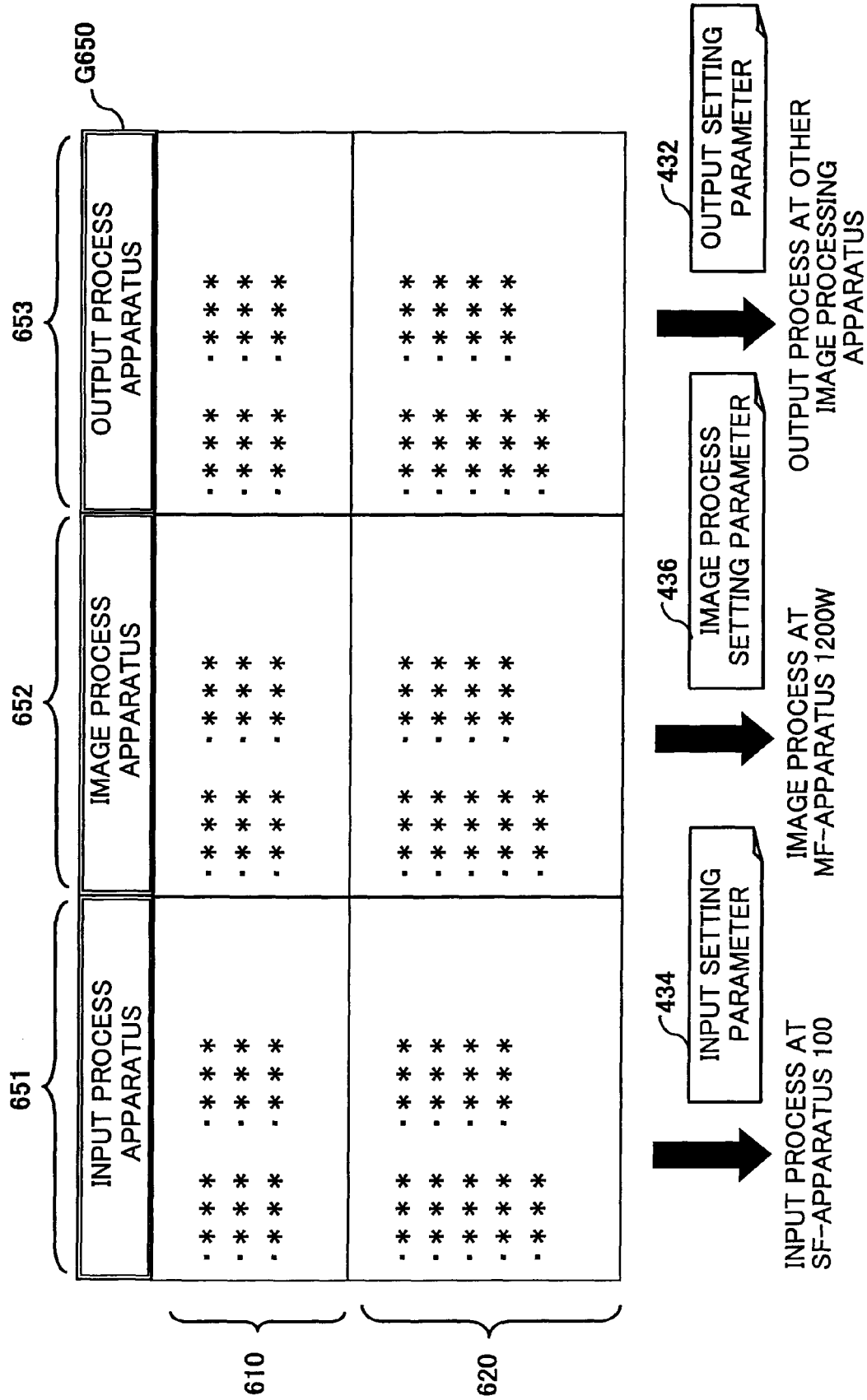
FIG. 19 is a diagram showing an example of a screen displayed at the operation panel by the Web browser, according to the second embodiment of the present invention.

For example, the screen G650 as shown in FIG. 19 is displayed at the operation panel 120 of the SF-apparatus 100W. FIG. 19 is a diagram showing an example of a screen displayed at the operation panel by the Web browser. In FIG. 19, the screen G650 includes a display area 651 for indicating an apparatus for the input process, a display area 652 for indicating an apparatus for conducting the image process, and a display area 653 for indication an apparatus for the output process. Similar to the screen G600, G630, and G640 in FIG. 5, FIG. 7, and FIG. 9, each of the display areas 651, 652, and 653 includes a display area 610 for displaying a list of apparatuses available for a respective process, and a display area 620 for displaying a list of apparatuses selected by the user. For example, each of the display area 651 through 653, 610 and 620 can be a frame realized by the Web browser 122.

In the screen G650, the user selects the SF-apparatus 100W from the display area 610 as an apparatus for conducing the input process, and selects functions available from the SF-apparatus 100W. Moreover, the user selects the MF-apparatus 1200W as an apparatus for conducing the image process from the display area 610, and selects functions available from the MF-apparatus 1200W from the display area 620. Furthermore, the user selects the other apparatus as an apparatus for conducting the output process from the display area 610, and selects functions available from the other apparatus. These selections of the user are sent to the SF-apparatus 100W, the MF-apparatus 1200, and the other apparatus, respectively, as the input setting parameter 434, the image process setting parameter 436, and the output setting parameter 432.

According to the first embodiment and the second embodiment, it is possible to provide the user interface provided by each image processing apparatus even if different apparatus types provide different user interfaces. That is, even if the different apparatus types are a color and a white and black in that these original operations are provided by different user interfaces for the color and the white and black, the same processes can be realized at the image processing apparatuses. Moreover, by using a mechanism of the Web browser 122 instead of developing a special mechanism, it is possible to conduct the same processes even if the user interfaces are different from each other between the image processing apparatuses. Furthermore, it is possible to easily maintain and improve each module.

Third Embodiment

Figure 20:
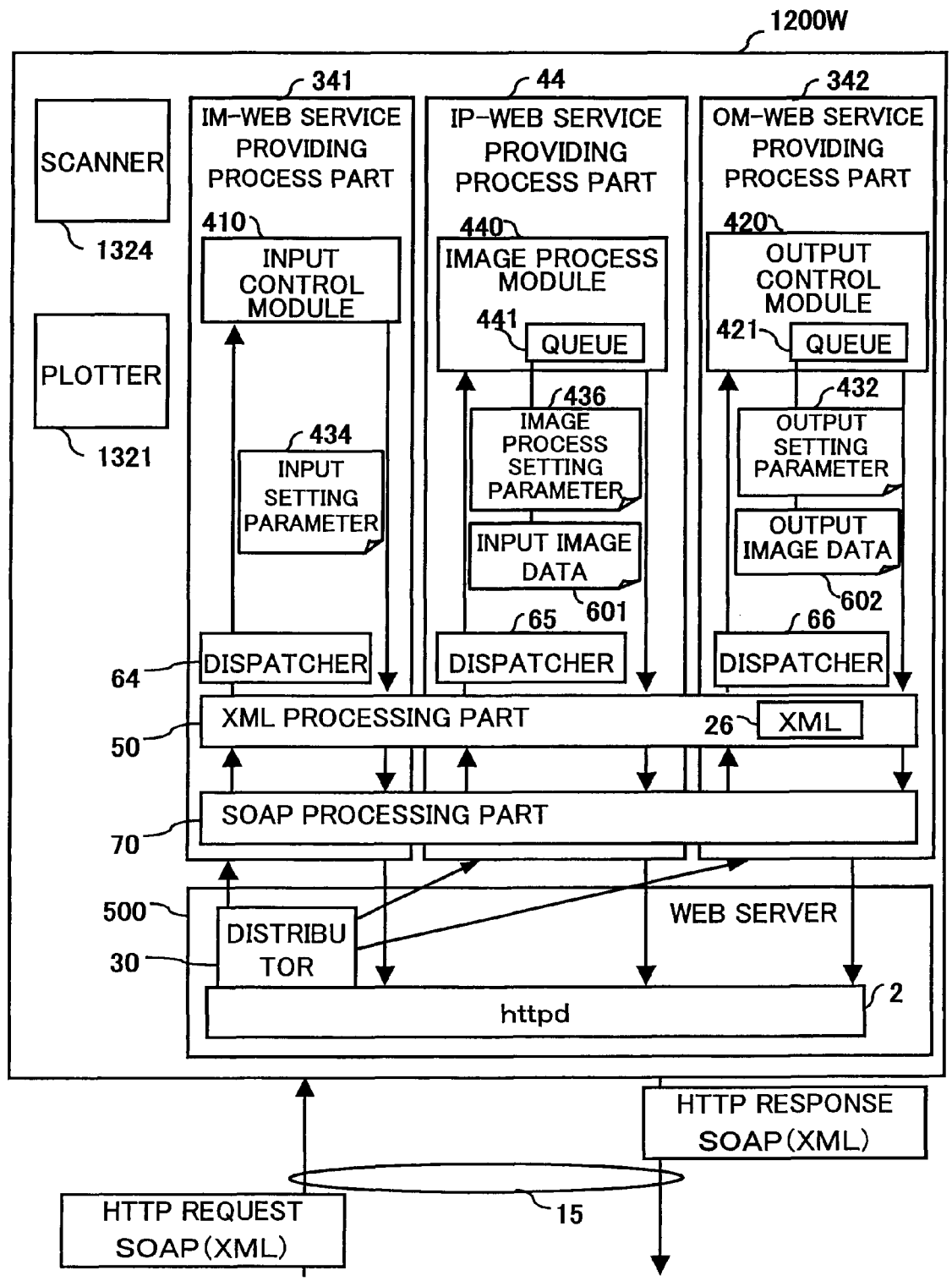
FIG. 20 is a diagram showing a functional configuration of the MF-apparatus providing the Web service concerning the image process according to a third embodiment of the present invention.

A third embodiment of the present invention, in which a computer internally mounted in an MF-apparatus 1200W includes a high capacity storage such as a hard disk and a large amount of image data can be managed, will be described. FIG. 20 is a diagram showing a functional configuration of the MF-apparatus providing a Web service concerning an image process according to the third embodiment of the present invention. In FIG. 20, parts that are the same as the ones in FIG. 17 are indicated by the same reference numerals and the explanation thereof will be omitted. An IM-Web service providing process part 341 and an OM-Web service providing process part 342 conduct processes corresponding to the image input/output application 1216. In the third embodiment, when a Web server 500 of the MF-apparatus 1200W receives an input image data 601 or an output image data 602, or when the Web server 500 receives an image process setting parameter 436 or the output setting parameter 432, there is a state in that the Web server 500 can not process promptly because the image process module 440 or an output control module 420 is in use. In order to eliminate this problem, queues 441 and 421 are provided to the image process module 440 and the output control module 420, respectively.

When the image process module 440 is in a process, the input image data 601 and the image process setting parameter 436 are maintained as one request in the queue 441. Also, when the output control module 420 is in a process, the output image data 602 and the output setting parameter 432 are maintained as one request in the queue 421. When the image process module 440 and the output control module 420 complete the processes, respectively, the image process module 440 and the output control module 420 obtain the requests from the queues 441 and 421, respectively.

According to the first, the second, and the third embodiments, furthermore, the following configuration can be applied. An image data maintaining function for maintaining image data in the HD 1303 or an image data transmission function for transmitting image data to the other image processing apparatus can be provided in the MF-apparatus 1200. In this case, each of a format, a compression type, a resolution, gradation of the input image data 601 and the output image data 602 will be changed depending on usages of the user later. Thus, characteristics of the input image data 601 and the output image data 602 can be indicated in the image process option information 435 and the output option information 431. Accordingly, the input image data 601 and the output image data 602 can be processed based on the usages of the user. The image process module 440 and the output control module 420 process the input image data 601 and the output image data 602 by the image process setting parameter 436 and the output control module 420, respectively. The input image data 601 and the output image data 602 are maintained or transmitted to the other image processing apparatus.

Moreover, if the MF-apparatus 1200W for conducting the input process is an apparatus capable of storing image in the HD 1303, the user can select and output data stored in the HD 1303 of the MF-apparatus 1200W at the SF-apparatus 100W for conducting the output process. Even if the SF-apparatus 100W at the output side does not have means for selecting "BOTH SIDES" of the ADF 1350 or an image stored in the HD 1303, the SF-apparatus 100W can display the input interface of the input operation of the MF-apparatus 1200, so as to conduct the input process at the MF-apparatus 1200.

Furthermore, by a similar process flow to the image process UIF 480, the image process module 440, which can provide functions of a gamma correction or a color space correction corresponding to characteristics of the engine at a time of the image output, can be transmitted to the SF-apparatus 100W. Accordingly, the image process is conducted by replacing the image processing part 104 originally provided in the SF-apparatus 100W, so as to output the output image 603 having a high quality. In addition, in a case in which the noise elimination is set as an image correction, even if the input image 600 or the input image data 601 has lower quality, the output image data 602 having higher quality can be obtained. Also, a method of outputting the output image 603 is changed based on the characteristics of the engine. Thus, the gamma correction or a color correction is required when the input image 600 is input. However, by obtaining the image process module 440 of the MF-apparatus 1200W for conducting the output process, various corrections can be conducted at the SF-apparatus 100W for conducting the input process corresponding to the characteristics of the engine of the MF-apparatus 1200, so as to output the output image 603 having higher quality.

Moreover, in a case in which an apparatus for conducting the image process is different from an apparatus for conducting the input process and the output process, the input image data 601 is transmitted to the apparatus for the image process once. After the image process is completed, the output image data 602 is transmitted to the apparatus for the output process. Therefore, the input process, the image process, and the output process can be conducted as a single process. Accordingly, the apparatus for the input process is not required to have an equivalent function for the image process, and it is possible to additionally provide a function dynamically.

Furthermore, in the second embodiment, the Web browser 122 is activated on a personal computer (PC) connected to the MF-apparatus 1200W through the network 15 to access the Web server of each apparatus for the input process, the image process, and the output process. Then, Web contents provided by the Web server are displayed at a display unit of the PC. Therefore, the PC is not required to have any function for the image process, and it is possible to conduct operations concerning the image process.

Fourth Embodiment

In a fourth embodiment, a functional configuration and a hardware configuration of an MF-apparatus 1200 providing the screen coordinate parameters 462, 472, and 482 according to the fourth embodiment are the same as those of the MF-apparatus 1200 in the first embodiment.

In the fourth embodiment, an MF-apparatus 1200 provides the screen coordinate parameters 462, 472, and 482 with the option information 431, 433, and 435, instead of the UIF programs 461, 471, and 481 with 482 with the option information 431, 433, and 435.

Figure 21:
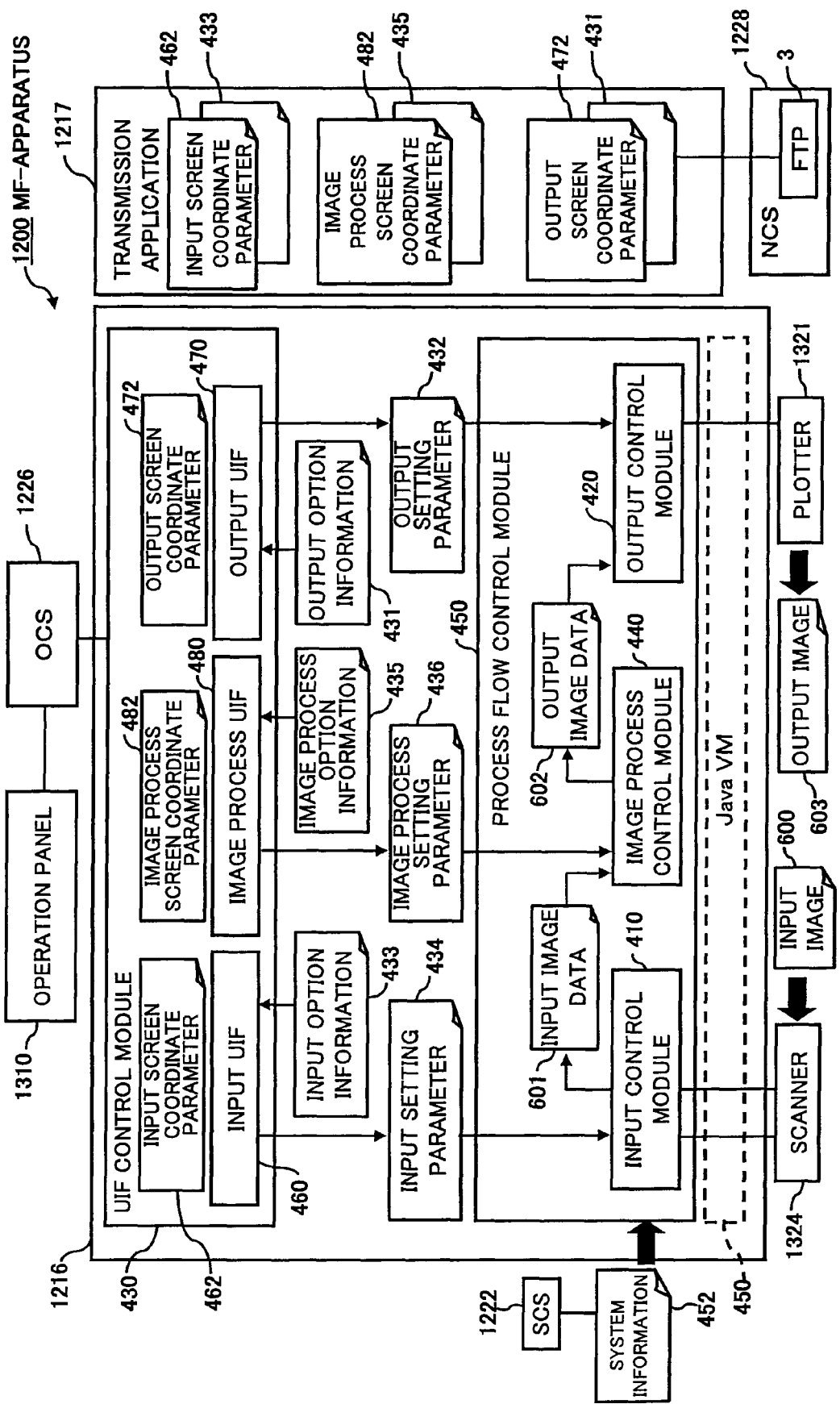
FIG. 21 is a diagram showing functional configurations of the image input/output application and the transmission application according to the fourth embodiment.

FIG. 21 is a diagram showing functional configurations of the image input/output application and the transmission application according to the fourth embodiment. In FIG. 21, parts that are the same as the ones in FIG. 3 are indicated by the same reference numerals and explanation thereof will be omitted. In the MF-apparatus 1200 according to the fourth embodiment, in order for other apparatuses to utilize an input process, an image process, and an output process available at the MF-apparatus 1200 through a network 15, the transmission application 1217 transmits the screen coordinate parameters 462, 472, and 482 in response to a request of the screen coordinate parameter 462, 472, and 482, respectively, from the other apparatus used by a user.

When the transmission application 1217 receives a request of the input screen coordinate parameter 462, the transmission application 1217 simultaneously transmits the input screen coordinate parameter 462 realizing a similar screen display of the MF-apparatus 1200 and the input option information 433 obtained by the input control module 410 when the MF-apparatus 1200 is booted, to the apparatus by the FTP 3. In the same manner, when the transmission application 1217 receives a request of the image process screen coordinate parameter 462 or the output screen coordinate parameter 472, the transmission application 1217 simultaneously transmits the image process screen coordinate parameter 482 or the output screen coordinate parameter 472 with the image process option information 435 or the output option information 431 by the FTP 3.

By downloading each of the screen coordinate parameters 462, 482, and 472, it is possible for an other apparatus to display a plurality of functions available in the MF-apparatus 1200. Then, the setting parameters 434, 436, and 432 set by the user at the other apparatus are respectively transmitted to the MF-apparatus 1200. The MF-apparatus 1200 replaces the input setting parameter 434, the image process setting parameter 436, and the output setting parameter 432 with the setting parameters received from the other apparatus, respectively. Accordingly, it is possible for the MF-apparatus 1200 to conduct in accordance with the setting parameters that are set by the user at the other apparatus.

In the functional configuration of the image input/output application 1216 shown in FIG. 21, the input control module 410, the image process module 440, the output control module 420, and the UIF control module 430 may be realized by Java™ programs. In this case, a Java VM (Virtual Memory) 450, which is shown by dashed lines, may be provided to execute the Java™ programs. The input screen coordinate parameter 462, the image process screen coordinate parameter 482, and the output screen coordinate parameter 472 are also provided in the data structure readable by the Java™ programs. Also, the input option information 433, the image process option information 435, and the output option information 431 are provided in the data structure readable by the Java™ programs. In the other apparatus connected through the network 15 to the MF-apparatus 1200, if the Java™ programs can be executable, the input setting parameter 434, the image process setting parameter 436, and the output setting parameter 432 can be provided without depending on hardware of the other apparatus.

For example, in a case in which the other apparatus connected to the MF-apparatus 1200 through the network 15 has a lower function than that of the MF-apparatus 1200 or only a single function (hereinafter, called an SF-apparatus 100 (single functional image forming apparatus)), this SF-apparatus 100 obtains the input screen coordinate parameter 462, the image process screen coordinate parameter 482, and the output screen coordinate parameter 472 from the MF-apparatus 1200. Therefore, it is possible for the SF-apparatus 100 to provide the user higher functions provided by the MF-apparatus 1200.

Examples of process flows for displaying the functions of the MF-apparatus 1200 at the operation panel of the SF-apparatus 100 will be described, according to the fourth embodiment of the present invention. Also, in the fourth embodiment, the input screen coordinate parameter 462 and the input setting parameter 434 realize the input screen G600 shown in FIG. 5, the image process screen coordinate parameter 482 and the image process setting parameter 436 realize the image process screen G630 shown in FIG. 7, and the output screen coordinate parameter 472 and the output setting parameter 432 realize the output process screen G640 shown in FIG. 9. Therefore, the explanations of the screens G600, G630, and G640 will be omitted.

Figure 22:
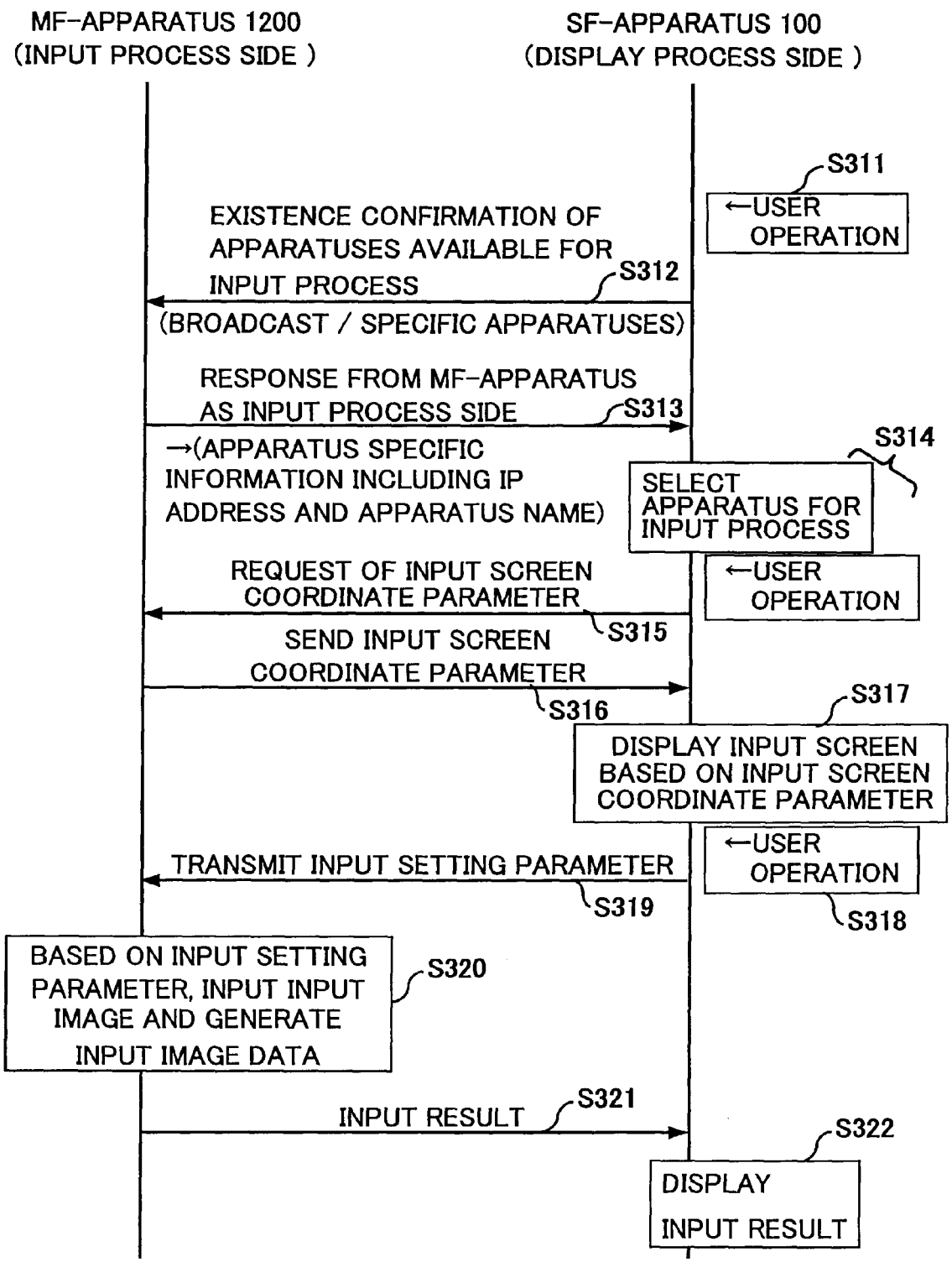
FIG. 22 is a flowchart diagram for explaining the process flow to realize a display of the input screen of the MF-apparatus at the SF-apparatus.

A process flow, which is conducted between the MF-apparatus 1200 and the SF-apparatus 100 in response to operations of the user at the input screen G600 in FIG. 5, will be described with reference to FIG. 22. FIG. 22 is a flowchart diagram for explaining the process flow to realize a display of the input screen G600 of the MF-apparatus 1200 at the SF-apparatus 100.

In FIG. 22, when the user selects the button 61 to indicate one apparatus for conducting the input process at the input screen G600 in FIG. 5 (step S311), the SF-apparatus 100 confirms existence of available apparatuses for the input process in respect to all apparatuses connected through the network (step S312). A method for confirming the existence of the available apparatuses may confirm all apparatuses existing on the network by a broadcast. Alternatively, the method may confirm specific apparatuses set beforehand. In response to an existence confirmation from the SF-apparatus 100, the MF-apparatus 1200 existing on the network replies to the SF-apparatus 100 with apparatus specific information including an IP address identifying the MF-apparatus 1200, an apparatus name, and a like (step S313). When the SF-apparatus 100 receives the apparatus specific information from the MF-apparatus 1200 and other apparatuses on the network, the SF-apparatus 100 displays the list of the apparatus names in the display area 610 at the input screen G600 in FIG. 5.

For example, the user selects the MF-apparatus 1200 as the apparatus for conducting the input process from the display area 610 (step S314), the SF-apparatus 100 requests the input screen coordinate parameter 462 of the MF-apparatus 1200 (step S315). The MF-apparatus 1200 sends the input screen coordinate parameter 462 and the input option information 433 to the SF-apparatus 100 by the FTP 3 in response to the request from the SF-apparatus 100 (step S316).

When the SF-apparatus 100 receives the input screen coordinate parameter 462 and the input option information 433 from the MF-apparatus 1200, the SF-apparatus 100 displays the functions that the MF-apparatus 1200 can provide, in the display area 620 of the input screen G600 (FIG. 5) displayed at the operation panel of the SF-apparatus 100 by using the input screen coordinate parameter 462 (step S317). From the display area 620 displaying the functions, for example, the user selects "PICTURE", "AUTO DARKNESS", and "ONE SIDE" (step S318), an input UIF of the SF-apparatus 100 generates the input setting parameter showing "PICTURE", "AUTO DARKNESS", and "ONE SIDE" corresponding position coordinates thereof, and the input setting parameter is transmitted to the MF-apparatus 1200 (step S319).

The MF-apparatus 1200 sets the input setting parameter 434 received from the SF-apparatus 100 as the input setting parameter 434. Subsequently, the input control module 410 reads in the input image 600 from the scanner 1324 in accordance with the input setting parameter 434, and generates the input image data 601 (step S320).

Since the image input/output application 1216 sets the input setting parameter received from the SF-apparatus 100 as the input setting parameter 434, the input control module 410 can conduct the input process as if the user sets at the operation panel 1310 of the MF-apparatus 1200. When the MF-apparatus 1200 completes the input process, the MF-apparatus 1200 sends an input result to the SF-apparatus 100 (step S321). At the operation panel, the SF-apparatus 100 displays the input result received from the MF-apparatus 1200 at the operation panel (step S322).

Therefore, it is possible for the user to select the desired functions from the list of the functions, which the MF-apparatus 1200 can provide, displayed at the operation panel of the SF-apparatus. Also, it is possible to have the MF-apparatus 1200 conduct the input process based on the desired functions of the user. For example, even if the SF-apparatus 100 does not have "PICTURE" function, it is possible for user to have the MF-apparatus 1200 conduct the input process by "PICTURE" function as one of the input setting parameter 434, from the SF-apparatus.

In FIG. 22, as for the input process, the process flow between the SF-apparatus 100 and the MF-apparatus 1200 is described. Also, the process flow shown in FIG. 22 can be realized between two MF-apparatuses 1200 and between two SF-apparatuses.

Figure 23:
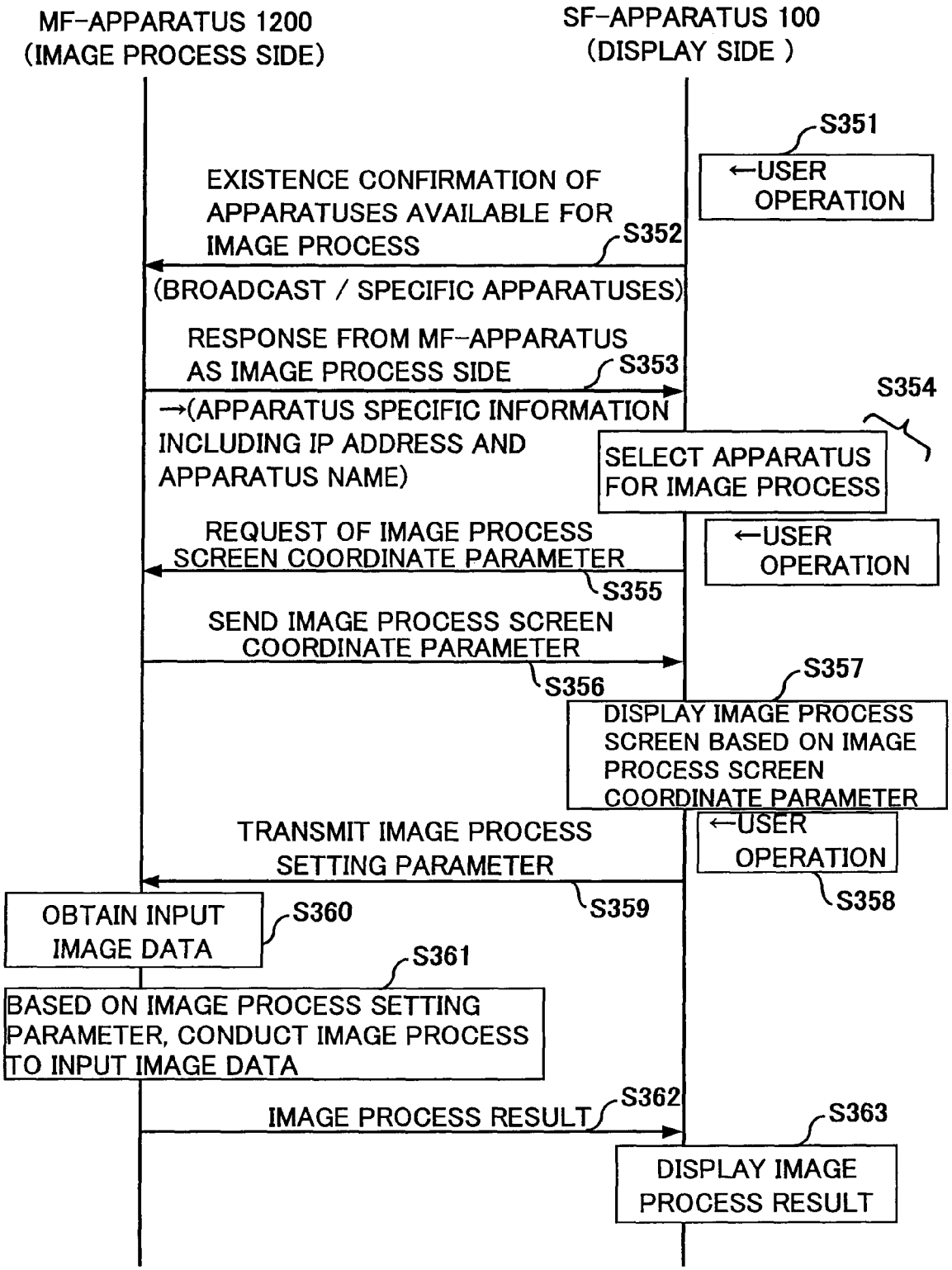
FIG. 23 is a flowchart diagram for explaining the process flow to realize a display of the image process screen of the MF-apparatus at SF-apparatus.

A process flow between the MF-apparatus 1200 and the SF-apparatus 100 in accordance with operations of the user at the image process screen G630 (FIG. 7) will be described with reference to FIG. 23. FIG. 23 is a flowchart diagram for explaining the process flow to realize a display of the image process screen of the MF-apparatus 1200 at SF-apparatus.

In FIG. 23, when the user selects the button 62 to indicate one apparatus for conducting the image process at the image process screen G630 displayed at the operation panel of the SF-apparatus 100 (step S351), the SF-apparatus 100 confirms existence of available apparatuses for the image process in respect to all apparatuses connected through the network (step S352). The method for confirming the existence of the available apparatuses can be the same method described in a case of the process flow for realizing a display of the input screen in FIG. 22. In response to an existence confirmation from the SF-apparatus, the MF-apparatus 1200 existing on the network replies to the SF-apparatus 100 with apparatus specific information including an IP address identifying the MF-apparatus 1200, an apparatus name, and a like (step S353). When the SF-apparatus 100 receives the apparatus specific information from the MF-apparatus 1200 and other apparatuses on the network, the SF-apparatus 100 displays the list of the apparatus names in the display area 610 at the image process screen G630 in FIG. 7.

For example, the user selects the MF-apparatus 1200 as the apparatus for conducting the image process from the display area 610 in FIG. 7 (step S354), the SF-apparatus 100 requests the image process screen coordinate parameter 482 of the MF-apparatus 1200 (step S355). The MF-apparatus 1200 sends the image process screen coordinate parameter 482 and the image process option information 435 to the SF-apparatus 100 by the FTP 3 in response to the request from the SF-apparatus 100 (step S356).

When the SF-apparatus 100 receives the image process screen coordinate parameter 482 and the image process option information 435 from the MF-apparatus 1200, the SF-apparatus 100 displays the functions that the MF-apparatus 1200 can provide, in the display area 620 of the image process screen G630 (FIG. 7) displayed at the operation panel of the SF-apparatus 100 by using the image process screen coordinate parameter 482 (step S357). From the display area 620 displaying the functions, for example, the user selects "ME ELIMINATION", "ACTUAL SIZE", and "DIVIDE" (step S358), an image process UIF of the SF-apparatus 100 generates the image process setting parameter showing "FRAME ELIMINATION", "ACTUAL SIZE", and "DIVIDE" corresponding to position coordinates thereof, and the image process setting parameter is transmitted to the MF-apparatus 1200 (step S359).

The MF-apparatus 1200 obtains the input image data 601 (step S360). When the input process is not conducted by the MF-apparatus 1200, the MF-apparatus 1200 obtains the input image data 601 from the SF-apparatus. The image input/output application 1216 sets the image process setting parameter received from the SF-apparatus 100 as the image process setting parameter 436. The image process module 440 conducts the image process in respect to the input image data 601 in accordance with the image process setting parameter 436 and generates the output image data 602 (step S361).

Since the image input/output application 1216 sets the image process setting parameter received from the SF-apparatus 100 as the image process setting parameter 436, the image process module 440 can conduct the image process as if the user sets at the operation panel 1310 of the MF-apparatus 1200. When the MF-apparatus 1200 completes the image process, the MF-apparatus 1200 sends an image process result to the SF-apparatus 100 (step S362). At the operation panel, the SF-apparatus 100 displays the image process result received from the MF-apparatus 1200 (step S363).

In FIG. 23, as for the image process, the process flow between the SF-apparatus 100 and the MF-apparatus 1200 is described. Also, the process flow shown in FIG. 23 can be realized between two MF-apparatuses 1200 and between two SF-apparatuses. It is possible for the user to select the desired functions from the list of the functions, which the MF-apparatus 1200 can provide, displayed at the operation panel of the SF-apparatus. Also, it is possible to have the MF-apparatus 1200 conduct the image process based on the desired functions of the user.

Figure 24:
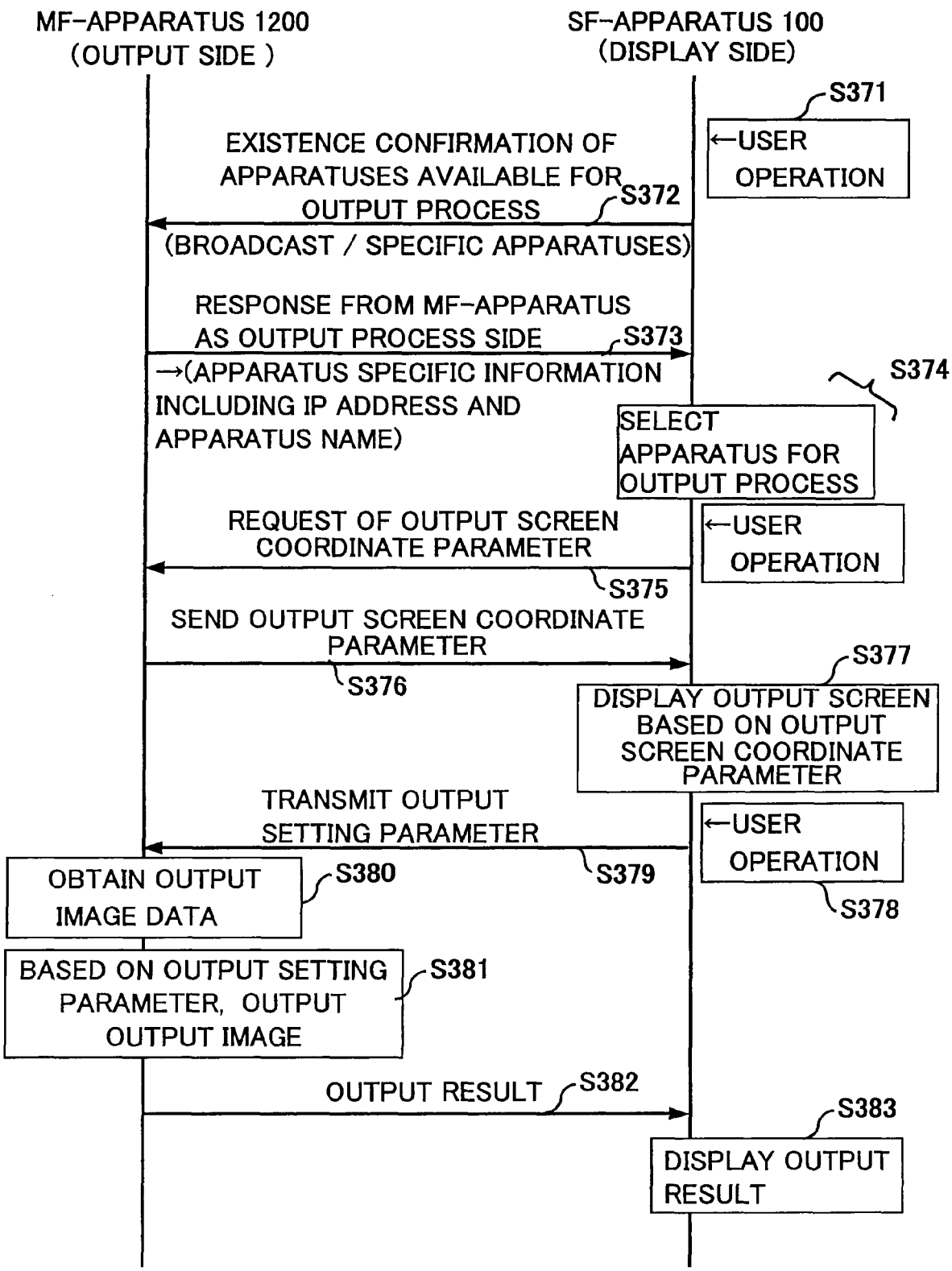
FIG. 24 is a flowchart diagram for explaining the process flow to realize a display of the output screen of the MF-apparatus 1200 at the SF-apparatus.

A process flow between the MF-apparatus 1200 and the SF-apparatus in accordance with operations of the user at the output screen G640 (FIG. 9) will be described with reference to FIG. 24. FIG. 24 is a flowchart diagram for explaining the process flow to realize a display of the output screen of the MF-apparatus 1200 at the SF-apparatus.

In FIG. 24, when the user selects the button 63 to indicate one apparatus for conducting the output process at the output screen G640 (FIG. 9) displayed at the operation panel of the SF-apparatus 100 (step S371), the SF-apparatus 100 confirms existence of available apparatuses for the output process in respect to all apparatuses connected through the network (step S372). The method for confirming the existence of the available apparatuses can be the same method described in a case of the process flow for realizing the display of the input screen G600 in FIG. 8. In response to an existence confirmation from the SF-apparatus, the MF-apparatus 1200 existing on the network replies to the SF-apparatus 100 with apparatus specific information including an IP address identifying the MF-apparatus 1200, an apparatus name, and a like (step S373). When the SF-apparatus 100 receives the apparatus specific information from the MF-apparatus 1200 and other apparatuses on the network, the SF-apparatus 100 displays the list of the apparatus names in the display area 610 at the output screen G640 in FIG. 9.

For example, the user selects the MF-apparatus 1200 as the apparatus for conducting the output process from the display area 610 (step S374), the SF-apparatus 100 requests the output screen coordinate parameter 472 of the MF-apparatus 1200 (step S375). The MF-apparatus 1200 sends the output screen coordinate parameter 472 and the output option information 431 to the SF-apparatus 100 by the FTP 3 in response to the request from the SF-apparatus 100 (step S376).

When the SF-apparatus 100 receives the output screen coordinate parameter 472 and the output option information 431 from the MF-apparatus 1200, the SF-apparatus 100 displays the functions that the MF-apparatus 1200 provide, in the display area 620 of the input screen G640 (FIG. 9) displayed at the operation panel of the SF-apparatus 100 by using the output screen coordinate parameter 472 (step S377). From the display area 620 displaying the functions, for example, the user selects one of four icons corresponding to the four stapling methods (step S378), the output UIF of the SF-apparatus 100 generates the output setting parameter indicating "SORT" and "STAPLE" corresponding to position coordinates thereof, and then the output setting parameter is transmitted to the MF-apparatus 1200 (step S379).

The MF-apparatus 1200 obtains the output image data 602 (step S380). When the output process is not conducted by the MF-apparatus 1200, the MF-apparatus 1200 obtains the output image data 602 from the SF-apparatus. The output setting parameter, which is received from the SF-apparatus, is set to be the output setting parameter 432. Then, the output control module 420 conducts the output process to the output image data 602 in accordance with the output setting parameter 432 so as to form an image on the sheet as the output image 603 and then outputs the output image 603 (step S381).

Since the output setting parameter received from the SF-apparatus 100 is set as the output setting parameter 432, the output control module 420 can conduct the output process as if the user set at the operation panel 1310 of the MF-apparatus 1200. When the MF-apparatus 1200 completes the output process, the output result is sent to the SF-apparatus 100 (step S382). At the operation panel, the SF-apparatus 100 displays the output result received from the MF-apparatus 1200 (step S383).

In FIG. 24, as for the output process, the process flow between the SF-apparatus 100 and the MF-apparatus 1200 is described. Also, the process flow shown in FIG. 24 can be realized between two MF-apparatuses 1200 and between two SF-apparatuses. It is possible for the user to select the desired functions from the list of the functions, which the MF-apparatus 1200 can provide, displayed at the operation panel of the SF-apparatus. Also, it is possible to have the MF-apparatus 1200 conduct the output process based on the desired functions of the user.

The process patterns 1 through 4 based on various combinations of the input process, the image process, and the output process shown in FIG. 4 using user interfaces will be described in detail with reference to FIG. 25 through FIG. 28, according to the fourth embodiment of the present invention. For example, an SF-apparatus (single functional image processing apparatus) 100 shown in FIG. 25 through FIG. 28 is a single copier having only a copying function. For example, the SF-apparatus 100 includes an input processing part 102 for reading in the input image 600 formed on a sheet, an image processing part 104 for conducting the image process to the input image data generated by reading in the input image 600, an output processing part 106 for forming output image data 603, which the image process is conducted to, on the sheet and outputting the sheet as the output image 603, an operation panel 120 operated by the user, and an operation controlling part 110 for controlling a display of the operation panel 120.

Moreover, the operation controlling part 110 includes at least an input UIF 112 for generating the input screen coordinate parameter so as to display the input screen G600 as shown FIG. 5, an image process UIF 113 for generating the image process screen coordinate parameter so as to display the image process screen G630 as shown in FIG. 7, an output UIF 114 for generating the output screen coordinate parameter so as to display the output screen G640 as shown in FIG. 9, an OCS 116 for controlling the operation panel 120 based on the screen information provided from each of the input UIF 112, the image process UIF 113, and the output UIF 114, in respect to the operation panel 120.

Furthermore, when each user interface program realizing the input UIF 112, the image process UIF 113, and the output UIF 114 is a Java™ program, the operation controlling part 110 includes a Java™ VM 118. In the SF-apparatus 100, all process parts including the OCS 116, the input UIF 112, the image process UIF 113, and the output UIF 114 can be realized by the Java™ programs. In this case, even if the OCS 116 is not included in the SF-apparatus 100, the SF-apparatus 100 can be compatible to the MF-apparatus 1200.

In FIG. 25 through FIG. 28, parts shown by dashed lines other than the Java™ VM 450 and the Java™ VM 118 are originally provided in the MF-apparatus 1200 and the SF-apparatus 100 but not used in each of the process patterns 1 through 4. In addition, parts shown by double lines are replaced with data file sent from the MF-apparatus 1200 or the SF-apparatus 100.

Process Pattern 1

Figure 25:
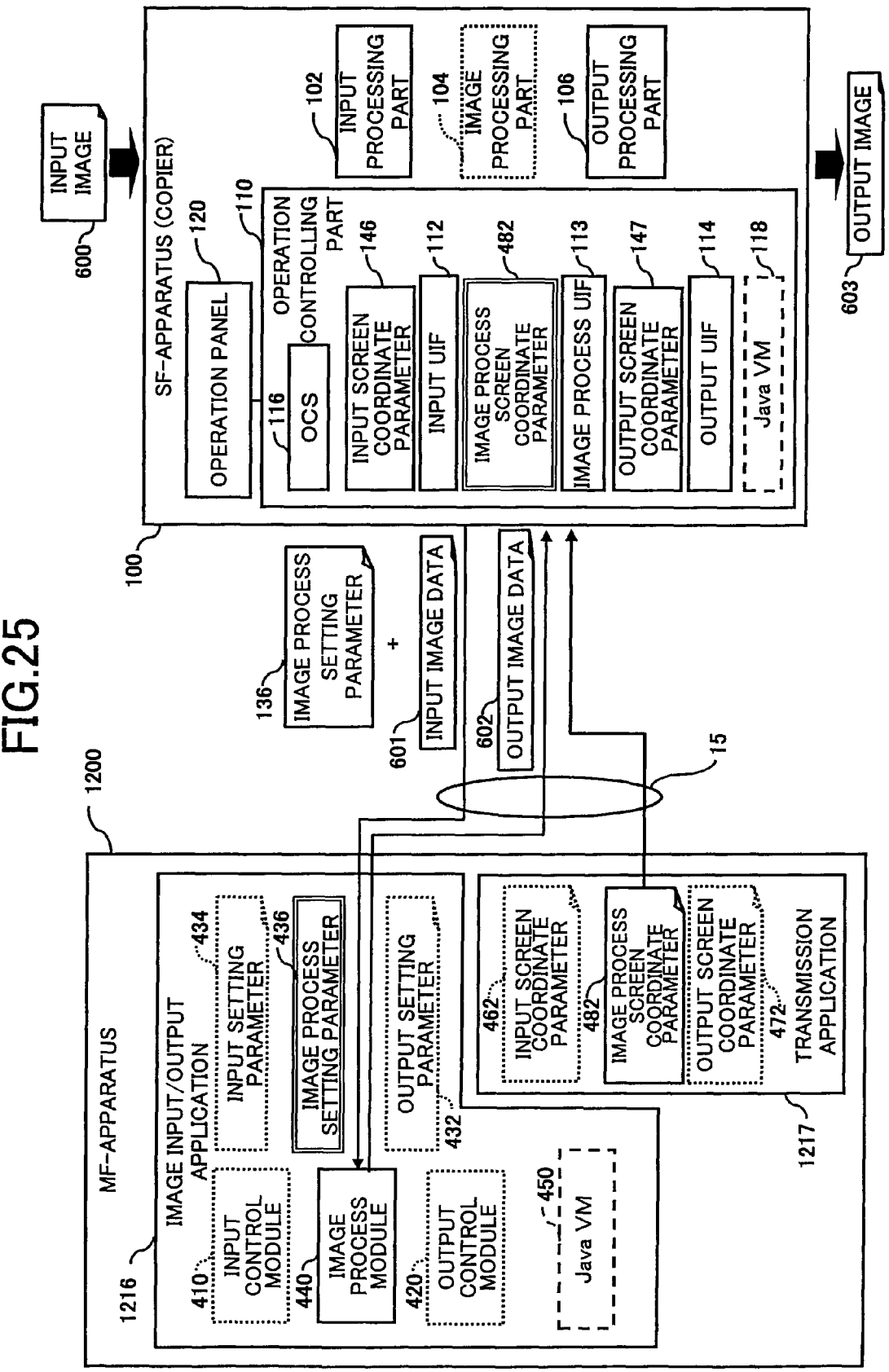
FIG. 25 is a diagram showing an example of the process pattern 1 shown in FIG. 4.

FIG. 25 is a diagram showing an example of the process pattern 1 shown in FIG. 4. In FIG. 25, the display process, the input process, and the output process are conducted by the SF-apparatus 100, and only the image process is conducted by the MF-apparatus 1200.

First, when the user selects the SF-apparatus 100 itself as an apparatus for the input process at the operation panel 120, based on the input screen coordinate parameter 146 produced by the input UIF 112 originally provided in the SF-apparatus 100, the functions for the input process that the SF-apparatus 100 can provide is displayed at the operation panel 120. When the user selects the functions, the input UIF 112 generates the input setting parameter (not shown) showing the functions set by the user. The input processing part 102 reads in the input image 600 in accordance with the input setting parameter (not shown) that is generated by the input UIF 112 so as to indicate the function set by the user and generates the input image data 601.

Next, when the user selects the MF-apparatus 1200 as an apparatus for conducting the image process from the operation panel 120, in accordance with the process flow shown in FIG. 23, the image process screen coordinate parameter (not shown) produced by the image process UIF 113 (not shown) is replaced with the image process screen coordinate parameter 482 obtained from the MF-apparatus 1200. The image process UIF 480 displays the function that the MF-apparatus 1200 can provide, at the operation panel 120 through the OCS 116 based on the image process screen coordinate parameter 482. When the user selects the functions, the image process 480 generates the image process setting parameter 136 indicating the function set by the user. The SF-apparatus 100 transmits the input image data 601 generated by the image process setting parameter 136 and the input processing part 102, to the MF-apparatus 1200. The input image data 601 can be transmitted in response to a request from the image input/output application 1216 of the MF-apparatus 1200.

The image input/output application 1216 of the MF-apparatus 1200 replaces the image process setting parameter 436 with the image process setting parameter 136 received from the SF-apparatus 100. And the image process module 440 conducts the image process in respect to the input image data 601 received from the SF-apparatus 100 based on the image process setting parameter 436, and generates the output image data 602 as a result. The output image data 602 is transmitted to the SF-apparatus 100. The output image data 602 can be transmitted in response to a request from the SF-apparatus 100.

When the user selects the SF-apparatus 100 itself as an apparatus for the output process at the operation panel 120, based on the output option information 431 generated by the output UIF 114 originally provided in the SF-apparatus 100, the functions for the output process that the SF-apparatus 100 can provide is displayed, at the operation panel 120. When the user selects the functions, the output UIF 114 generates the output setting parameter (not shown) indicating the functions set by the user. The output processing part 106 forms the output image data 602 on the sheet in accordance with the output setting parameter (not shown) that is generated by the output UIF 114 so as to indicate the functions set by the user, and then outputs the output image 603.

As described above, the user can have the MF-apparatus 1200 conduct the image process only through a network 15.

Process Pattern 2

Figure 26:
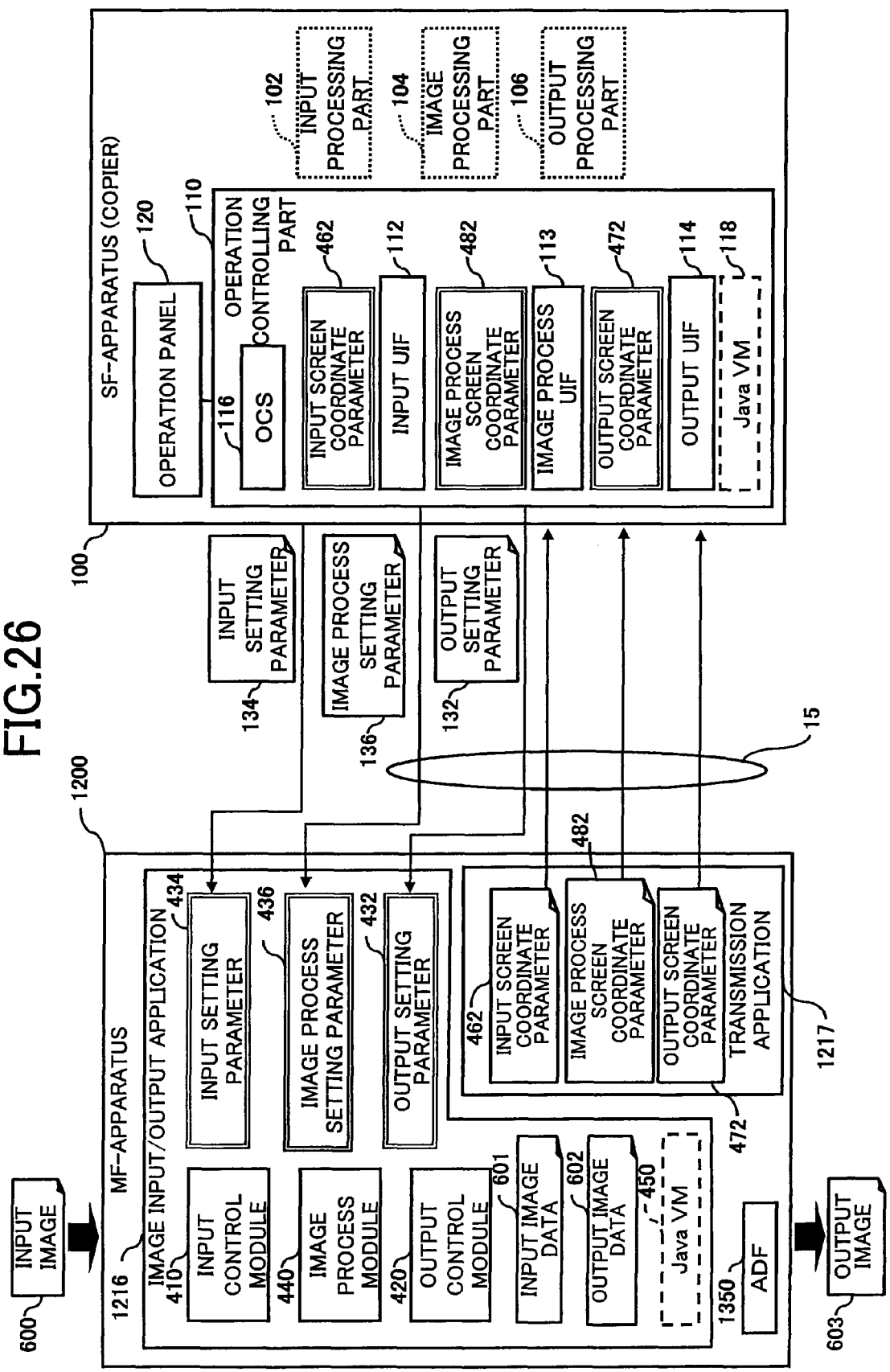
FIG. 26 is a diagram showing an example of the process pattern 2 shown in FIG. 4.

FIG. 26 is a diagram showing an example of the process pattern 2 shown in FIG. 4. In FIG. 26, only the display process is conducted by the SF-apparatus 100, and the input process, the image process, and the output process are conducted by the MF-apparatus 1200.

In FIG. 26, when the user selects the MF-apparatus 1200 as an apparatus for the input process, the image process, and the output process at the operation panel 120 of the SF-apparatus 100, in accordance with the process flow shown in FIG. 22, the input screen coordinate parameter (not shown) originally produced by the input UIF 112 is replaced with the input screen coordinate parameter 462 obtained from the MF-apparatus 1200. The input UIF 112 displays the functions for the input process that the MF-apparatus 1200 can provide, at the operation panel 120 through the OCS 116 based on the input screen coordinate parameter 462. After that, the input setting parameter 134, which is generated by the input UIF 112 so as to indicate the functions set by the user, is sent to the MF-apparatus 1200.

The input setting parameter 113 is replaced as the input setting parameter 434 of the image input/output 1216. The input control module 410 reads in the input image 600 and generates the input image data 601 at the MF-apparatus 1200.

Similarly, in accordance with the process flow shown in FIG. 23, the image process screen of the MF-apparatus 1200 is displayed at the SF-apparatus 100 by the image process screen parameter 482, with which the image process screen coordinate parameter (not shown) generated by the image process UIF 113 originally provided in the SF-apparatus 100 is replaced. The image process setting parameter 136 is generated so as to indicate the function that the user sets for the image process from the image process screen. The image process setting parameter 436 of the MF-apparatus 1200 is replaced with the image process setting parameter 136 that indicates the functions for the image process set by the user from the image process screen of the MF-apparatus 1200 and is received from the SF-apparatus 100. The image process module 440 generates the output image data 602 based on the image process setting parameter 436.

Similarly, in accordance with the process flow shown in FIG. 24, the output screen of the MF-apparatus 1200 is displayed at the SF-apparatus 100 by the output screen parameter 472, with which the image process screen coordinate parameter (not shown) generated by the output UIF 114 originally provided in SF-apparatus is replaced. The output setting parameter 432 is generated so as to indicate the function that the user sets for the output process from the output screen. The output setting parameter 432 of the MF-apparatus 1200 is replaced with the output setting parameter (not shown) that indicates the functions for the image process set by the user from the image process screen of the MF-apparatus 1200 and is received from the SF-apparatus 100. The output module 420 outputs the output image data 602 based on the output setting parameter 432.

As described above, it is possible for the user to have the MF-apparatus 1200 conduct all of the input process, the image process, and the output process through the network 15. Alternatively, the image process can be conducted at the SF-apparatus 100. In this case, the SF-apparatus 100 may obtain the input image data 601 from the MF-apparatus 1200, and send the output image data 602 generated after the image process is conducted to the input image data 601, as well as the output setting parameter 132.

Process Pattern 3

Figure 27:
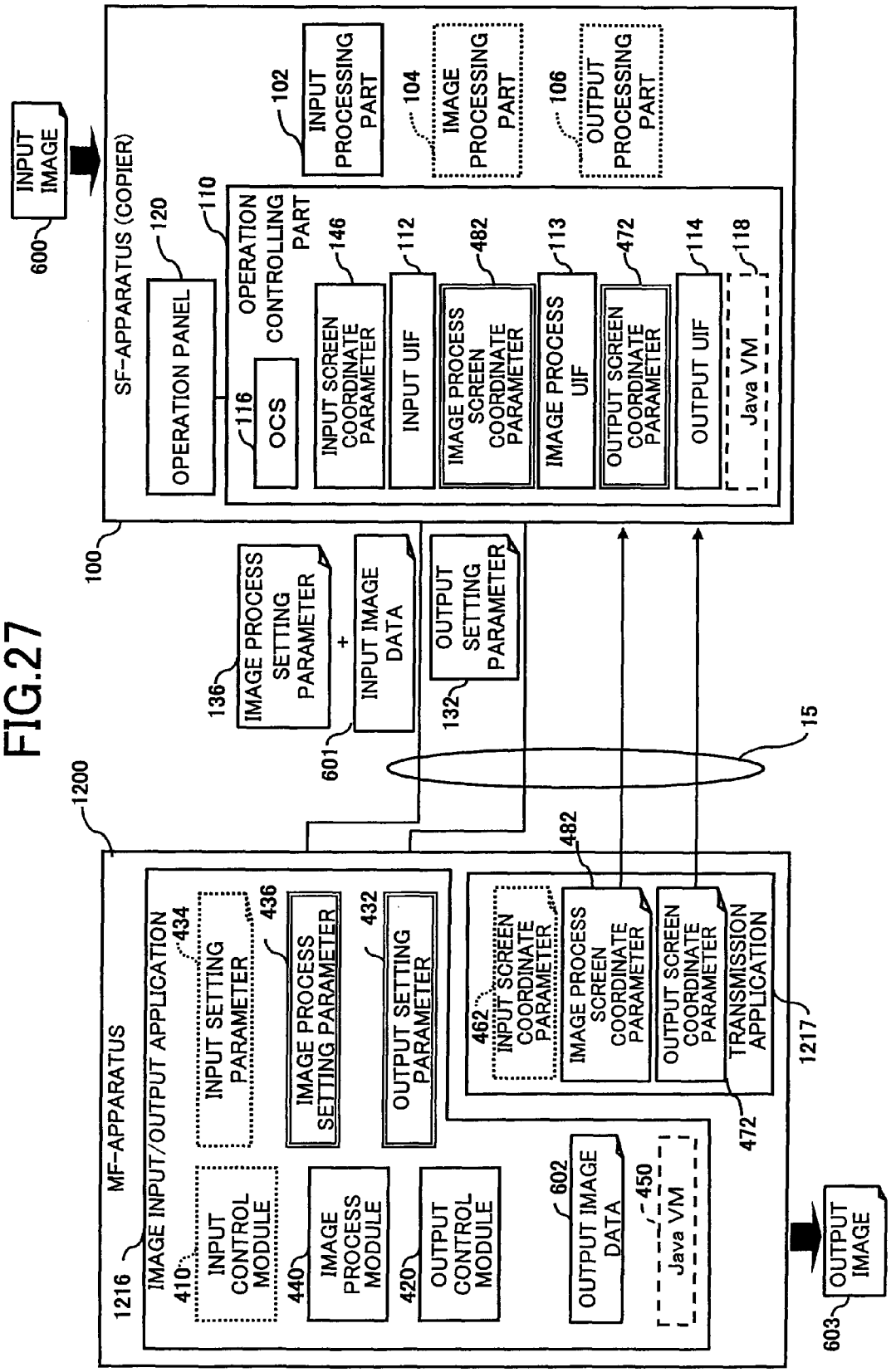
FIG. 27 is a diagram showing an example of the process pattern 3 shown in FIG. 4.

FIG. 27 is a diagram showing an example of the process pattern 3 shown in FIG. 4. In FIG. 27, the display process and the input process are conducted by the SF-apparatus 100 and the image process and the output process are conducted by the MF-apparatus 1200.

In FIG. 27, when the user selects the SF-apparatus 100 as an apparatus for conducting the input process at the operation panel 120 of the SF-apparatus 100 and selects the MF-apparatus 1200 as an apparatus for the image process and the output process, the input processing part 102 of the SF-apparatus 100 reads in the input image 600, and generates the input image data 601. After that, similar to the process pattern 1 shown in FIG. 25, the image process screen coordinate parameter (not shown) of the SF-apparatus 100 is replaced with the image process screen coordinate parameter 482 of the MF-apparatus 1200. After that, in the image input/output application 1216 of the MF-apparatus 1200, in accordance with the image process setting parameter 436 replaced with the image process setting parameter 136 received from the SF-apparatus 100, the image process module 440 generates the output image data 602. Moreover, similar to the process pattern 2 shown in FIG. 26, the output screen coordinate parameter (not shown) of the SF-apparatus 100 is replaced with the output screen coordinate parameter 472 of the MF-apparatus 1200. After that, in the image input/output application 1216 of the MF-apparatus 1200, in accordance with the output setting parameter 432 replaced with the output setting parameter 132 received from the SF-apparatus 100, the output control module 420 outputs the output image 603.

As described above, the user can conduct the input process alone at the SF-apparatus 100, and have the MF-apparatus 1200 conduct the image process and the output process. Alternatively, the image process can be conducted by the SF-apparatus 100. In this case, the SF-apparatus 100 may send the output image data 602 generated after the image process is conduct to the input image data 601 generated by the input processing part 102, with the output setting parameter 132.

The Process Pattern 4

Figure 28:
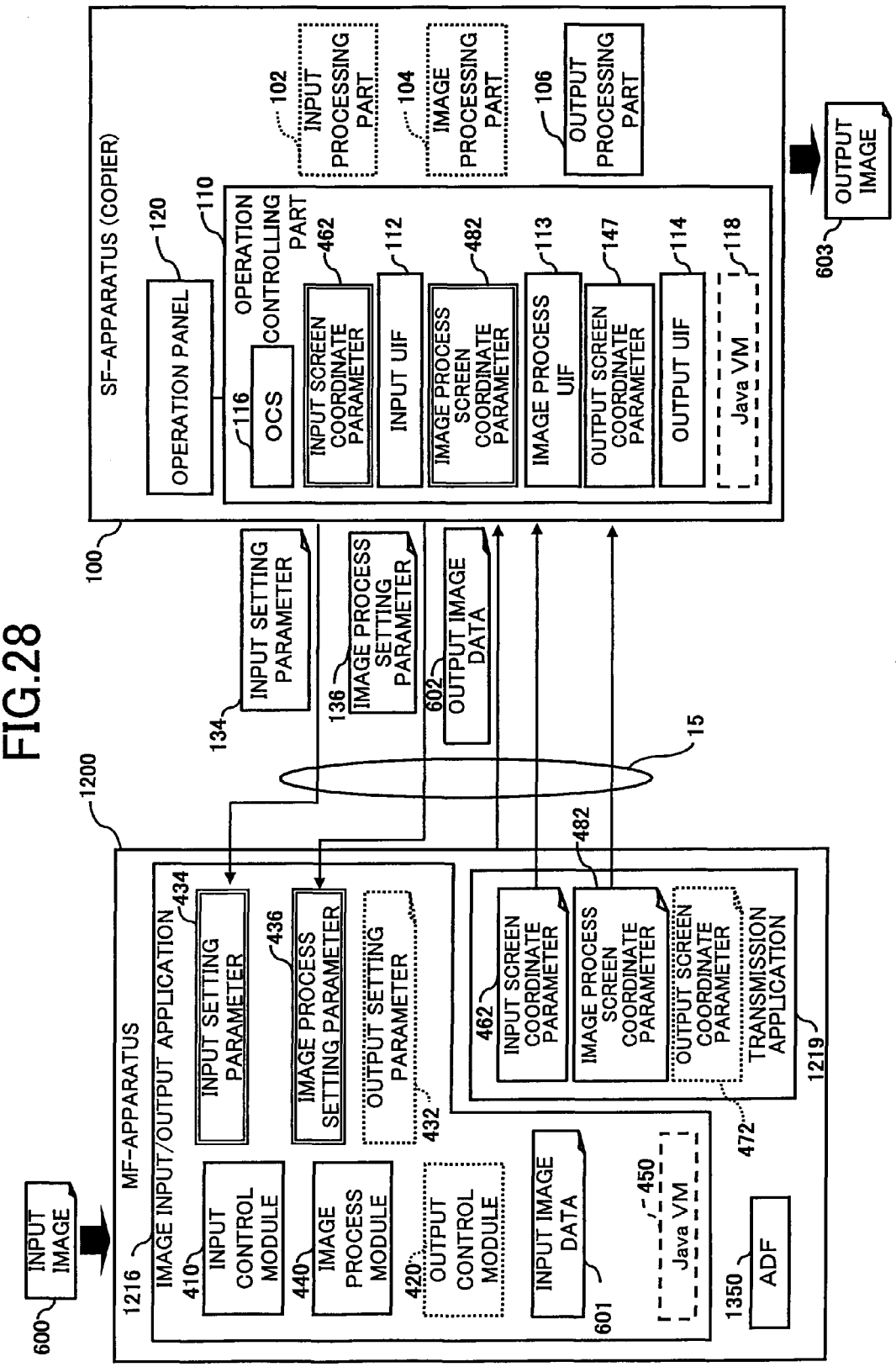
FIG. 28 is a diagram showing an example of the process pattern 4 shown in FIG. 4

FIG. 28 is a diagram showing an example of the process pattern 4 shown in FIG. 4. In FIG. 28, the display process and output process are conducted by the SF-apparatus 100, and the input process and the image process are conducted by the MF-apparatus 1200.

In FIG. 28, when the user selects the SF-apparatus 100 as an apparatus for conducting the input process and the output process at the operation panel 120 of the SF-apparatus 100, and selects the MF-apparatus 1200 as an apparatus for conducting the image process, similar to the process pattern 2 shown in FIG. 26, the input screen coordinate parameter (not shown) of the SF-apparatus 100 is replaced with input screen coordinate parameter 462 of the MF-apparatus 1200. After that, in the image input/output application 1216 of the MF-apparatus 1200, in accordance with the input setting parameter 434 replaced with the input setting parameter 134 received from the SF-apparatus 100, the input control module 410 generates the input image data 601. Moreover, the image process screen coordinate parameter (not shown) of the SF-apparatus 100 is replaced with the image process screen coordinate parameter 482 of the MF-apparatus 1200. After that, in the image input/output application 1216 of the MF-apparatus 1200, in accordance with the image process setting parameter 436 replaced with the image process setting parameter 136 received from the SF-apparatus 100, the image process module 440 generates the output image data 602. Subsequently, when the SF-apparatus 100 obtains the output image data 602 from the MF-apparatus 1200, the output process is conducted by the output processing part 106, and outputs the output image 603.

As described above, it is possible for the user at the SF-apparatus 100 to have the MF-apparatus 1200 conduct the input process and the image process. Alternatively, the image process can be conducted by the SF-apparatus 100. In this case, the SF-apparatus 100 obtains the input image data 601 from the MF-apparatus 1200, and sends the output image data 602 generated after the image process is conducted to the input image data 601, with the output setting parameter 132.

Regarding the process patterns 1 through 4, a case in which the MF-apparatus 1200 and the SF-apparatus 100 are connected to each other through the network 15. Alternatively, the present invention can be applied to more than three image processing apparatuses connecting to each other through the network 15.

As described above, in the fourth embodiment, it is possible to input the input image 600 by utilizing an option (the ADF, a both sides ADF, or a like) pertaining to the MF-apparatus 1200 connected to any image processing apparatus through the network 15. For example, by using the MF-apparatus 1200 having the both sides ADF 1350, the user can consecutively input the input image 600 (a plurality of documents) having an image on both sides, and also can output from the SF-apparatus 100 (copier) having only a press board.

Moreover, by using an option (finisher such as a punch or a stapler) pertaining to the MF-apparatus 1200, the user can output the output image 603 at the MF-apparatus 1200 connected to any SF-apparatus 100 through the network 15. For example, by using higher functions by full options, it is possible to output the output image 603 from the copier having a single function or a personal computer (PC). Since the screen coordinate parameters 462, 472, and 482 are obtained through the network 15, a new user interface is not required for the SF-apparatus 100 at which the user operates. Accordingly, the user can instruct by the same operation under the interface provided by the MF-apparatus 1200 anywhere. Also, when a new function is added to the MF-apparatus 1200 connected to the network 15, even if the SF-apparatus 100 where the user operates, the user can utilize the interface for operating the new function of the MF-apparatus 1200 and operate as if the user uses the MF-apparatus 1200.

Furthermore, if the MF-apparatus 1200 having higher functions exists on the network 15, by sending the input image data 601 to the MF-apparatus 1200 and the output image data 602 to the SF-apparatus 100, even the SF-apparatus 100, which does not have the image process as the higher functions, can realize the same higher functions as the MF-apparatus 1200. In this case, means for providing and setting the higher functions for the image process is not required for the SF-apparatus 100 as an operation side. Accordingly, the user operates in the same way at any SF-apparatus 100.

In the fourth embodiment, on the network 15, only the plotter 1321 of the MF-apparatus 1200 as an output option, the scanner 1324 of the MF-apparatus 1200 as an input option, and the SF-apparatus 100 (copier) as the input option and the output option are provided, but a plurality of the input options and the output options can be provided. All options, for example, the apparatuses connected through the network 15 and a scanner, a printer, a copier, and a like can be shared as the functions. Also, as an output, it is not limited to printing on the sheet, but as an electronic data, output data can be stored to a server for managing a document. Also, the input side can be a document management server for managing the electronic data, instead of the paper sheet. As described above, by storing as a document, an existing image data can be utilized. Accordingly, data frequently used by the user are simply maintained on the network 15, it is possible to utilize the data in many output methods by various options.

Fifth Embodiment

In a fifth embodiment, the MF-apparatus 1200 provides equivalent processes to those in the fifth embodiment, as Web service. The MF-apparatus 1200 providing the Web service will be described according to the fifth embodiment of the present invention.

A functional configuration and a hardware configuration of the MF-apparatus 1200 providing the Web service concerning the image process according to the fifth embodiment are the same as those of the MF-apparatus 1200 in the first embodiment. In the fifth embodiment, an IP-screen Web service providing process part 244 and an IP-Web service providing process part 344, that will be described later, conduct processes corresponding to the image input/output application 1216. In the fifth embodiment, an input screen, an image process screen, and an output screen are provided at the operation panel of a client apparatus connected through a network 15. The MF-apparatus 1200 providing the input process, the image process, and the output process based on a setting of the user as Web service will be described with reference to FIG. 29, FIG. 30, FIG. 31, and FIG. 32.

Figure 29:
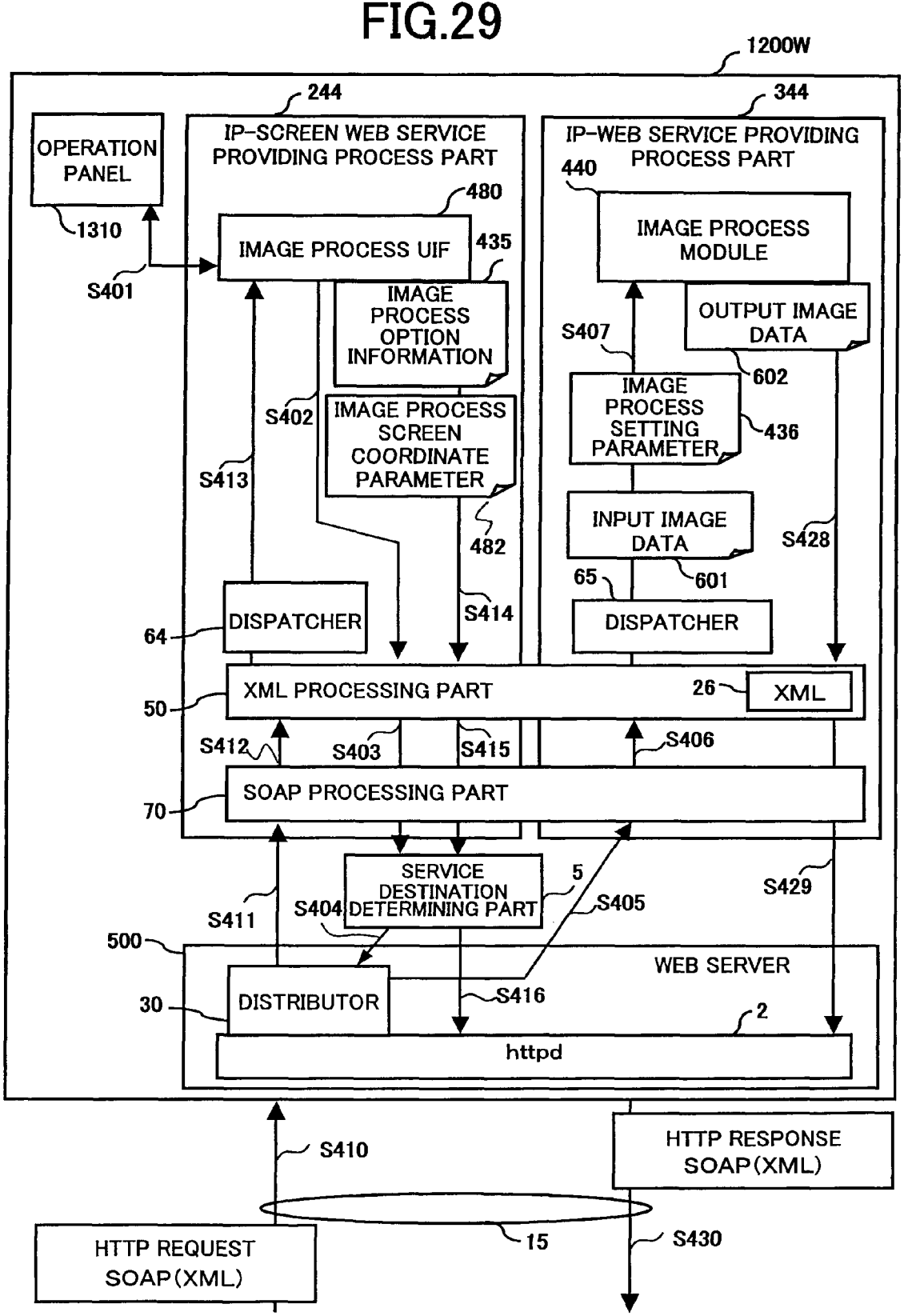
FIG. 29 is a diagram showing a first functional configuration of the MF-apparatus 1200 providing the Web service concerning the image process according to the fifth embodiment of the present invention.
Figure 30:
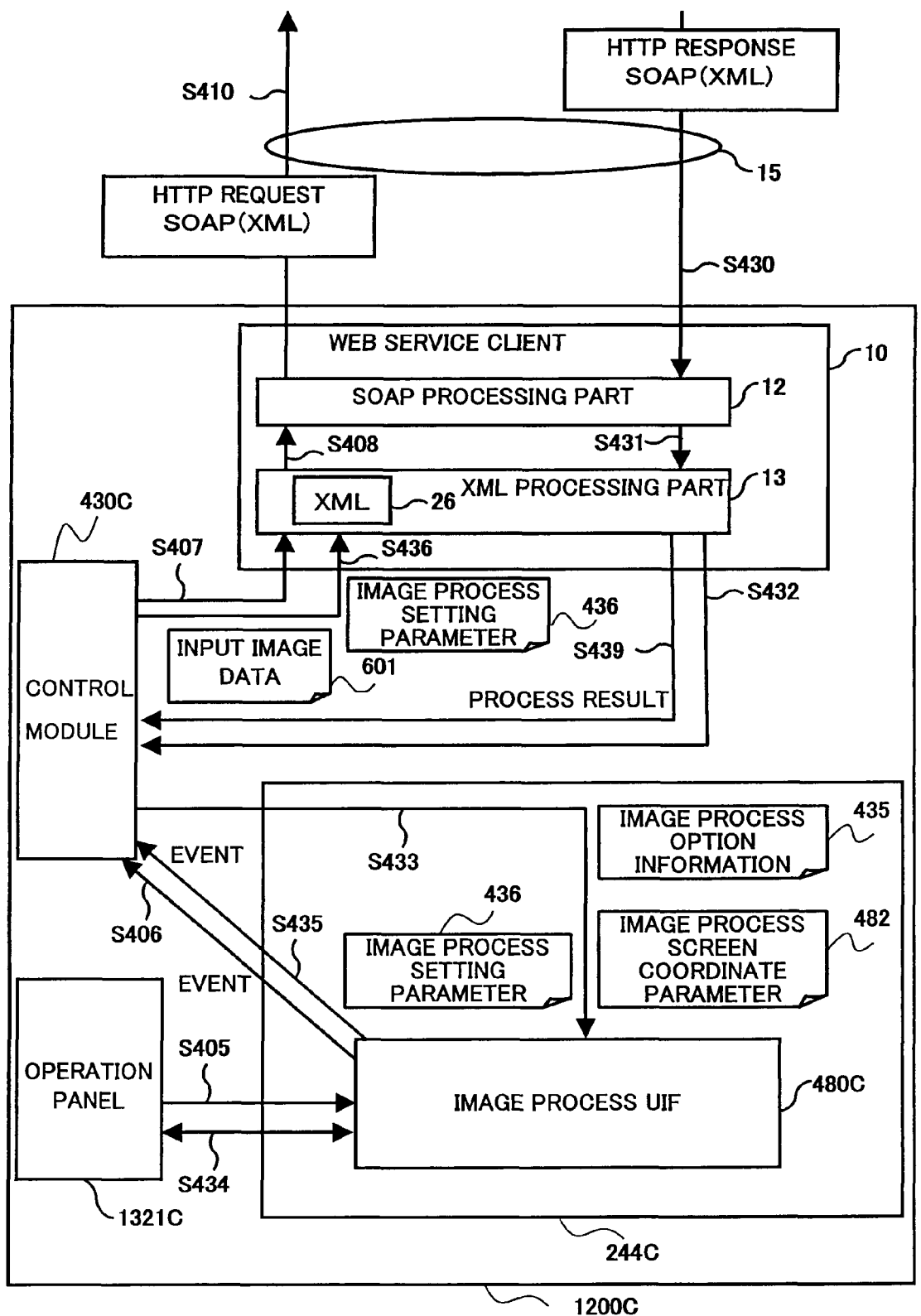
FIG. 30 is a diagram showing a first functional configuration of the client apparatus receiving the Web service form the MF-apparatus shown in FIG. 29.
Figure 31:
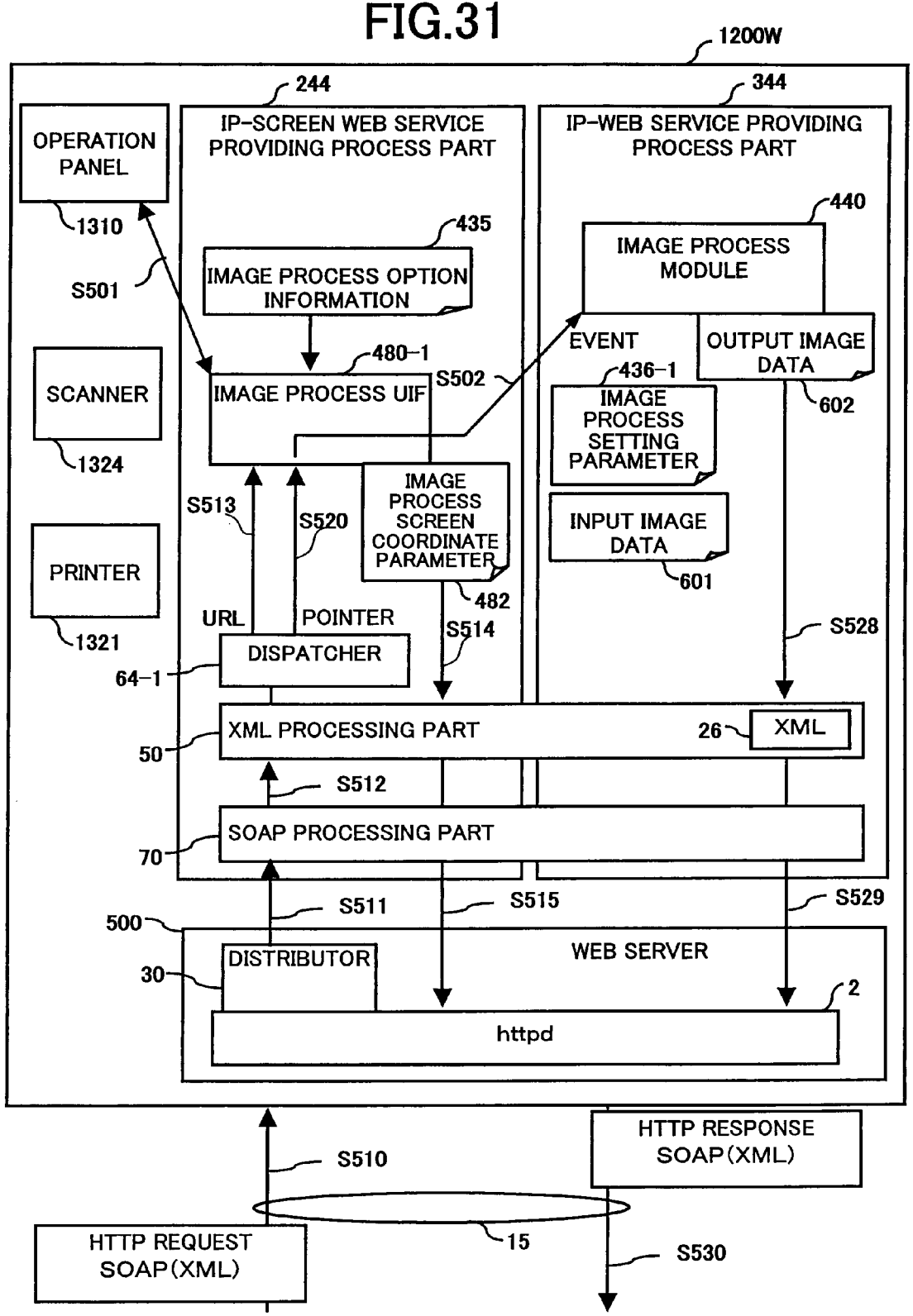
FIG. 31 is a diagram showing a second functional configuration of the MF-apparatus providing the Web service concerning the image process, according to the fifth embodiment of the present invention.

In process examples shown in FIG. 29, FIG. 30, and FIG. 31, it is assumed that at least three image processing apparatuses are connected through the network 15. That is, the MF-apparatus 1200W providing the Web service, other image processing apparatus having equivalent functions to the MF-apparatus 1200W, and a client apparatus (described later as a client apparatus 1200C) having a Web service client function are connected to each other. These process examples illustrate the image process in that the MF-apparatus 1200W providing the image process screen and the image process as the Web service, the Web service client apparatus 1200C that can receive the Web service from the MF-apparatus 1200W.

First, in FIG. 29 and FIG. 30, it is assumed that the client apparatus 1200C includes the image process UIF 480C realized by the same program as the MF-apparatus 1200W.

FIG. 29 is a diagram showing a first functional configuration of the MF-apparatus 1200 providing the Web service concerning the image process according to the fifth embodiment of the present invention. In FIG. 29, for the sake of convenience, the Web service concerning the image process will be described, but other Web service concerning the input process, and the output process can be realized in a similar functional configuration.

In FIG. 29, the MF-apparatus 1200W includes an IP-screen (Image Process screen) Web service providing process part 244, an IP-Web service (Image Process Web service) providing process part 344 for executing the image process, a service destination determining part 5 for determining whether or not a SOAP command is issued internally, and a Web server 500 for controlling communications with apparatuses connected through the network 15 by an HTTP request and an HTTP response in accordance with an http (Hypertext Transfer Protocol).

The Web server 500 includes a distributor 30 for distributing a process to the Web service providing process part 244 or 344 corresponding to a URI (Uniform Resource Identifier) or a URL (Uniform Resource Locator) indicated by the HTTP request, and an httpd (Hypertext Transfer Protocol Daemon) 2 for controlling a communication in accordance with the http (Hypertext Transfer Protocol). Also, the MF-apparatus 1200W includes a SOAP (Simple Object Access Protocol) processing part 70 for analyzing the HTTP request and creating the HTTP response in accordance with SOAP, and an XML (eXtensible Markup Language) processing part 50 for processing a message in accordance with an XML, which are shared with the Web service providing process parts 244 and 344. Moreover, the Web service providing process parts 244 and 344 include dispatchers 64 and 65, respectively, for separately obtaining parameters and a data file in the message and dispatching the parameters and the data file thereto.

First, a process flow will be described in that the MF-apparatus 1200W displays the image process screen at the operation panel 1310 of the MF-apparatus 1200W, and conducts the image process in accordance with the image process setting parameter 436 indicating a setting of the user.

In response to a request of the image process screen from the user, the image process UIF 480 generates the image process screen coordinate parameter 482 based on the image process option information 435, and then display the image process screen at the operation panel 1310. When the image process UIF 480 generates the image process screen coordinate parameter 482, the image process UIF 480 sets request sender information showing that the MF-apparatus 1200W itself made the request of the image process screen. From the image process screen displayed at the operation panel 1310, the user sets the function options (step S401). In order to internally issue a SOAP command in respect to the IP-Web service providing process part 344, the image process UIF 480 sends a response in which a service destination is set as the IP-Web service providing process part 344, to the XML processing part 50 (step S402). The image process UIF 480 determines based on the request sender set in the image process screen coordinate parameter 482 (in this case, the MF-apparatus 1200W) whether or not the SOAP command is to be issued internally.

The image process UIF 480 sends the XML processing part 50 a message including the function options corresponding to the position coordinates as image process setting parameter 436 and the input image data 601, which is processed as an attachment, by using position coordinates received from the operation panel 1310, the image process screen coordinate parameter 482, and the image process option information 435. The image process setting parameter 436 and the input image data 601 can be attachments. Alternatively, only the image process setting parameter 436 is processed by the XML processing part 50, and the input image data 601 can be obtained by the IP-Web service providing process part 344 as necessary.

The XML processing part 50 generates an XML 26 showing the response and creates the SOAP command (step S403). The service destination determining part 5 determines whether or not the SOAP command created by the SOAP processing part 70 is internally issued. In this case, it is determined that the SOAP command is internally issued. Accordingly, the service destination determining part 5 sends the SOAP command to the distributor 30 (step S404).

When the distributor 30 receives the SOAP command from the service destination determining part 5, the distributor 30 distributes a process to the IP-Web service providing process part 344 (step S405). The SOAP processing part 70 processes the SOAP command issued by the image process UIF 480 received as an HTTP response in accordance with SOAP (step S406). Moreover, the dispatcher 65 obtains the image process setting parameter 436 and the image data 601 from the message process by the XML processing part 50, and then send to the image process control module 440. The image process control module 440 conducts the image process in respect to the input image data 601 in accordance with the image process setting parameter 436, and then generates the output image data 602.

Next, a process flow will be described in that the HTTP request requesting the image process screen is received from the client apparatus 1200C.

When the Web server 500 receives the HTTP request requesting the image process screen from the client apparatus 1200C in accordance with HTTP by the httpd 2 (step S410), the Web server 500 sends the HTTP request to the IP-screen Web service providing process part 244 by the distributor 30 (step S411). The IP-screen Web service providing process part 244 processes the request in accordance with SOAP by the SOAP processing part 70, and then send the request to the XML processing part 50 (step S412). The XML processing part 50 processes a message described in XML, and then the dispatcher 64 obtains the message and sends the massage to the image process UIF 480 (step S413).

The image process UIF 480 indicates the client apparatus 1200C as destination in response to the request of the image process screen from the client apparatus 1200C and then sends the image process option information 435 and the image process screen coordinate parameter 482 to the XML processing part 50 (step S414). The XML processing part 50 generates the XML 26 as a message describing the image process option information 435 and the image process screen coordinate parameter 482 in XML. A response is generated in accordance with SOAP by the SOAP processing part 70 and sent to the service destination determining part 5 (step S415).

In this case, the service destination determining part 5 determines that the destination is not any one of the Web service providing process parts 244 and 344, and then sends the response to the httpd 2 (step S416). The httpd 2 sends the response as a HTTP response in accordance with HTTP (step S430).

Moreover, when the Web server 500 receives the HTTP request requesting the image process from the client apparatus 1200C (step S410), the steps S405, S406, and S407 are conducted as described above. When the IP-Web service providing process part 344 receives the process request, the process control module 440 conducts the image process in respect to the input image data 601 based on the image process setting parameter 436, sends a process result of generating the output image data 602 to the XML processing part 50 (step S428). In this case, the output image data 602 can be provided as an attachment to the client apparatus 1200C. Alternatively, the output image data 602 can be provided in response to a request of obtaining the output image data 602.

The XML processing part 50 generates the XML 26 describing a process result in XML. Then, a response is sent to the httpd 2 of the Web server 500 in accordance with SOAP by the SOAP processing part 70 (step S429). The httpd 2 sends the response received from the SOAP processing part 70 as the HTTP response in accordance with HTTP (step S430).

For example, by a similar functional configuration, an input screen Web service providing process part for providing screen for the input process and an input Web service providing process part for conducting the input process can be realized. Also, an output screen web service providing process part for providing a screen for the output process and an output Web service providing process part for conducting the output process can be realized. Moreover, by providing the service destination determining part 5 for determining whether or not the SOAP command is internally issued in respect to the response provided from the input screen Web service providing process part or the output screen Web service providing process part, it is possible to internally utilize the input Web service providing process part and the output Web service providing process part.

Next, FIG. 30 is a diagram showing a first functional configuration of the client apparatus receiving the Web service form the MF-apparatus shown in FIG. 29. In FIG. 30, the client apparatus 1200C mainly includes an image process screen processing part 244C for displaying the image process screen provided from the MF-apparatus 1200W at the operation panel 1310C and conducting the image process, a Web service client 10 for controlling a communication with the MF-apparatus 1200W in accordance with SOAP, and a control module 430C for controlling an event from the image process screen processing part 244C.

The image process screen processing part 244C includes an image process UIF 480C for displaying the image screen at the operation panel 1310C based on the image process screen coordinate parameter 482.

The Web service client 10 includes a SOAP processing part 12 for controlling a message exchange in accordance with SOAP, and an XML processing part 13 for processing a message described in XML.

In FIG. 30, when the user selects an image process screen of the MF-apparatus 1200W from an initial screen displayed at the operation panel 1310C by the control module 430C (step S405), the image process UIF 480C sends an event indicating a request of the image process screen to the control module 430C (step S406). The control module 430C sends the request of the image process screen to the Web service client 10 based on the event (step S407). The Web service client 10 generates the XML 26 describing a message in which contents of the request is indicated, in XML by the XML processing part 13. The Web service client 10 sends the message to the SOAP processing part (step S408). The SOAP processing part 12 sends the XML 26 to the MF-apparatus 1200W in accordance with SOAP by the SOAP processing part 12 (step S410).

When the Web service client 10 receives the HTTP response for the HTTP request showing the request of the image process screen from the client apparatus 1200C (step S430), the SOAP processing part 12 processes the HTTP response in accordance with SOAP (step S431). The XML processing part 13 obtains the image process option information 435 and the image process screen coordinate parameter 482 from the message described in XML and sends those to the control module 430C (step S432). Moreover, the control module 430C sends the image process screen coordinate parameter 482 to the image process UIF 480C (step S433).

When the image process UIF 480C displays the image process at the operation panel 1310C and the user sets the function for the image process (step S434), the image process UIF 480C generates the image process setting parameter 436 showing the function options corresponding to the position coordinates from the position coordinates where the user indicates on the operation panel 1310 based on the image process screen coordinate parameter 482 and the image process option information 435, and sends the event to the control module 430C (step S435).

The control module 430C sends the image process setting parameter 436 to the XML processing part 13 (step S436). The XML processing part 13 generates the XML 26 describing the image process setting parameter 436 in XML. As described above, by conducting the steps S405 and S410, the HTTP request showing the request of the image process is sent to the MF-apparatus 1200W. After that, when the Web service client 10 of the client apparatus 1200C receives the HTTP response showing the process result of the image process in respect to the HTTP request indicating the image process (step S430), the SOAP processing part 12 processes the HTTP response in accordance with SOAP (step S431), the XML processing part 13 obtains the message showing the process result and sends to the control module 430C (step S439).

Accordingly, the client apparatus 1200C is not required to have the Web service functions such as the input control, the image process, the output control, and a like. And the client apparatus 1200C can request the MF-apparatus 1200W to conduct those processes as higher functions through the network 15.

By providing the first functional configuration of the client apparatus 1200C shown in FIG. 30 to the MF-apparatus 1200W shown in FIG. 29, the MF-apparatus 1200W can share screens or functions among a plurality of MF-apparatus 1200W since the MF-apparatus 1200W includes the Web client function.

Next, in FIG. 31 and FIG. 32, another process example will be described in that the client apparatus 1200C includes an image process UIF 480C-1 different from the image process UIF 480 of the MF-apparatus 1200W, and only a similar screen to the MF-apparatus 1200C can be conducted at the client apparatus 1200C.

FIG. 31 is a diagram showing a second functional configuration of the MF-apparatus providing the Web service concerning the image process, according to the fifth embodiment of the present invention. In FIG. 31, for the sake of convenience, the Web service concerning the image process is illustrated, but by a similar configuration, other Web service concerning the input process and the output process can be realized.

In FIG. 31, the MF-apparatus 1200W includes an IP-screen (Image Process screen) Web service providing process part 244, an IP-Web service (Image Process Web service) providing process part 344 for executing the image process, and a Web server 500 for controlling communications with apparatuses connected through the network 15 by an HTTP request and an HTTP response in accordance with an http (Hypertext Transfer Protocol).

The Web server 500 includes a distributor 30 for distributing a process to the Web service providing process part 244 or 44 corresponding to an URI (Uniform Resource Identifier) or an URL (Uniform Resource Locator) indicated by the HTTP request, and an httpd (Hypertext Transfer Protocol Daemon) 2 for controlling a communication in accordance with an http (Hypertext Transfer Protocol). Also, the MF-apparatus 1200W includes an SOAP (Simple Object Access Protocol) processing part 70 for analyzing the HTTP request and creating the HTTP response in accordance with SOAP, and an XML (eXtensible Markup Language) processing part 50 for processing a message with a XML, which are shared with the Web service providing process parts 244 and 344. Moreover, the Web service providing process part 244 include a dispatcher 64-1 for separately obtaining parameters and a data file in the message and dispatching the parameters and the data file thereto.

First, a process flow will be described in that the MF-apparatus 1200W displays the image process screen at the operation panel 1310 of the MF-apparatus 1200W and the image process is conducted in accordance with the image process setting parameter 436-1 showing a setting of the user. In response to a request of the image process from the user, the image process UIF 480-1 generates the mage process screen coordinate parameter 482 based on the image process option information 435, and display the image process screen at the operation panel 132. When the image process UIF 480-1 generates the image process screen coordinate parameter 482, the image process UIF 480-1 sets request sender information showing that the MF-apparatus 1200W itself made the request of the image process screen, in the image process screen coordinate parameter 482. The user set the function options from the image process screen displayed at the operation panel 1310 (step S501). The image process UIF 480-1 generates position coordinates (pointer) where the user set, as the image process setting parameter 436-1, and determines whether or not the request sender information of the image process screen coordinate parameter 482 indicate the MF-apparatus 1200W itself. In this case, the request sender information indicates the MF-apparatus 1200W itself, the image process UIF 480-1 sends an event to the image process Web service providing process part 344 (step S502).

When the image process control module 440 receives the event, the image process control module 440 conducts the image process in respect to the input image data 601 based on the image process setting parameter 436-1, and generates the output image data 602.

Next, a process flow will be described in that the HTTP request requesting the image process screen from the client apparatus 1200C is received.

When the Web server 500 receives the HTTP request for requesting the image process screen from the client apparatus 1200C in accordance with HTTP by httpd 2 (step S510), the distributor 30 sends the HTTP request as a request to the image process screen Web service providing process part 244 (step S511). The IP-screen Web service providing process part 244 processes the request in accordance with SOAP by the SOAP processing part 70, and sends to the XML processing part 50. The XML processing part 50 processes the message describing in XML, the dispatcher 64-1 obtains the message and determines whether or not the message indicates the URL. In this case, since the message indicates the URL, the dispatcher 64-1 notices the image process UIF 480-1 by the URL (step S513).

The image process UIF 480-1 generates the image process screen coordinate parameter 482 based on the image process option information 435. The image process UIF 480-1 the client apparatus 1200C as the request sender information of the image process screen coordinate parameter 482, and sends the image process screen coordinate parameter 482 to the XML processing part 50 (step S514). The XML processing part 50 generates the XML 26 as the message describing the image process screen coordinate parameter 482 in XML, and a response is generated in accordance with SOAP by the SOAP processing part 70. The response is sent to the httpd 2 of the Web server 500 (step S515). The httpd 2 sends the request as the HTTP response in accordance with HTTP (step S530).

Moreover, when the Web server 500 receives the HTTP request requesting the image process from the client apparatus 1200C (step S510), similar to the process for the HTTP request requesting the image process screen, the steps S511 and S512 are conducted. The dispatcher 64-1 notices the image process UIF 480-1 that the request shows the position coordinate (pointer) where the user indicates on the screen (step S520). In the same manner, the image process UIF 480-1 generates the image process setting parameter 436-1 showing the function options corresponding to the position coordinates (pointer) and sends an event the image process control module 440 (step S502).

When the image process control module 440 receives the event, the image process control module 440 conducts the image process in respect to the input image data 602 based on the image process setting parameter 436-1 and generates the output image data 602. The process result of the image process is sent to the XML processing part 50 (step S528). In this case, the output image data 602 can be an attachment to provide to the client apparatus 1200C. Alternatively, the output image data 602 can be provided in response to a request of obtaining output image data 602.

The XML processing part 50 generates the XML 26 describing the process result in XML, the XML 26 as a response is processed by the SOAP processing part 70 in accordance with SOAP, the response is sent to the httpd 2 of the Web server 500 (step S529). The httpd 2 sends the HTTP response in accordance with HTTP to the client apparatus 1200C (step S530).

For example, by the same functional configuration as the second functional configuration of the MF-apparatus 1200W, an input screen Web service providing process part for providing screen for the input process and an input Web service providing process part for conducting the input process can be realized. Also, an output screen web service providing process part for providing a screen for the output process and an output Web service providing process part for conducting the output process can be realized. Moreover, by providing the service destination determining part 5 for determining whether or not the SOAP command is internally issued in respect to the response provided from the input screen Web service providing process part or the output screen Web service providing process part, it is possible to internally utilize the input Web service providing process part and the output Web service providing process part.

Figure 32:
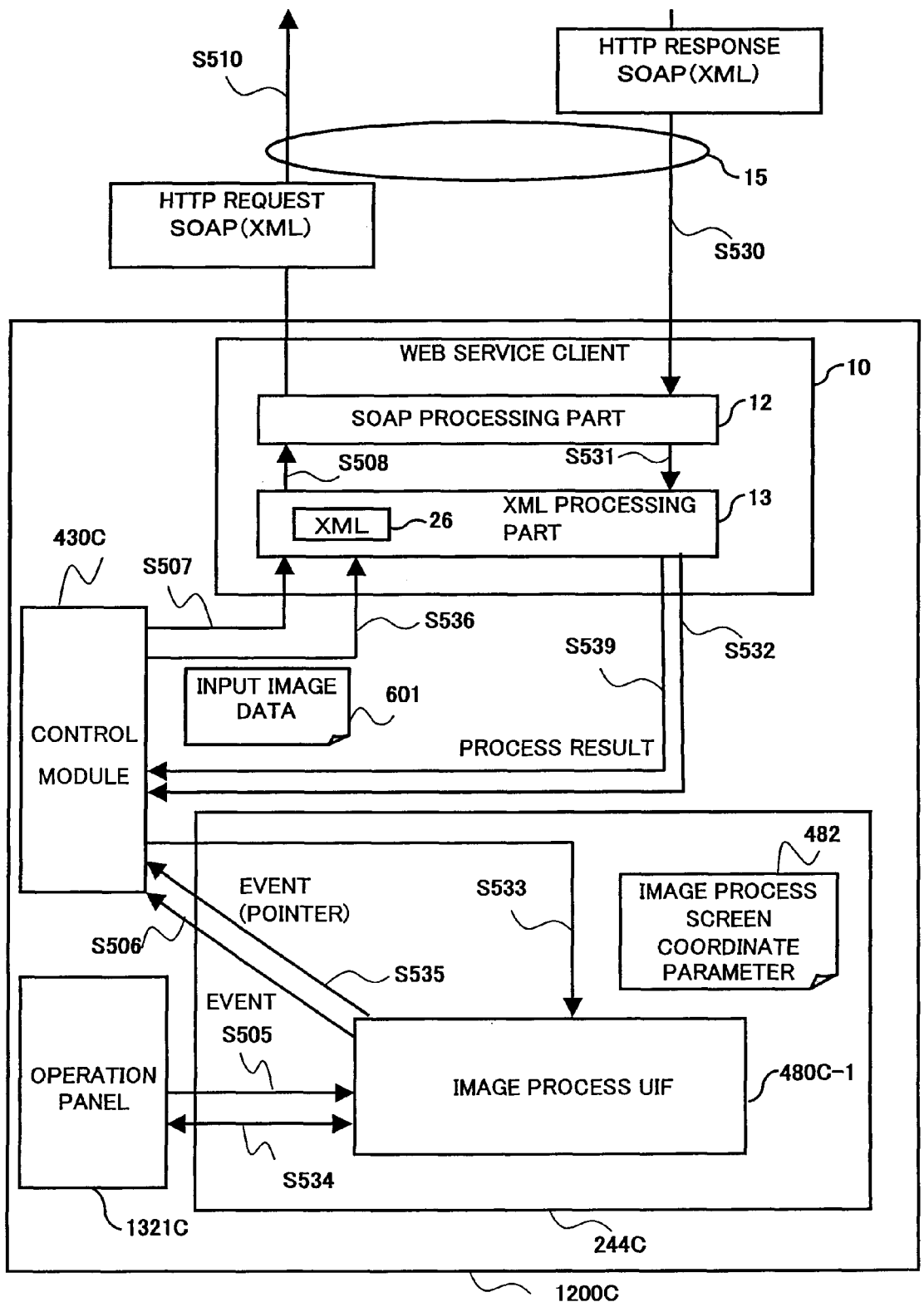
FIG. 32 is a diagram showing a second functional configuration of the client apparatus receiving the Web service from the MF-apparatus shown in FIG. 31.

Next, FIG. 32 is a diagram showing a second functional configuration of the client apparatus receiving the Web service from the MF-apparatus shown in FIG. 31. In FIG. 32, the client apparatus 1200C mainly includes an image process screen processing part 244C for displaying the image process screen provided from the MF-apparatus 1200W at the operation panel 1310C and conducting the image process, a Web service client 10 for controlling a communication with the MF-apparatus 1200W in accordance with SOAP, and a control module 430C for controlling an event from the image process screen processing part 244C.

In FIG. 32, when the user select the image process screen of the MF-apparatus 1200 from an initial screen displayed at the operation panel 1310C by the control module 430C (step S505), the image process UIF 480C-1 sends an event indicating a request of the image process screen to the control module 430C (step S507). The Web service client 10 generates the XML 26 describing a message showing contents of the request in XML by the XML processing part 13, and sends to the SOAP processing part 12 (step S508). The SOAP processing part 12 sends the XML 26 in accordance with SOAP to the MF-apparatus 1200W (step S510).

When the Web service client 10 receives the HTTP response for the HTTP request showing the request of the image process screen of the client apparatus 1200C (step S530), the HTTP response is process in accordance with SOAP by the SOAP processing part 12 (step S531). XML processing part 13 obtains the image process option information 435 and the image process screen coordinate parameter 482 from the message described in XML and sends those to the control module 430C (step S532). Moreover, the control module 430C sends the image process screen coordinate parameter 482 to the image process UIF 480C-1 (step S533).

When the image process UIF 480C-1 displays the image process at the operation panel 1310C and the user sets the function for the image process (step S534), the image process UIF 480C-1 sends the position coordinates (pointer) where the user indicate on the operation panel 1310C to the control module 430C (step S535).

The control module 430C sends the image process setting parameter 436 to the XML processing part 13 (step S536). The XML processing part 13 generates the XML 26 describing the image process setting parameter 436 in XML. As described above, by conducting the steps S505 and S510, the HTTP request showing the request of the image process is sent to the MF-apparatus 1200W. After that, when the Web service client 10 of the client apparatus 1200C receives the HTTP response showing the process result of the image process in respect to the HTTP request indicating the image process (step S530), the SOAP processing part 12 processes the HTTP response in accordance with SOAP (step S531), the XML processing part 13 obtains the message showing the process result and sends to the control module 430C (step S539).

Accordingly, the client apparatus 1200C is not required to have the Web service functions such as the input control, the image process, the output control, and a like. And the client apparatus 1200C can request the MF-apparatus 1200W to conduct those processes as higher functions through the network 15.

By providing the first functional configuration of the client apparatus 1200C shown in FIG. 32 to the MF-apparatus 1200W shown in FIG. 31, the MF-apparatus 1200W can share screens or functions among a plurality of MF-apparatus 1200W since the MF-apparatus 1200W includes the Web client function.

Figure 33:
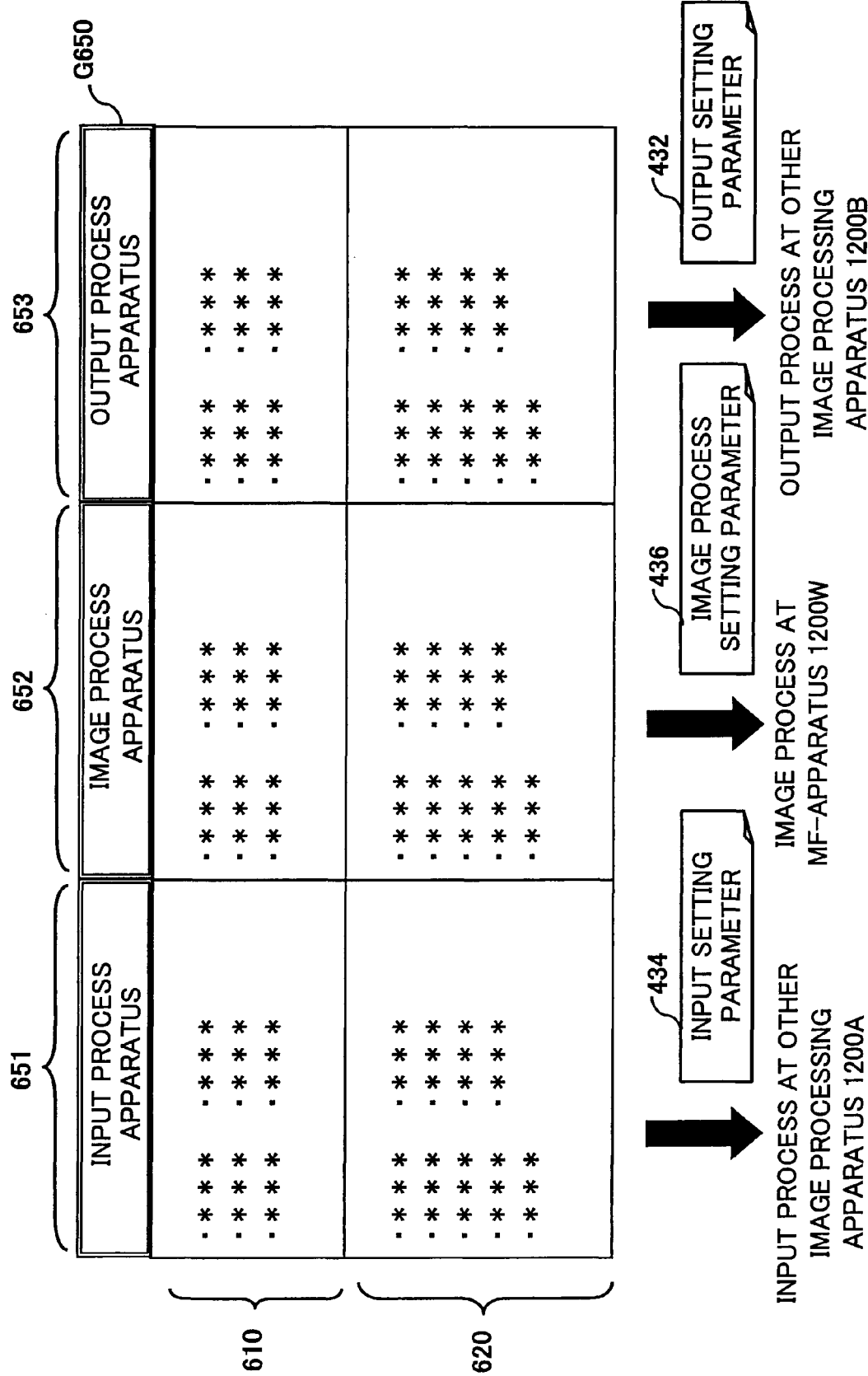
FIG. 33 is a diagram showing an example a screen displayed at the client apparatus.

For example, a screen G650 shown in FIG. 33 can be displayed at the operation panel 1310C of the client apparatus 1200C. FIG. 33 is a diagram showing an example a screen displayed at the client apparatus. In FIG. 33, the screen G650 includes a display area 651 for indicating one apparatus for input process, a display area 652 for indicating one apparatus for conducting the image process, and a display area 653 for indicating one apparatus for conducting the output process. Each of the display areas 651, 652, and 653 includes a display area 610 for displaying a list of available apparatuses, and a display area 620 for displaying a list of functions that an apparatus selected by the user can provide.

In the screen G650, the user selects other image apparatus 1200A, and then selects from functions that the other image processing apparatus 1200A. In addition, the user selects the MF-apparatus 1200W for conducting the image process at the display area 610, and then selects from the function that the MF-apparatus 1200W can provide. Moreover, the user selects other image processing apparatus 1200B for conducting the output process at the display area 610, and then selects from the functions that the MF-apparatus 1200B can provide. These selections of the user are sent to the other image processing apparatus 1200A, the MF-apparatus 1200W, and the other image processing apparatus 1200B as the input setting parameter 434, the image process setting parameter 436, the output setting parameter 432, respectively.

According to the fourth embodiment and the fifth embodiment of the present invention, it is possible to utilize the user interfaces provided by each image processing apparatus having different user interface. And it is possible to conduct the same processes even if the user interfaces are different from each other such as user interfaces requiring originally different operations for a color process and a black and white process. Also, a special technique is not required to develop. Thus, even if the user interfaces are different from each other, it is possible for the user to conduct the same processes by using the operation panels 1321 and 1321C originally provided in the MF-apparatus 1200W and the client apparatus 1200C. Furthermore, it is possible to easily maintain and improve each module.

Sixth Embodiment

In a sixth embodiment, a functional configuration and a hardware configuration of the MF-apparatus 1200 providing option information 431, 433, and 435 according to the sixth embodiment are the same as those of the MF-apparatus 1200 in the first embodiment.

In the sixth embodiment, the MF-apparatus 1200 provides the option information 431, 433, and 435 only.

Figure 34:
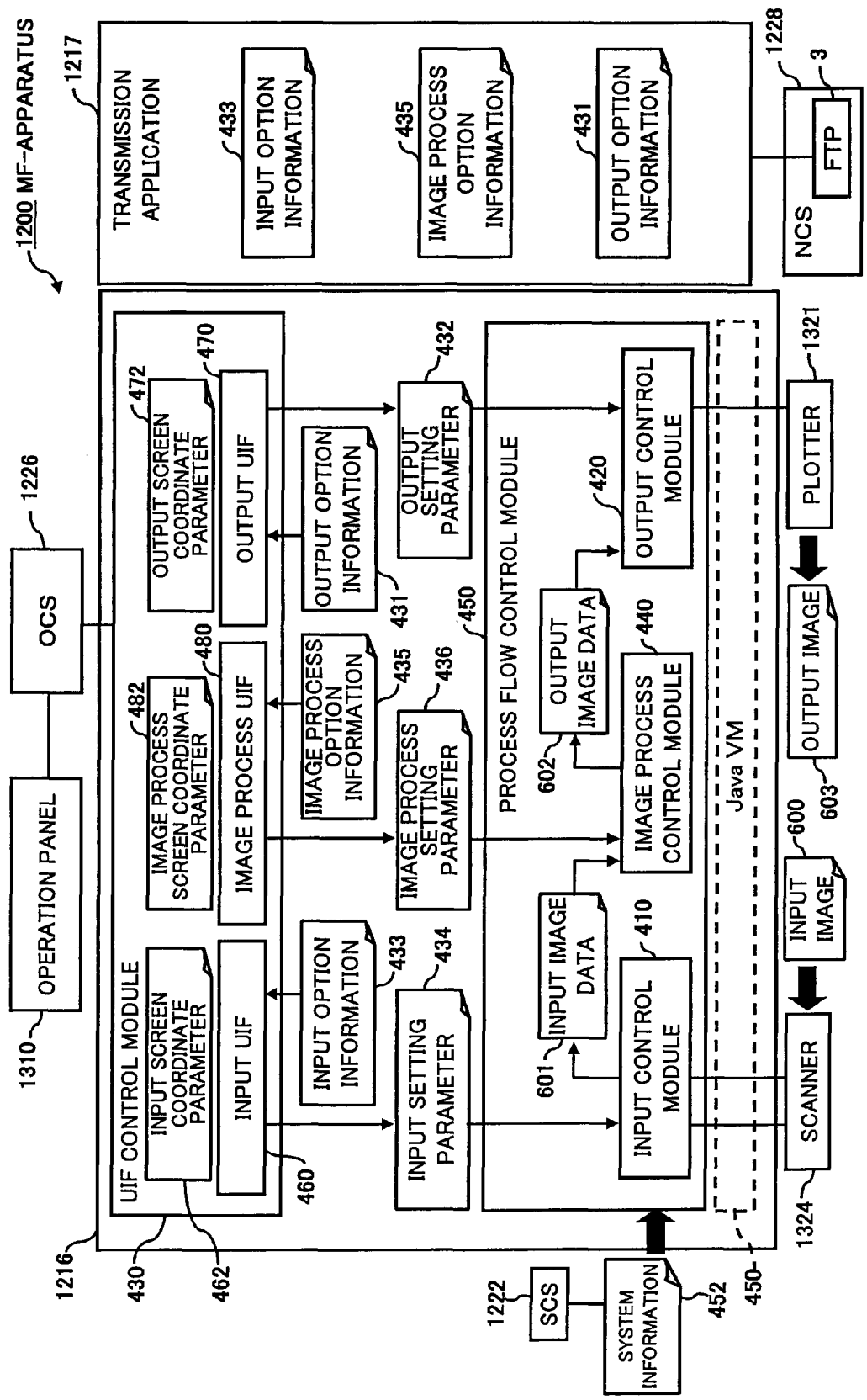
FIG. 34 is a diagram showing functional configurations of the image input/output application and the transmission application according to the sixth embodiment.

FIG. 34 is a diagram showing functional configurations of the image input/output application and the transmission application according to the sixth embodiment. In FIG. 34, parts that are the same as the ones in FIG. 3 are indicated by the same reference numerals and explanation thereof will be omitted. In the MF-apparatus 1200 according to the sixth embodiment, in order for another apparatus to utilize an input process, an image process, and an output process available at the MF-apparatus 1200 through the network 15, the transmission application 1217 transmits the option information 431, 433, and 435, respectively, in response to a request of the option information from the other apparatus used by a user.

When the transmission application 1217 receives a request of the input option information 433, the transmission application 1217 transmits the input option information 433 realizing a similar screen display of the MF-apparatus 1200, to the apparatus by the FTP 3. In the same manner, when the transmission application 1217 receives a request of the image process option information 435 or the output option information 433, the transmission application 1217 transmits the image process option information 435 or the output option information 433 by the FTP 3.

By downloading each of the screen coordinate parameters 462, 482, and 472, it is possible for an other apparatus to display a plurality of functions available in the MF-apparatus 1200. Then, the setting parameters 434, 436, and 432 set by the user at the other apparatus are respectively transmitted to the MF-apparatus 1200. The MF-apparatus 1200 replaces the input setting parameter 434, the image process setting parameter 436, and the output setting parameter 432 with the setting parameters received from the other apparatus, respectively. Accordingly, it is possible for the MF-apparatus 1200 to conduct in accordance with the setting parameters that are set by the user at the other apparatus.

In the functional configuration of the image input/output application 1216 shown in FIG. 34, the input control module 410, the image process module 440, the output control module 420, and the UIF control module 430 may be realized by Java™ programs. In this case, a Java VM (Virtual Memory) 450, which is shown by dashed lines, may be provided to execute the Java™ programs. The input option information 433, the image process option information 435, and the output option information 431 are also provided in the data structure readable by the Java™ programs. In the other apparatus connected through the network 15 to the MF-apparatus 1200, if the Java™ programs can be executable, the input option information 433, the image process option information 435, and the output option information 431 can be provided without depending on hardware of the other apparatus.

For example, in a case in which the other apparatus connected to the MF-apparatus 1200 through the network 15 has a lower function than that of the MF-apparatus 1200 or only a single function (hereinafter, called an SF-apparatus 100 (single functional image forming apparatus)), this SF-apparatus 100 obtains the input option information 433, the image process option information 435, and the output option information 431 from the MF-apparatus 1200. Therefore, it is possible for the SF-apparatus 100 to provide the user higher functions provided by the MF-apparatus 1200.

Examples of process flows for displaying the functions of the MF-apparatus 1200 at the operation panel of the SF-apparatus 100 will be described, according to the sixth embodiment of the present invention. Also, in the sixth embodiment, the input option information 433 realizes the input screen G600 shown in FIG. 5, the image process option information 435 realizes the image process screen G630 shown in FIG. 7, and the output option information 431 realizes the output process screen G640 shown in FIG. 9. Therefore, the explanations of the screens G600, G630, and G640 will be omitted.

Figure 35:
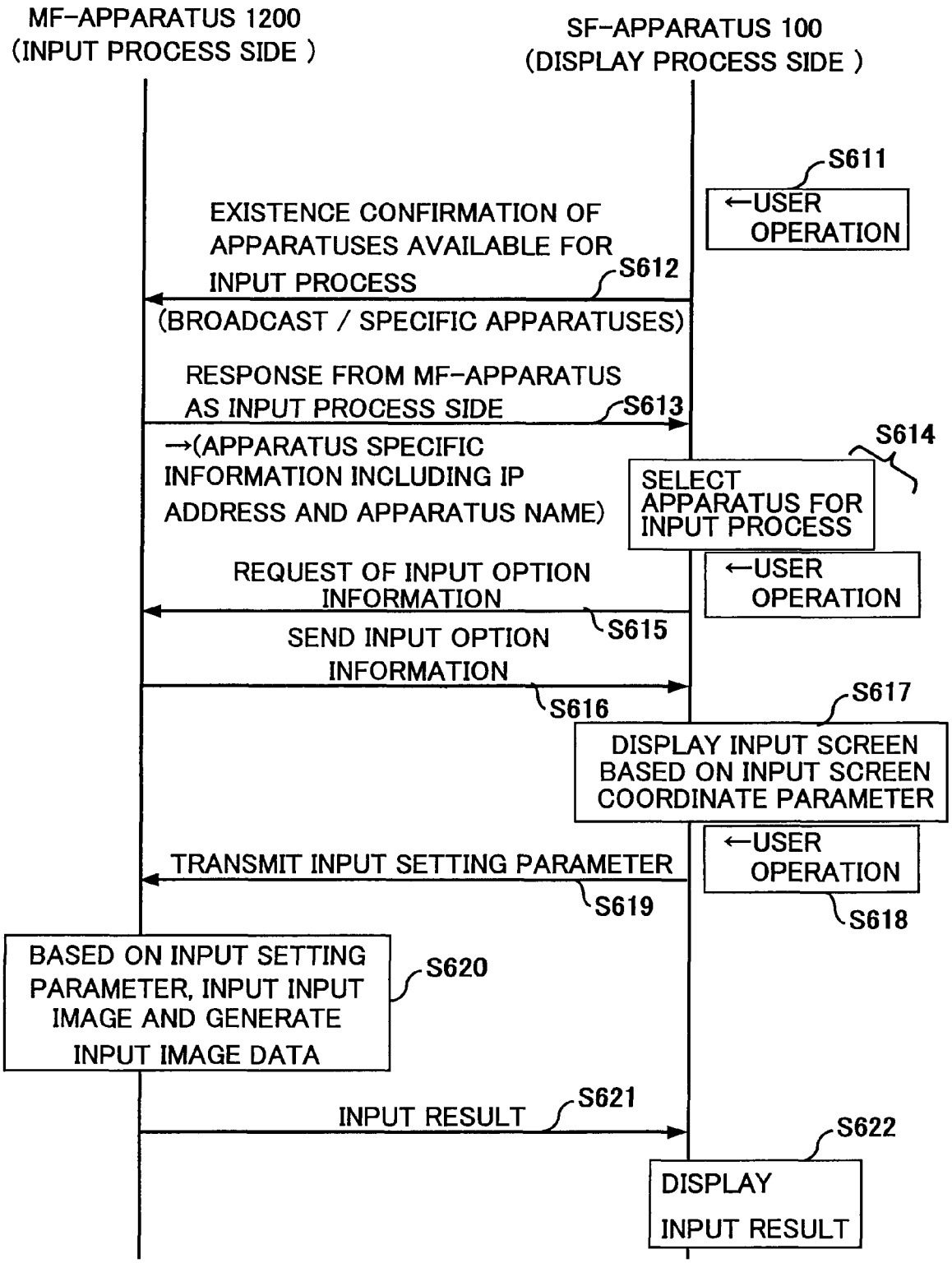
FIG. 35 is a flow chart diagram for explaining the process flow to realize a display of the input screen of the MF-apparatus at the SF-apparatus.

A process flow, which is conducted between the MF-apparatus 1200 and the SF-apparatus 100 in response to operations of the user at the input screen G600 in FIG. 5, will be described with reference to FIG. 35. FIG. 35 is a flowchart diagram for explaining the process flow to realize a display of the input screen G600 of the MF-apparatus 1200 at the SF-apparatus 100.

In FIG. 35, when the user selects the button 61 to indicate one apparatus for conducting the input process at the input screen G600 in FIG. 5 (step S611), the SF-apparatus 100 confirms existence of available apparatuses for the input process in respect to all apparatuses connected through the network (step S612). A method for confirming the existence of the available apparatuses may confirm all apparatuses existing on the network by a broadcast. Alternatively, the method may confirm specific apparatuses set beforehand. In response to an existence confirmation from the SF-apparatus 100, the MF-apparatus 1200 existing on the network replies to the SF-apparatus 100 with apparatus specific information including an IP address identifying the MF-apparatus 1200, an apparatus name, and a like (step S613). When the SF-apparatus 100 receives the apparatus specific information from the MF-apparatus 1200 and other apparatuses on the network, the SF-apparatus 100 displays the list of the apparatus names in the display area 610 at the input screen G600 in FIG. 5.

For example, the user selects the MF-apparatus 1200 as the apparatus for conducting the input process from the display area 610 (step S614), the SF-apparatus 100 requests the input option information 433 of the MF-apparatus 1200 (step S615). The MF-apparatus 1200 sends the input option information 433 to the SF-apparatus 100 by the FTP 3 in response to the request from the SF-apparatus 100 (step S616).

When the SF-apparatus 100 receives the input option information 433 from the MF-apparatus 1200, the SF-apparatus 100 generates the input screen coordinate parameter 462 by using the input option information 433 and displays the functions that the MF-apparatus 1200 can provide, in the display area 620 of the input screen G600 (FIG. 5) displayed at the operation panel of the SF-apparatus 100 by using the input screen coordinate parameter 462 (step S617). From the display area 620 displaying the functions, for example, the user selects "PICTURE", "AUTO DARKNESS", and "ONE SIDE" (step S618), an input UIF of the SF-apparatus 100 generates the input setting parameter showing "PICTURE", "AUTO DARKNESS", and "ONE SIDE" corresponding position coordinates thereof, and the input setting parameter is transmitted to the MF-apparatus 1200 (step S619).

The MF-apparatus 1200 sets the input setting parameter 434 received from the SF-apparatus 100 as the input setting parameter 434. Subsequently, the input control module 410 reads in the input image 600 from the scanner 1324 in accordance with the input setting parameter 434, and generates the input image data 601 (step S620).

Since the image input/output application 1216 sets the input setting parameter received from the SF-apparatus 100 as the input setting parameter 434, the input control module 410 can conduct the input process as if the user sets at the operation panel 1310 of the MF-apparatus 1200. When the MF-apparatus 1200 completes the input process, the MF-apparatus 1200 sends an input result to the SF-apparatus 100 (step S621). At the operation panel, the SF-apparatus 100 displays the input result received from the MF-apparatus 1200 at the operation panel (step S622).

Therefore, it is possible for the user to select the desired functions from the list of the functions, which the MF-apparatus 1200 can provide, displayed at the operation panel of the SF-apparatus 100. Also, it is possible to have the MF-apparatus 1200 conduct the input process based on the desired functions of the user. For example, even if the SF-apparatus 100 does not have "PICTURE" function, it is possible for user to have the MF-apparatus 1200 conduct the input process by "PICTURE" function as one of the input setting parameter 434, from the SF-apparatus 100.

In FIG. 35, as for the input process, the process flow between the SF-apparatus 100 and the MF-apparatus 1200 is described. Also, the process flow shown in FIG. 35 can be realized between two MF-apparatuses 1200 and between two SF-apparatuses.

Figure 36:
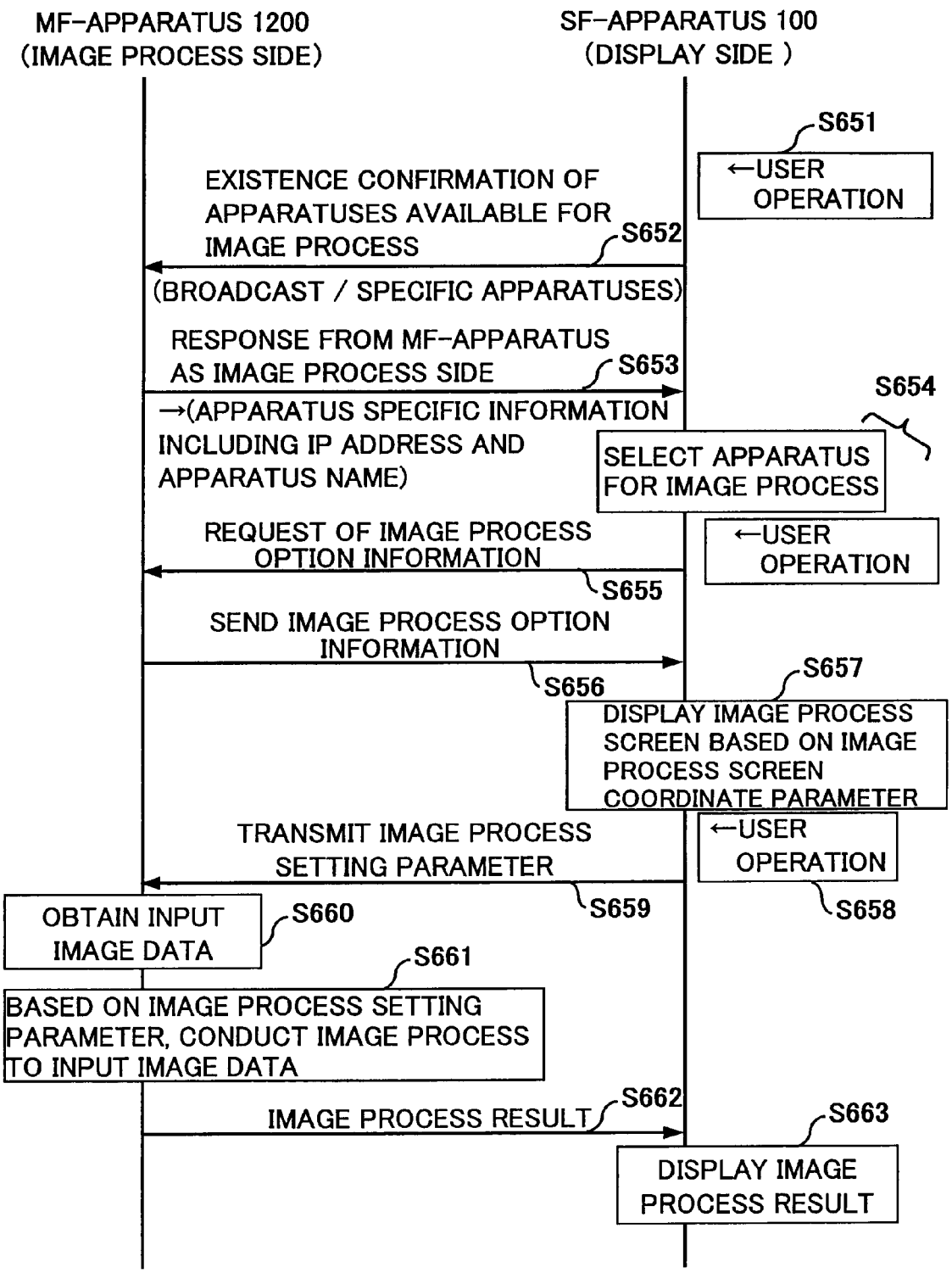
FIG. 36 is a flow chart diagram for explaining the process flow to realize a display of the image process screen of the MF-apparatus at SF-apparatus according to the sixth embodiment of the present invention.

A process flow between the MF-apparatus 1200 and the SF-apparatus 100 in accordance with operations of the user at the image process screen G630 (FIG. 7) will be described with reference to FIG. 36. FIG. 36 is a flowchart diagram for explaining the process flow to realize a display of the image process screen of the MF-apparatus 1200 at SF-apparatus according to the sixth embodiment of the present invention.

In FIG. 36, when the user selects the button 62 to indicate one apparatus for conducting the image process at the image process screen G630 displayed at the operation panel of the SF-apparatus 100 (step S651), the SF-apparatus 100 confirms existence of available apparatuses for the image process in respect to all apparatuses connected through the network (step S652). The method for confirming the existence of the available apparatuses can be the same method described in a case of the process flow for realizing a display of the input screen in FIG. 35. In response to an existence confirmation from the SF-apparatus, the MF-apparatus 1200 existing on the network replies to the SF-apparatus 100 with apparatus specific information including an IP address identifying the MF-apparatus 1200, an apparatus name, and a like (step S653). When the SF-apparatus 100 receives the apparatus specific information from the MF-apparatus 1200 and other apparatuses on the network, the SF-apparatus 100 displays the list of the apparatus names in the display area 610 at the image process screen G630 in FIG. 7.

For example, the user selects the MF-apparatus 1200 as the apparatus for conducting the image process from the display area 610 in FIG. 7 (step S654), the SF-apparatus 100 requests the image process option information 435 of the MF-apparatus 1200 (step S655). The MF-apparatus 1200 sends the image process option information 435 to the SF-apparatus 100 by the FTP 3 in response to the request from the SF-apparatus 100 (step S656).

When the SF-apparatus 100 receives the image process option information 435 from the MF-apparatus 1200, the SF-apparatus 100 generates the image process screen coordinate parameter 482 by using the image process option information 435 and displays the functions that the MF-apparatus 1200 can provide, in the display area 620 of the image process screen G630 (FIG. 7) displayed at the operation panel of the SF-apparatus 100 by using the image process screen coordinate parameter 482 (step S657). From the display area 620 displaying the functions, for example, the user selects "ME ELIMINATION", "ACTUAL SIZE", and "DIVIDE" (step S658), an image process UIF of the SF-apparatus 100 generates the image process setting parameter showing "FRAME ELIMINATION", "ACTUAL SIZE", and "DIVIDE" corresponding to position coordinates thereof, and the image process setting parameter is transmitted to the MF-apparatus 1200 (step S659).

The MF-apparatus 1200 obtains the input image data 601 (step S660). When the input process is not conducted by the MF-apparatus 1200, the MF-apparatus 1200 obtains the input image data 601 from the SF-apparatus. The image input/output application 1216 sets the image process setting parameter received from the SF-apparatus 100 as the image process setting parameter 436. The image process module 440 conducts the image process in respect to the input image data 601 in accordance with the image process setting parameter 436 and generates the output image data 602 (step S661).

Since the image input/output application 1216 sets the image process setting parameter received from the SF-apparatus 100 as the image process setting parameter 436, the image process module 440 can conduct the image process as if the user sets at the operation panel 1310 of the MF-apparatus 1200. When the MF-apparatus 1200 completes the image process, the MF-apparatus 1200 sends an image process result to the SF-apparatus 100 (step S662). At the operation panel, the SF-apparatus 100 displays the image process result received from the MF-apparatus 1200 (step S663).

In FIG. 36, as for the image process, the process flow between the SF-apparatus 100 and the MF-apparatus 1200 is described. Also, the process flow shown in FIG. 36 can be realized between two MF-apparatuses 1200 and between two SF-apparatuses. It is possible for the user to select the desired functions from the list of the functions, which the MF-apparatus 1200 can provide, displayed at the operation panel of the SF-apparatus 100. Also, it is possible to have the MF-apparatus 1200 conduct the image process based on the desired functions of the user.

Figure 37:
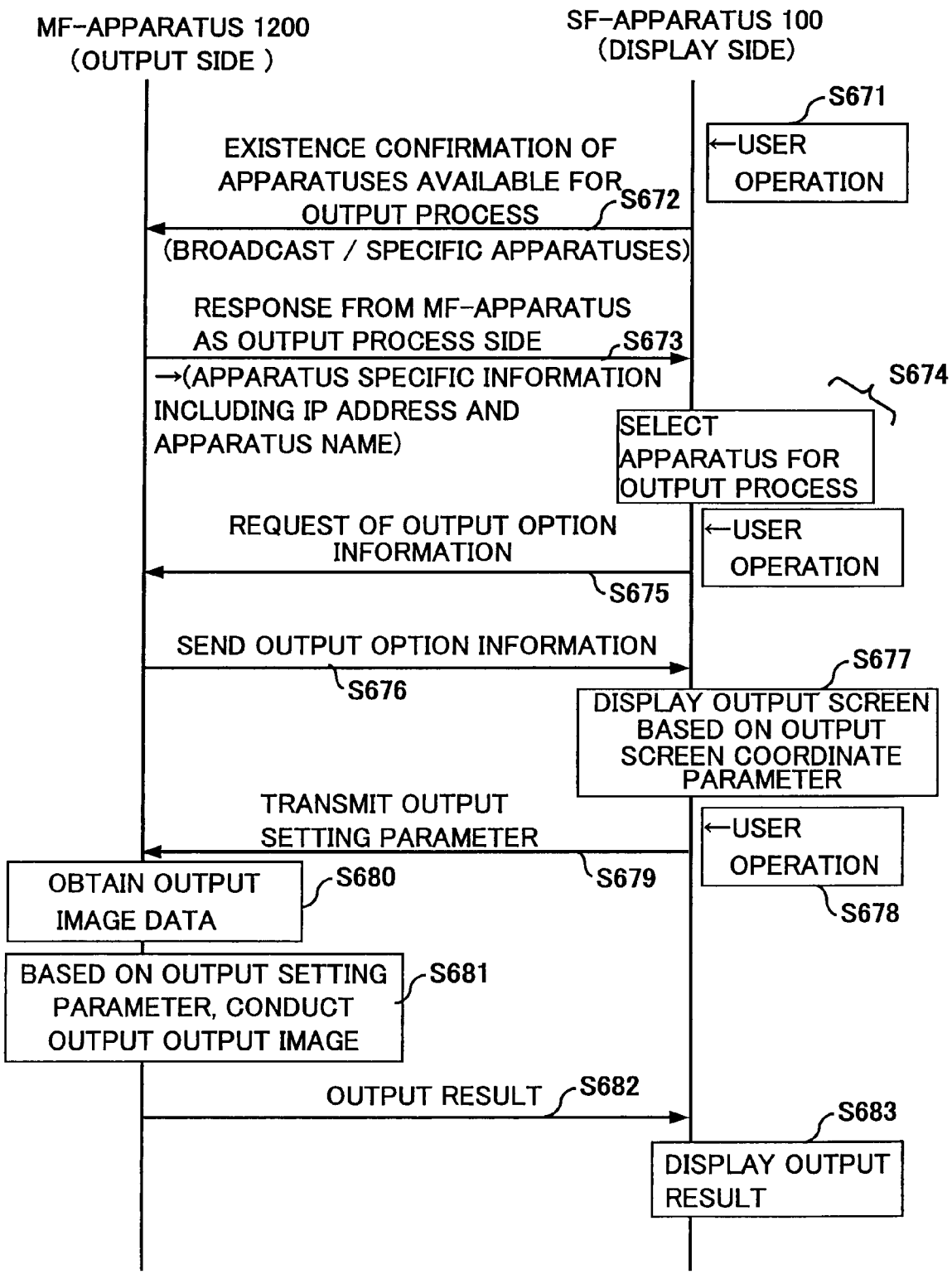
FIG. 37 is a flowchart diagram for explaining the process flow to realize a display of the output screen of the MF-apparatus at the SF-apparatus.

A process flow between the MF-apparatus 1200 and the SF-apparatus in accordance with operations of the user at the output screen G640 (FIG. 9) will be described with reference to FIG. 37. FIG. 37 is a flowchart diagram for explaining the process flow to realize a display of the output screen of the MF-apparatus 1200 at the SF-apparatus.

In FIG. 37, when the user selects the button 63 to indicate one apparatus for conducting the output process at the output screen G640 (FIG. 9) displayed at the operation panel of the SF-apparatus 100 (step S671), the SF-apparatus 100 confirms existence of available apparatuses for the output process in respect to all apparatuses connected through the network (step S672). The method for confirming the existence of the available apparatuses can be the same method described in a case of the process flow for realizing the display of the input screen G600 in FIG. 8. In response to an existence confirmation from the SF-apparatus, the MF-apparatus 1200 existing on the network replies to the SF-apparatus 100 with apparatus specific information including an IP address identifying the MF-apparatus 1200, an apparatus name, and a like (step S673). When the SF-apparatus 100 receives the apparatus specific information from the MF-apparatus 1200 and other apparatuses on the network, the SF-apparatus 100 displays the list of the apparatus names in the display area 610 at the output screen G640 in FIG. 9.

For example, the user selects the MF-apparatus 1200 as the apparatus for conducting the output process from the display area 610 (step S674), the SF-apparatus 100 requests the output option information 431 of the MF-apparatus 1200 (step S675). The MF-apparatus 1200 sends the output option information 431 to the SF-apparatus 100 by the FTP 3 in response to the request from the SF-apparatus 100 (step S676).

When the SF-apparatus 100 receives the output option information 431 from the MF-apparatus 1200, the SF-apparatus 100 generates the output screen coordinate parameter 472 by using the output option information 431 and displays the functions that the MF-apparatus 1200 provide, in the display area 620 of the input screen G640 (FIG. 9) displayed at the operation panel of the SF-apparatus 100 by using the output screen coordinate parameter 472 (step S677). From the display area 620 displaying the functions, for example, the user selects one of four icons corresponding to the four stapling methods (step S678), the output UIF of the SF-apparatus 100 generates the output setting parameter indicating "SORT" and "STAPLE" corresponding to position coordinates thereof, and then the output setting parameter is transmitted to the MF-apparatus 1200 (step S679).

The MF-apparatus 1200 obtains the output image data 602 (step S680). When the output process is not conducted by the MF-apparatus 1200, the MF-apparatus 1200 obtains the output image data 602 from the SF-apparatus 100. The output setting parameter 100, which is received from the SF-apparatus 100, is set to be the output setting parameter 432. Then, the output control module 420 conducts the output process to the output image data 602 in accordance with the output setting parameter 432 so as to form an image on the sheet as the output image 603 and then outputs the output image 603 (step S681).

Since the output setting parameter received from the SF-apparatus 100 is set as the output setting parameter 432, the output control module 420 can conduct the output process as if the user set at the operation panel 1310 of the MF-apparatus 1200. When the MF-apparatus 1200 completes the output process, the output result is sent to the SF-apparatus 100 (step S682). At the operation panel, the SF-apparatus 100 displays the output result received from the MF-apparatus 1200 (step S683).

In FIG. 37, as for the output process, the process flow between the SF-apparatus 100 and the MF-apparatus 1200 is described. Also, the process flow shown in FIG. 37 can be realized between two MF-apparatuses 1200 and between two SF-apparatuses. It is possible for the user to select the desired functions from the list of the functions, which the MF-apparatus 1200 can provide, displayed at the operation panel of the SF-apparatus. Also, it is possible to have the MF-apparatus 1200 conduct the output process based on the desired functions of the user.

The process patterns 1 through 4 based on various combinations of the input process, the image process, and the output process shown in FIG. 4 using user interfaces will be described in detail with reference to FIG. 38 through FIG. 41, according to the sixth embodiment of the present invention.

For example, an SF-apparatus (single functional image processing apparatus) 100 shown in FIG. 38 through FIG. 41 is a single copier having only a copying function. For example, the SF-apparatus 100 includes an input processing part 102 for reading in the input image 600 formed on a sheet, an image processing part 104 for conducting the image process to the input image data generated by reading in the input image 600, an output processing part 106 for forming output image data 603, which the image process is conducted to, on the sheet and outputting the sheet as the output image 603, an operation panel 120 operated by the user, and an operation controlling part 110 for controlling a display of the operation panel 120.

Moreover, the operation controlling part 110 includes at least an input UIF 112 for generating the input screen coordinate parameter (not shown) so as to display the input screen G600 as shown FIG. 5, an image process UIF 113 for generating the image process screen coordinate parameter (not shown) so as to display the image process screen G630 as shown in FIG. 7, an output UIF 114 for generating the output screen coordinate parameter (not shown) so as to display the output screen G640 as shown in FIG. 9, an OCS 116 for controlling the operation panel 120 based on the screen information provided from each of the input UIF 112, the image process UIF 113, and the output UIF 114, in respect to the operation panel 120.

Furthermore, when each user interface program realizing the input UIF 112, the image process UIF 113, and the output UIF 114 is a Java™ program, the operation controlling part 110 includes a Java™ VM 118. In the SF-apparatus 100, all process parts including the OCS 116, the input UIF 112, the image process UIF 113, and the output UIF 114 can be realized by the Java™ programs. In this case, even if the OCS 116 is not included in the SF-apparatus 100, the SF-apparatus 100 can be compatible to the MF-apparatus 1200.

In FIG. 38 through FIG. 41, parts shown by dashed lines other than the Java™ VM 450 and the Java™ VM 118 are originally provided in the MF-apparatus 1200 and the SF-apparatus 100 but not used in each of the process patterns 1 through 4. In addition, parts shown by double lines are replaced with data file sent from the MF-apparatus 1200 or the SF-apparatus 100.

Process Pattern 1

Figure 38:
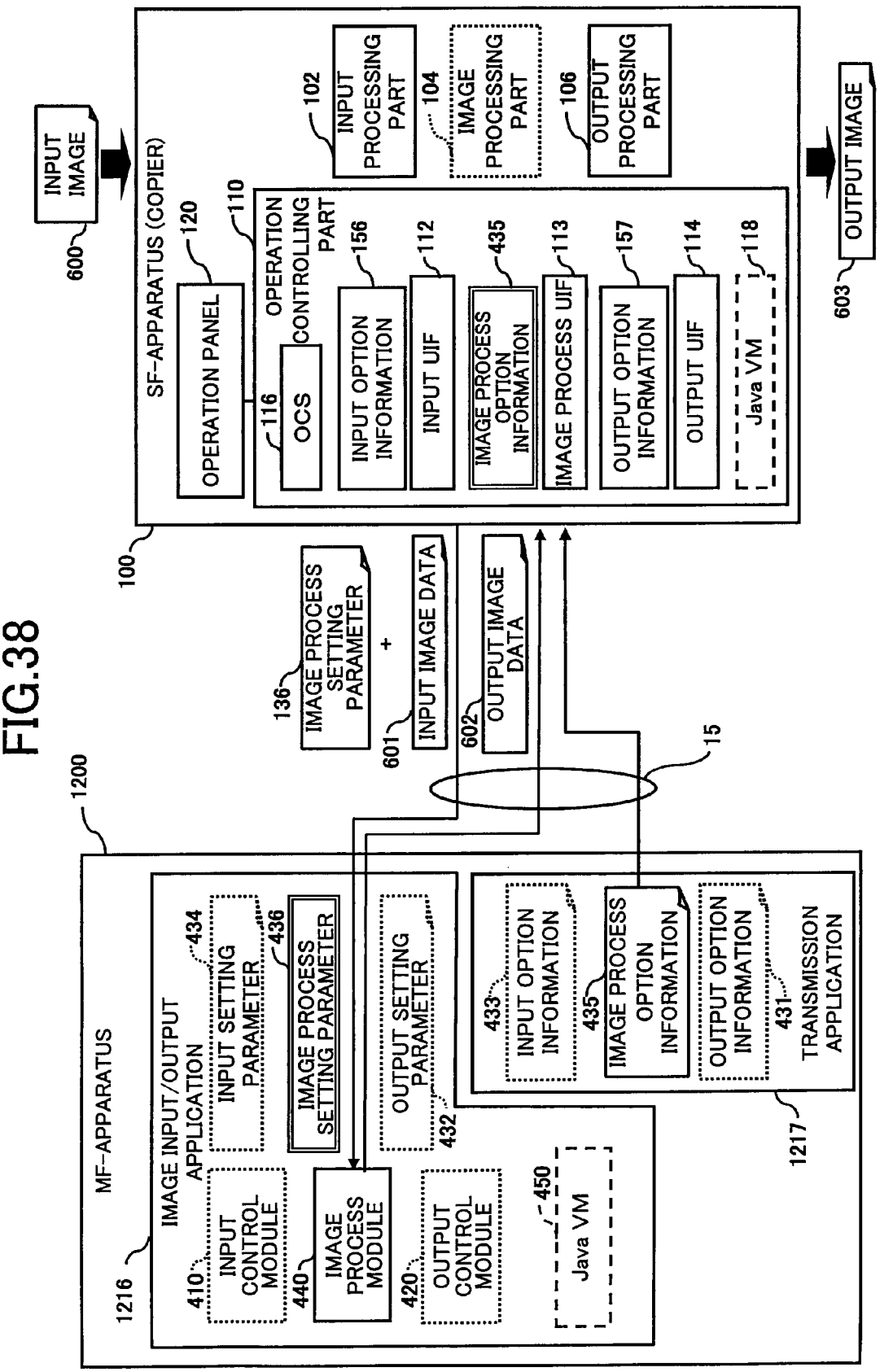
FIG. 38 is a diagram showing an example of the process pattern 1 shown in FIG. 4.

FIG. 38 is a diagram showing an example of the process pattern 1 shown in FIG. 4. In FIG. 38, the display process, the input process, and the output process are conducted by the SF-apparatus 100, and only the image process is conducted by the MF-apparatus 1200.

First, when the user selects the SF-apparatus 100 itself as an apparatus for the input process at the operation panel 120, the input UIF 112 originally provided in the SF-apparatus 100 produces the input screen coordinate parameter (not shown) based on input option information 156 and the functions for the input process that the SF-apparatus 100 can provide is displayed at the operation panel 120 by the input screen coordinate parameter. When the user selects the functions, the input UIF 112 generates the input setting parameter (not shown) showing the functions set by the user. The input processing part 102 reads in the input image 600 in accordance with the input setting parameter (not shown) that is generated by the input UIF 112 so as to indicate the function set by the user and generates the input image data 601.

Next, when the user selects the MF-apparatus 1200 as an apparatus for conducting the image process from the operation panel 120, in accordance with the process flow shown in FIG. 36, the image process option information (not shown) of the image process UIF 113 (not shown) is replaced with the image process option information 435 obtained from the MF-apparatus 1200. The image process UIF 480 displays the function that the MF-apparatus 1200 can provide, at the operation panel 120 through the OCS 116 based on the image process option information 435. When the user selects the functions, the image process 480 generates the image process setting parameter 136 indicating the function set by the user. The SF-apparatus 100 transmits the input image data 601 generated by the image process setting parameter 136 and the input processing part 102, to the MF-apparatus 1200. The input image data 601 can be transmitted in response to a request from the image input/output application 1216 of the MF-apparatus 1200.

The image input/output application 1216 of the MF-apparatus 1200 replaces the image process setting parameter 436 with the image process setting parameter 136 received from the SF-apparatus 100. And the image process module 440 conducts the image process in respect to the input image data 601 received from the SF-apparatus 100 based on the image process setting parameter 436, and generates the output image data 602 as a result. The output image data 602 is transmitted to the SF-apparatus 100. The output image data 602 can be transmitted in response to a request from the SF-apparatus 100.

When the user selects the SF-apparatus 100 itself as an apparatus for the output process at the operation panel 120, the output UIF 114 originally provided in the SF-apparatus 100 produces the output screen coordinate parameter (not shown) based on output option information 157 and the functions for the output process that the SF-apparatus 100 can provide is displayed, at the operation panel 120 by the output screen coordinate parameter. When the user selects the functions, the output UIF 114 generates the output setting parameter (not shown) indicating the functions set by the user. The output processing part 106 forms the output image data 602 on the sheet in accordance with the output setting parameter (not shown) that is generated by the output UIF 114 so as to indicate the functions set by the user, and then outputs the output image 603.

As described above, the user can have the MF-apparatus 1200 conduct the image process only through a network 15.

Process Pattern 2

Figure 39:
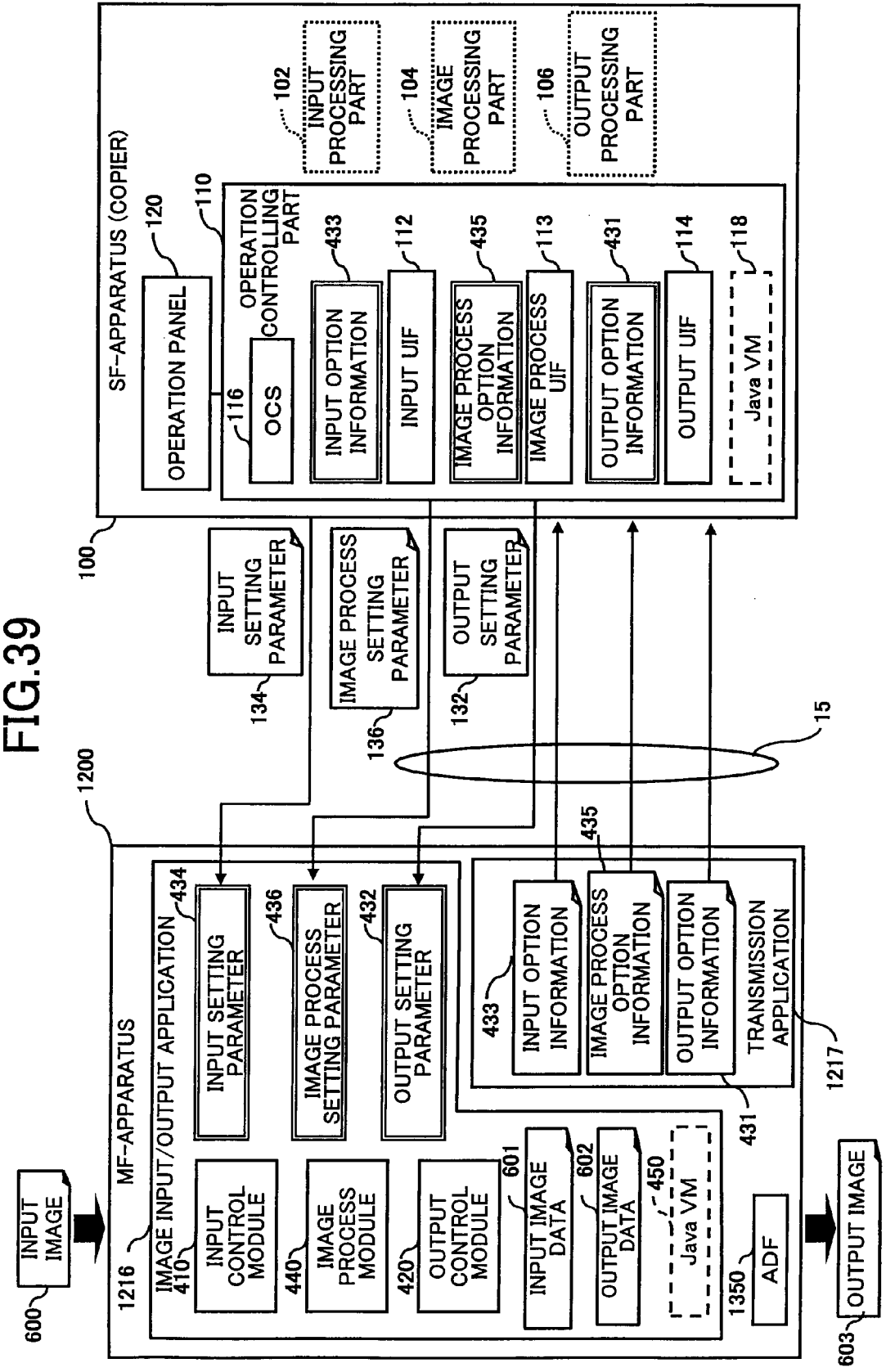
FIG. 39 is a diagram showing an example of the process pattern 2 shown in FIG. 4.

FIG. 39 is a diagram showing an example of the process pattern 2 shown in FIG. 4. In FIG. 39, only the display process is conducted by the SF-apparatus 100, and the input process, the image process, and the output process are conducted by the MF-apparatus 1200.

In FIG. 39, when the user selects the MF-apparatus 1200 as an apparatus for the input process, the image process, and the output process at the operation panel 120 of the SF-apparatus 100, in accordance with the process flow shown in FIG. 35, the input option information (not shown) of the input UIF 112 (not shown) is replaced with the input option information 433 obtained from the MF-apparatus 1200. The input UIF 112 displays the functions for the input process that the MF-apparatus 1200 can provide, at the operation panel 120 through the OCS 116 based on the input option information 433. After that, the input setting parameter 134, which is generated by the input UIF 112 so as to indicate the functions set by the user, is sent to the MF-apparatus 1200.

Similarly, in accordance with the process flow shown in FIG. 36, the image process screen of the MF-apparatus 1200 is displayed at the SF-apparatus 100 base on image process option information 435, with which the image process option information (not shown) of the image process UIF 113 originally provided by the image process UIF 113 is replaced. The image process setting parameter 136 is generated so as to indicate the function that the user sets for the image process from the image process screen. The image process setting parameter 436 of the MF-apparatus 1200 is replaced with the image process setting parameter 136 that indicates the functions for the image process set by the user from the image process screen of the MF-apparatus 1200 and is received from the SF-apparatus 100. The image process module 440 generates the output image data 602 based on the image process setting parameter 436.

Similarly, in accordance with the process flow shown in FIG. 24, the output screen of the MF-apparatus 1200 is displayed at the SF-apparatus 100 base on output option information 435, with which the output option information (not shown) of the output UIF 114 originally provided by the output UIF 114 is replaced. The output setting parameter 432 is generated so as to indicate the function that the user sets for the output process from the output screen. The output setting parameter 432 of the MF-apparatus 1200 is replaced with the output setting parameter (not shown) that indicates the functions for the image process set by the user from the image process screen of the MF-apparatus 1200 and is received from the SF-apparatus 100. The output module 420 outputs the output image data 602 based on the output setting parameter 432.

As described above, it is possible for the user to have the MF-apparatus 1200 conduct all of the input process, the image process, and the output process through the network 15. Alternatively, the image process can be conducted at the SF-apparatus 100. In this case, the SF-apparatus 100 may obtain the input image data 601 from the MF-apparatus 1200, and send the output image data 602 generated after the image process is conducted to the input image data 601, as well as the output setting parameter 132.

Process Pattern 3

Figure 40:
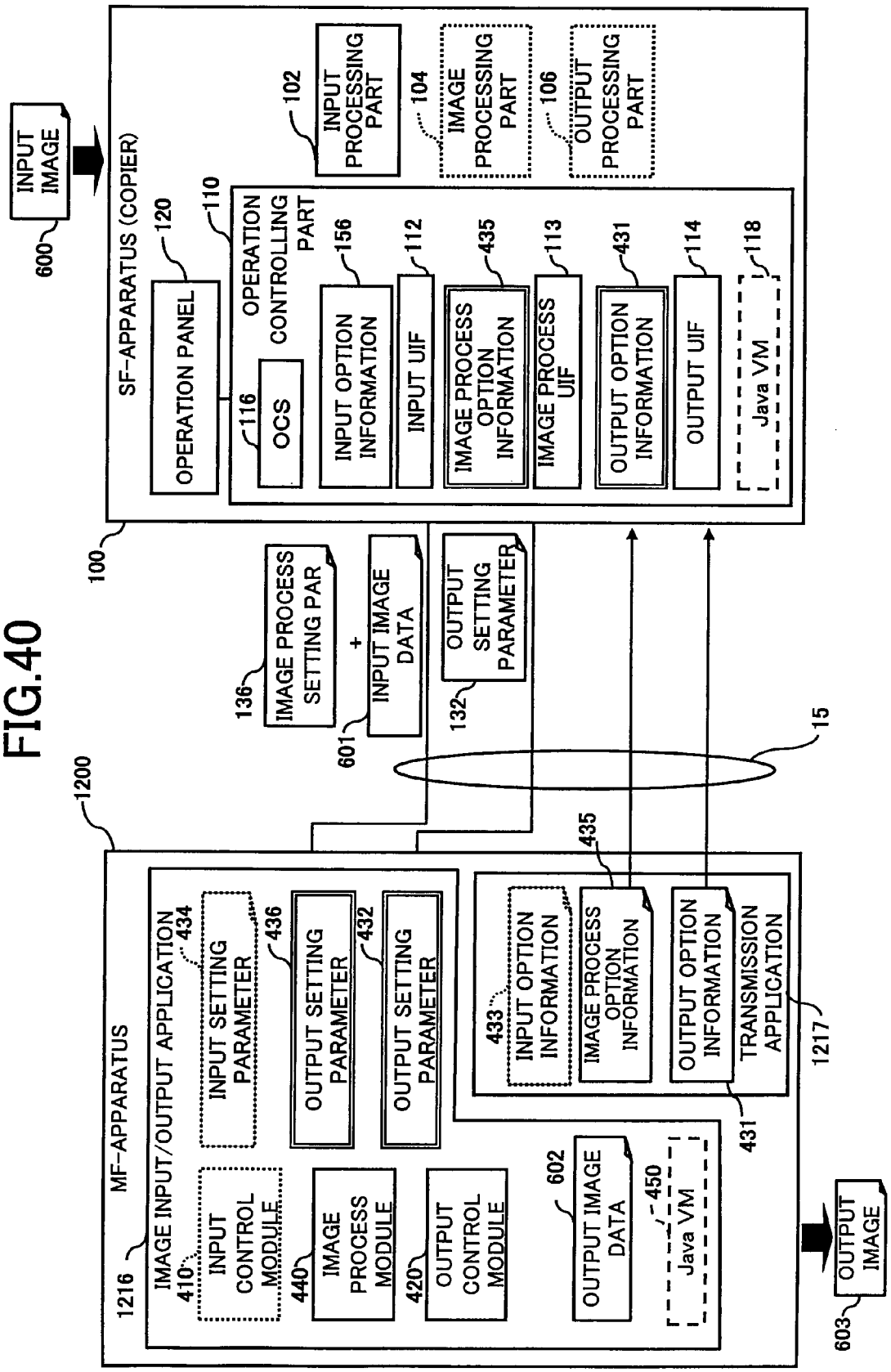
FIG. 40 is a diagram showing an example of the process pattern 3 shown in FIG. 4

FIG. 40 is a diagram showing an example of the process pattern 3 shown in FIG. 4. In FIG. 40, the display process and the input process are conducted by the SF-apparatus 100 and the image process and the output process are conducted by the MF-apparatus 1200.

In FIG. 40, when the user selects the SF-apparatus 100 as an apparatus for conducting the input process at the operation panel 120 of the SF-apparatus 100 and selects the MF-apparatus 1200 as an apparatus for the image process and the output process, the input processing part 102 of the SF-apparatus 100 reads in the input image 600, and generates the input image data 601. After that, similar to the process pattern 1 shown in FIG. 38, the image process option information (not shown) of the SF-apparatus 100 is replaced with the image process option information 435 of the MF-apparatus 1200. After that, in the image input/output application 1216 of the MF-apparatus 1200, in accordance with the image process setting parameter 436 replaced with the image process setting parameter 136 received from the SF-apparatus 100, the image process module 440 generates the output image data 602. Moreover, similar to the process pattern 2 shown in FIG. 26, the output option information (not shown) of the SF-apparatus 100 is replaced with the output option information 431 of the MF-apparatus 1200. After that, in the image input/output application 1216 of the MF-apparatus 1200, in accordance with the output setting parameter 432 replaced with the output setting parameter 132 received from the SF-apparatus 100, the output control module 420 outputs the output image 603.

As described above, the user can conduct the input process alone at the SF-apparatus 100, and have the MF-apparatus 1200 conduct the image process and the output process. Alternatively, the image process can be conducted by the SF-apparatus 100. In this case, the SF-apparatus 100 may send the output image data 602 generated after the image process is conduct to the input image data 601 generated by the input processing part 102, with the output setting parameter 132.

The Process Pattern 4

Figure 41:
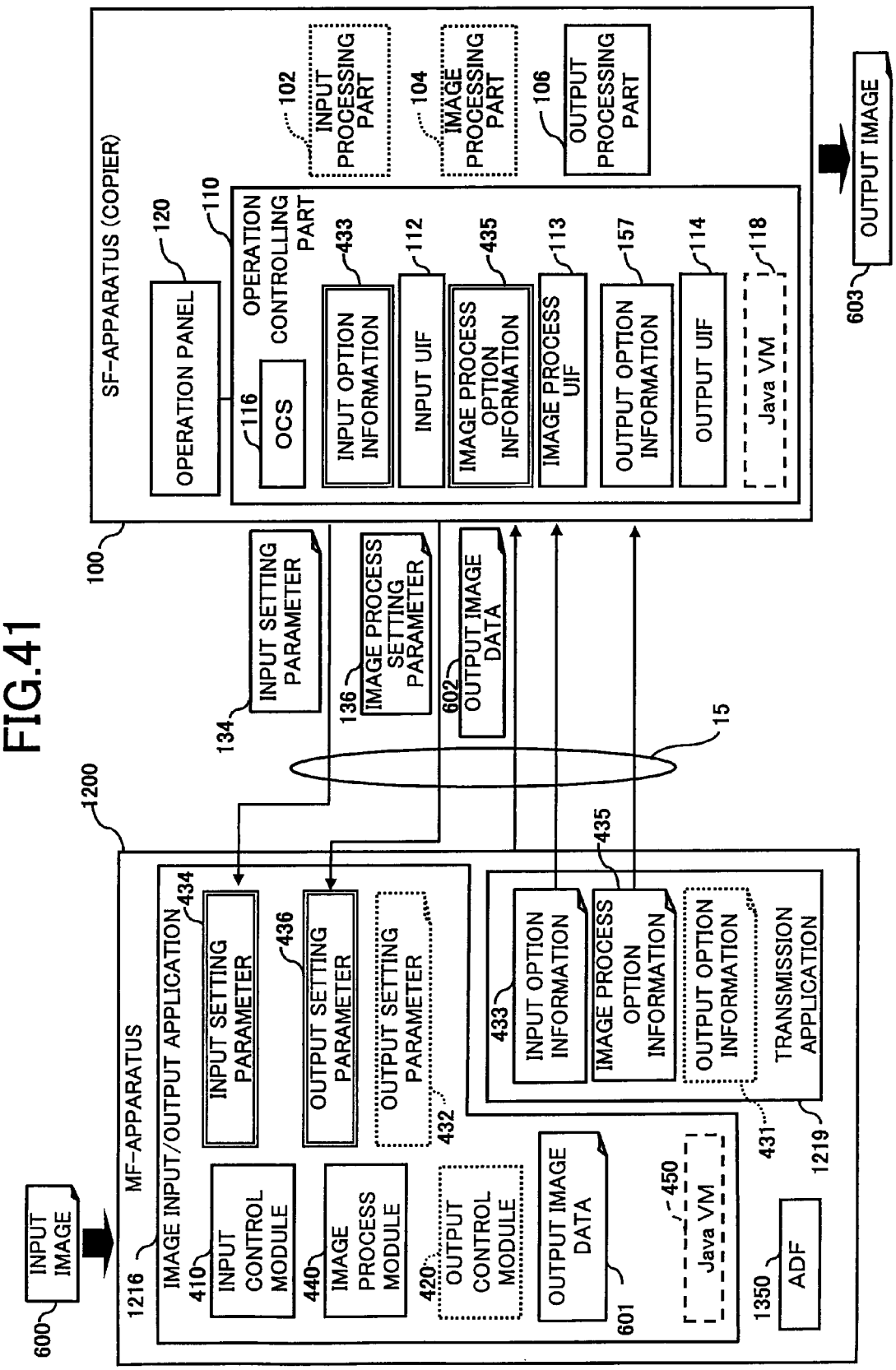
FIG. 41 is a diagram showing an example of the process pattern 4 shown in FIG. 4.

FIG. 41 is a diagram showing an example of the process pattern 4 shown in FIG. 4. In FIG. 41, the display process and output process are conducted by the SF-apparatus 100, and the input process and the image process are conducted by the MF-apparatus 1200.

In FIG. 41, when the user selects the SF-apparatus 100 as an apparatus for conducting the input process and the output process at the operation panel 120 of the SF-apparatus 100, and selects the MF-apparatus 1200 as an apparatus for conducting the image process, similar to the process pattern 2 shown in FIG. 39, the input option information (not shown) of the SF-apparatus 100 is replaced with input option information 433 of the MF-apparatus 1200. After that, in the image input/output application 1216 of the MF-apparatus 1200, in accordance with the input setting parameter 434 replaced with the input setting parameter 134 received from the SF-apparatus 100, the input control module 410 generates the input image data 601. Moreover, the image process option information (not shown) of the SF-apparatus 100 is replaced with the image process option information 435 of the MF-apparatus 1200. After that, in the image input/output application 1216 of the MF-apparatus 1200, in accordance with the image process setting parameter 436 replaced with the image process setting parameter 136 received from the SF-apparatus 100, the image process module 440 generates the output image data 602. Subsequently, when the SF-apparatus 100 obtains the output image data 602 from the MF-apparatus 1200, the output process is conducted by the output processing part 106, and outputs the output image 603.

As described above, it is possible for the user at the SF-apparatus 100 to have the MF-apparatus 1200 conduct the input process and the image process. Alternatively, the image process can be conducted by the SF-apparatus 100. In this case, the SF-apparatus 100 obtains the input image data 601 from the MF-apparatus 1200, and sends the output image data 602 generated after the image process is conducted to the input image data 601, with the output setting parameter 132.

Regarding the process patterns 1 through 4, a case in which the MF-apparatus 1200 and the SF-apparatus 100 are connected to each other through the network 15. Alternatively, the present invention can be applied to more than three image processing apparatuses connecting to each other through the network 15.

As described above, in the sixth embodiment, it is possible to input the input image 600 by utilizing an option (the ADF, a both sides ADF, or a like) pertaining to the MF-apparatus 1200 connected to any image processing apparatus through the network 15. For example, by using the MF-apparatus 1200 having the both sides ADF 1350, the user can consecutively input the input image 600 (a plurality of documents) having an image on both sides, and also can output from the SF-apparatus 100 (copier) having only a press board.

Moreover, by using an option (finisher such as a punch or a stapler) pertaining to the MF-apparatus 1200, the user can output the output image 603 at the MF-apparatus 1200 connected to any SF-apparatus 100 through the network 15. For example, by using higher functions by full options, it is possible to output the output image 603 from the copier having a single function or a personal computer (PC). Since the option information 431, 433, and 435 are obtained through the network 15, a new user interface is not required for the SF-apparatus 100 at which the user operates. Accordingly, the user can instruct by the same operation under the interface provided by the MF-apparatus 1200 anywhere. Also, when a new function is added to the MF-apparatus 1200 connected to the network 15, even if the SF-apparatus 100 where the user operates, the user can utilize the interface for operating the new function of the MF-apparatus 1200 and operate as if the user uses the MF-apparatus 1200.

Furthermore, if the MF-apparatus 1200 having higher functions exists on the network 15, by sending the input image data 601 to the MF-apparatus 1200 and the output image data 602 to the SF-apparatus 100, even the SF-apparatus 100, which does not have the image process as the higher functions, can realize the same higher functions as the MF-apparatus 1200. In this case, means for providing and setting the higher functions for the image process is not required for the SF-apparatus 100 as an operation side. Accordingly, the user operates in the same way at any SF-apparatus 100.

In the sixth embodiment, on the network 15, only the plotter 1321 of the MF-apparatus 1200 as an output option, the scanner 1324 of the MF-apparatus 1200 as an input option, and the SF-apparatus 100 (copier) as the input option and the output option are provided, but a plurality of the input options and the output options can be provided. All options, for example, the apparatuses connected through the network 15 and a scanner, a printer, a copier, and a like can be shared as the functions. Also, as an output, it is not limited to printing on the sheet, but as an electronic data, output data can be stored to a server for managing a document. Also, the input side can be a document management server for managing the electronic data, instead of the paper sheet. As described above, by storing as a document, an existing image data can be utilized. Accordingly, data frequently used by the user are simply maintained on the network 15, it is possible to utilize the data in many output methods by various options.

Seventh Embodiment

In a seventh embodiment, a functional configuration and a hardware configuration of the MF-apparatus 1200 providing system information 452 according to the seventh embodiment are the same as those of the MF-apparatus 1200 in the first embodiment.

In the seventh embodiment, the MF-apparatus 1200 provides system information 452 only.

Figure 42:
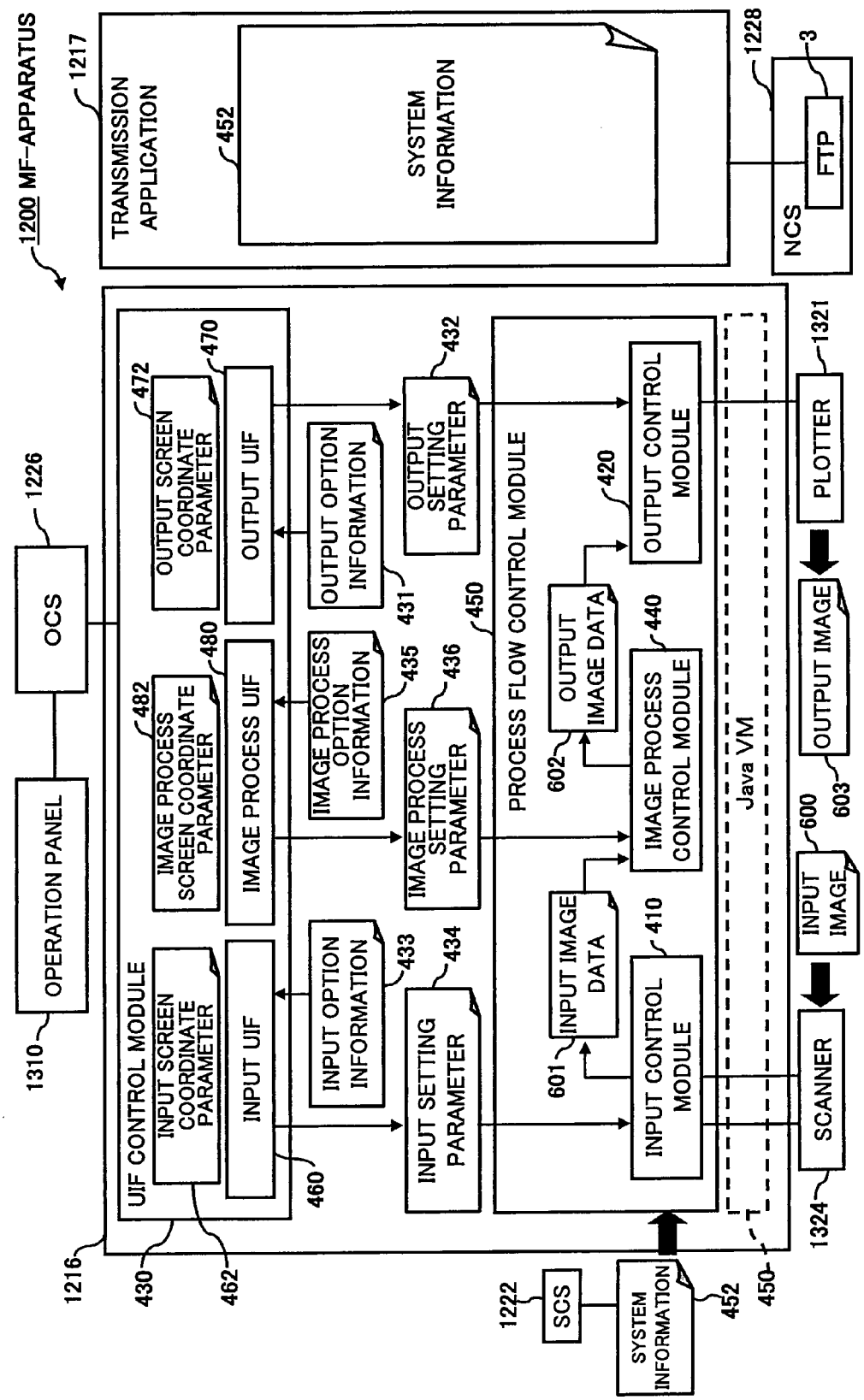
FIG. 42 is a diagram showing functional configurations of the image input/output application and the transmission application according to the seventh embodiment.

FIG. 42 is a diagram showing functional configurations of the image input/output application and the transmission application according to the seventh embodiment. In FIG. 42, parts that are the same as the ones in FIG. 3 are indicated by the same reference numerals and explanation thereof will be omitted. In the MF-apparatus 1200 according to the seventh embodiment, in order for another apparatus to utilize an input process, an image process, and an output process available at the MF-apparatus 1200 through the network 15, the transmission application 1217 transmits the system information 452, respectively, in response to a request of the system information 452 from the other apparatus used by a user.

When the transmission application 1217 receives a request of the system information 452, the transmission application 1217 transmits the system information 452 realizing similar screen displays of the MF-apparatus 1200, to the apparatus by the FTP 3. In the same manner, when the transmission application 1217 receives a request of the system information 452, the transmission application 1217 transmits the system information 452 by the FTP 3.

By downloading each of the system information 452, it is possible for another apparatus to display a plurality of functions available in the MF-apparatus 1200. Then, the setting parameters 434, 436, and 432 set by the user at the other apparatus are respectively transmitted to the MF-apparatus 1200. The MF-apparatus 1200 replaces the input setting parameter 434, the image process setting parameter 436, and the output setting parameter 432 with the setting parameters received from the other apparatus, respectively. Accordingly, it is possible for the MF-apparatus 1200 to conduct in accordance with the setting parameters that are set by the user at the other apparatus.

In the functional configuration of the image input/output application 1216 shown in FIG. 34, the input control module 410, the image process module 440, the output control module 420, and the UIF control module 430 may be realized by Java™ programs. In this case, a Java VM (Virtual Memory) 450, which is shown by dashed lines, may be provided to execute the Java™ programs. The system information 452 is also provided in the data structure readable by the Java™ programs. In the other apparatus connected through the network 15 to the MF-apparatus 1200, if the Java™ programs can be executable, the system information 452 can be provided without depending on hardware of the other apparatus.

For example, in a case in which the other apparatus connected to the MF-apparatus 1200 through the network 15 has a lower function than that of the MF-apparatus 1200 or only a single function (hereinafter, called an SF-apparatus 100 (single functional image forming apparatus)), this SF-apparatus 100 obtains the system information 452 from the MF-apparatus 1200. Therefore, it is possible for the SF-apparatus 100 to provide the user higher functions provided by the MF-apparatus 1200.

Examples of screens and process flows for displaying the functions of the MF-apparatus 1200 at the operation panel of the SF-apparatus will be described, according to the seventh embodiment of the present invention. In the following explanations, it is assumed that the SF-apparatus 100 is a copier. For the sake of convenience, examples of the screen displayed at the operation panel of the SF-apparatus 100 will be described. However, since the system information 452 provided from the MF-apparatus 1200, it is possible to similarly display the screen shown in FIGS. 43, 44, and 45 at the operation panel 1310 of the MF-apparatus 1200.

Figure 43:
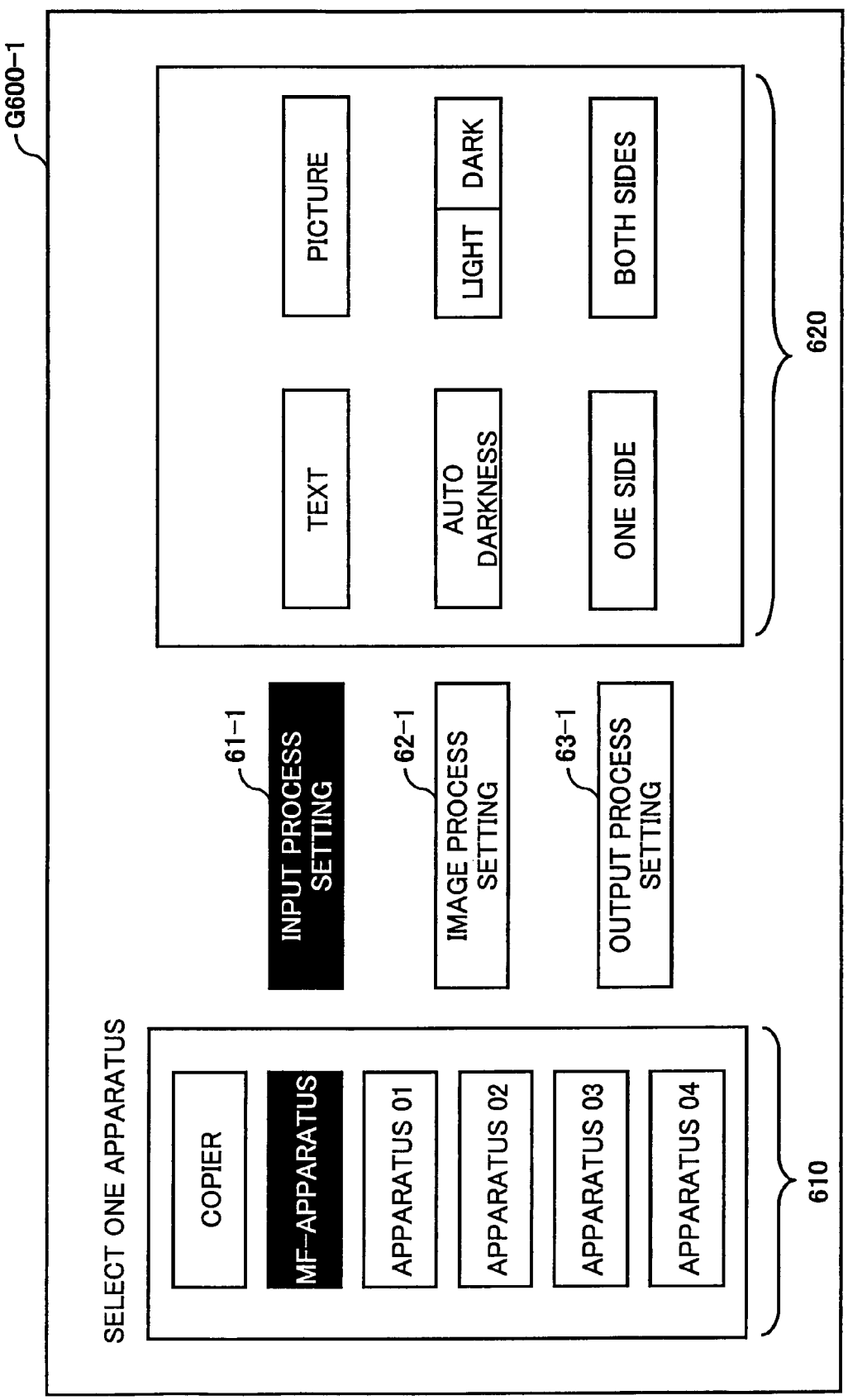
FIG. 43 is a diagram showing the example of the input screen.

First, an example of the input screen by the system information 452 will be described with reference to FIG. 43. FIG. 43 is a diagram showing the example of the input screen. In FIG. 43, the input screen G600-1 includes a button 61-1 for setting functions for the input process, a button 62-1 for setting functions for the image process, a button 63-1 for setting functions for the output process, a display area 610 for showing a list of apparatuses existing on the network and allowing the user to select one of the apparatuses, and a display area 620 for showing functions processed by the apparatus selected by the user from the display area 610 and allowing the user to select one of the functions.

In the input screen G600-1, the display area 610 displays the list of the apparatuses that exist on the network and are available to process image. For example, the display area 610 displays "COPIER" as the single functional image process apparatus itself, "MF-APPARATUS" as the MF-apparatus 1200, "APPARATUS 01", "APPARATUS 02", "APPARATUS 03", and "APPARATUS 04" as apparatus names. For example, when the user selects "MF-apparatus" and then selects the button 61-1 for setting functions for the input process, the display area 620 displays the function that can be provided by the MF-apparatus 1200.

For example, the display area 620 displays "TEXT" for reading in the input image 600 by a text mode, "PICTURE" for reading in the input image 600 by a picture mode, "AUTO DARKNESS" for allowing "MF-APPARATUS" to determine a darkness of the input image 600, "LIGHT" and "DARK" for allowing the user to determine the darkness of the input image 600, "ONE SIDE" for reading in one side of the input image 600, and "BOTH SIDES" for reading in both sides of the input image 600. For example, when the user selects "PICTURE", "AUTO DARKNESS", and "BOTH SIDES", the input setting parameter showing "PICTURE", "AUTO DARKNESS", and "BOTH SIDES" is generated, and transmitted to the MF-apparatus 1200. The MF-apparatus 1200 sets the input setting parameter received from the SF-apparatus 100 as the input setting parameter 434, and the input control module 410 controls the scanner 1324 to read in the input image 600 in accordance with the input setting parameter 434.

Figure 44:
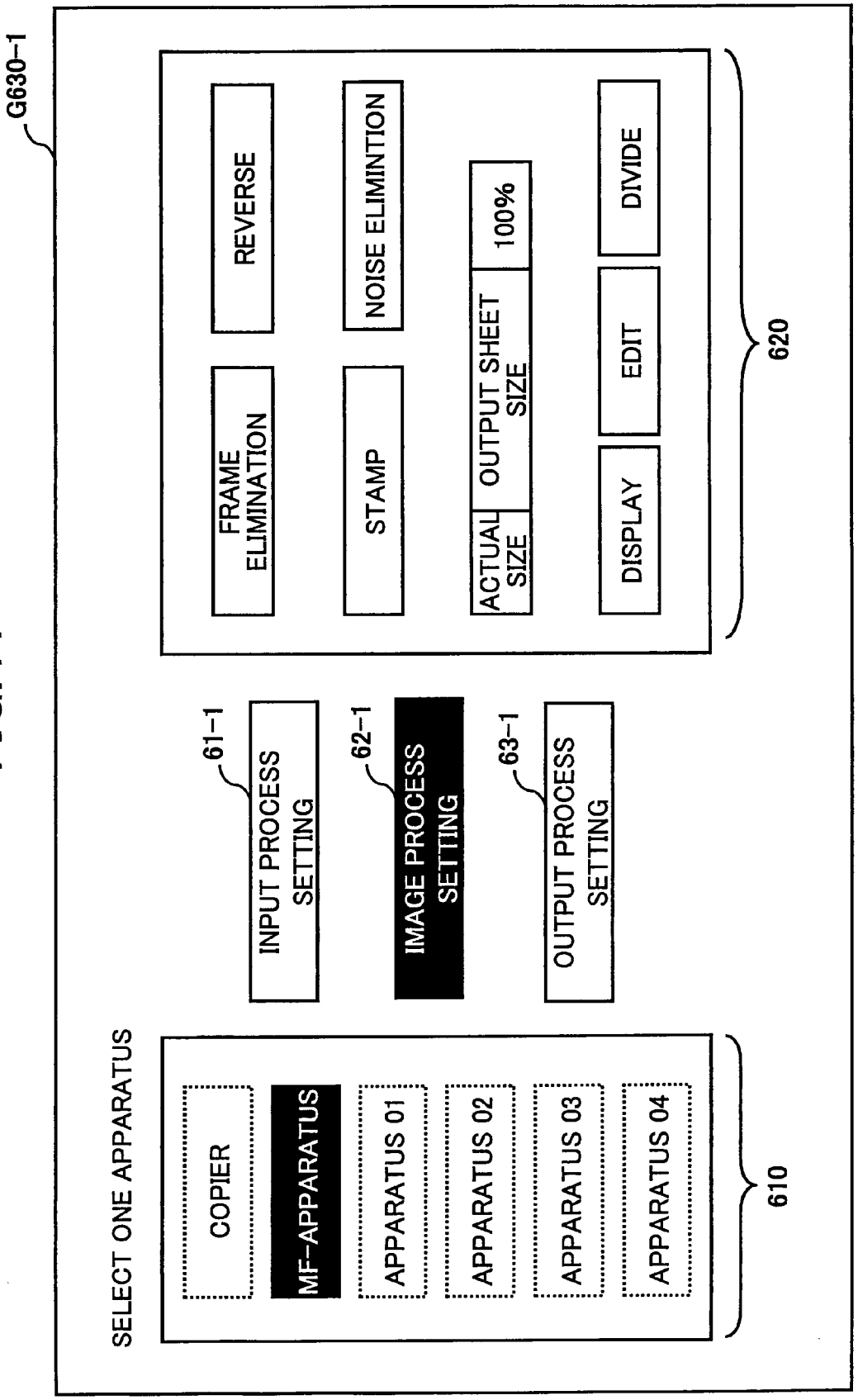
FIG. 44 is a diagram showing the example of the image process screen.

Next, an example of the image process screen for image process based on the system information 452 of the MF-apparatus 1200 will be described with reference to FIG. 44. FIG. 44 is a diagram showing the example of the image process screen. In FIG. 44, an image process screen G630-1 has the same screen structure as the input screen G600-1. In FIG. 44, parts that are the same as the ones in FIG. 43 are indicated by the same reference numerals and the explanation thereof will be omitted. In the display area of the image process screen G630-1, since "MF-APPARATUS" has been selected, the apparatuses names are displayed in gray and cannot be selected by the user.

In the image process screen G630-1, when the user selects the button 62-1 for setting the functions for the image process, the list of the apparatuses, which exist on the network and can conduct the image process, is displayed in the display area 610. When the user selects "MF-APPARATUS", the functions, which can be set for the image process, are displayed in the display area 620.

For example, the display area 620 displays "FRAME ELIMINATION" for eliminating shadows of a periphery of a sheet, "REVERSE" for copying by reversing image colors, "STAMP" for stamping the sheet to show that the image process is conducted, "NOISE ELIMINATION" for correcting noises for the input image, "ACTUAL SIZE" for processing the input image by a actual size, "OUTPUT SHEET SIZE" for processing the input image by an output sheet size, "100%" for allowing the user to indicate a magnification of the image by a ten-key, "DISPLAY" for indicating the image process including a displaying process, "EDIT" for repeating the image in a single sheet or synthesizing different images in a single sheet, "DIVIDE" for processing two pages at right and left sides into a single sheet, and alike. For example, when the user selects "FRAME ELIMINATION", "ACTUAL SIZE", and "DIVIDE", the image process setting parameter indicating "FRAME ELIMINATION", "ACTUAL SIZE", and "DIVIDE" is generated. The image process setting parameter is sent to the MF-apparatus 1200. The MF-apparatus 1200 sets the image process setting parameter received from the SF-apparatus 100 as the image process setting parameter 436. Accordingly, the image process module 440 conducts the image process in respect to the input image data 601 in accordance with the image process setting parameter 436 and generates the output image data 602.

Figure 45:
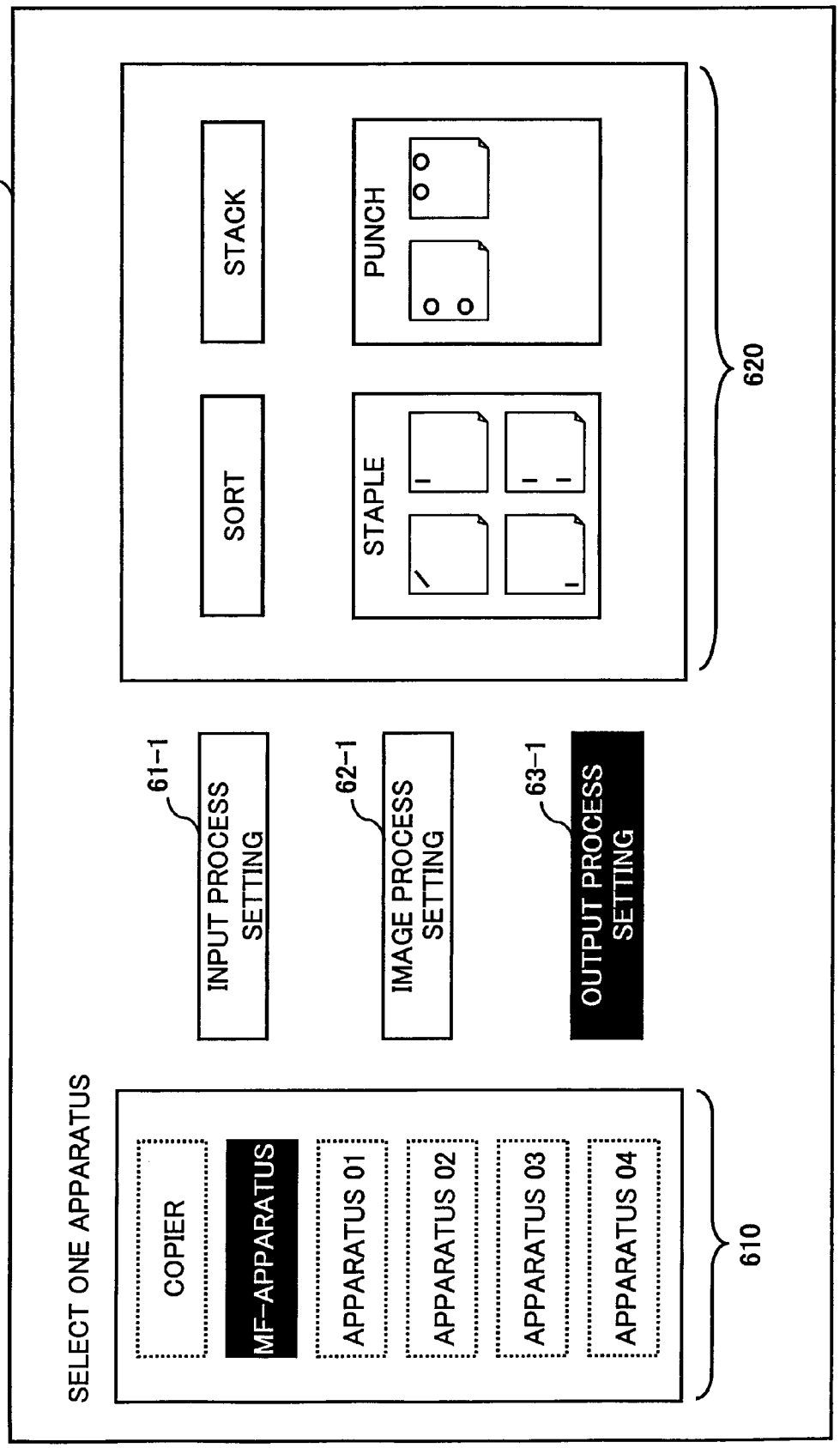
FIG. 45 is a diagram showing the example of the output screen.

Next, an example of the output screen based on the system information 452 of the MF-apparatus 1200 will be described with reference to FIG. 45. FIG. 45 is a diagram showing the example of the output screen. In FIG. 45, an output screen G640-1 has the same screen structure as the input screen G600-1. In FIG. 45, parts that are the same as the ones in FIG. 43 are indicated by the same reference numerals and the explanation thereof will be omitted. In the display area of the output screen G640-1, since "MF-APPARATUS" has been selected, the apparatuses names are displayed in gray and cannot be selected by the user.

In the output screen G640-1, when the user selects the button 63-1 for setting the functions for the output process, the list of the apparatuses, which exist on the network and can conduct the output process, is displayed in the display area 610. When the user selects "MF-APPARATUS", the functions, which can be set for the output process, are displayed in the display area 620.

For example, the display area 620 displays "SORT" for output in a page order for each document set, "STACK" for output for each page, "STAPLE" showing four stapling methods by four icons, "PUNCH" showing two punching methods by two icons, and a like. For example, when the user selects one of four icons showing the four stapling methods, the output setting parameter indicating "SORT" and one of methods of "STAPLE" is generated. The output setting parameter is sent to the MF-apparatus 1200. The image input/output application 1216 of the MF-apparatus 1200 sets the output setting parameter received from the SF-apparatus 100 as the output setting parameter 432. Accordingly, the output control module 420 conducts the output process in respect to the output image data 602 in accordance with the output setting parameter 432 so as to form an image on a sheet as the output image 603 and outputs the output image 603 by the plotter 1321.

Figure 46:
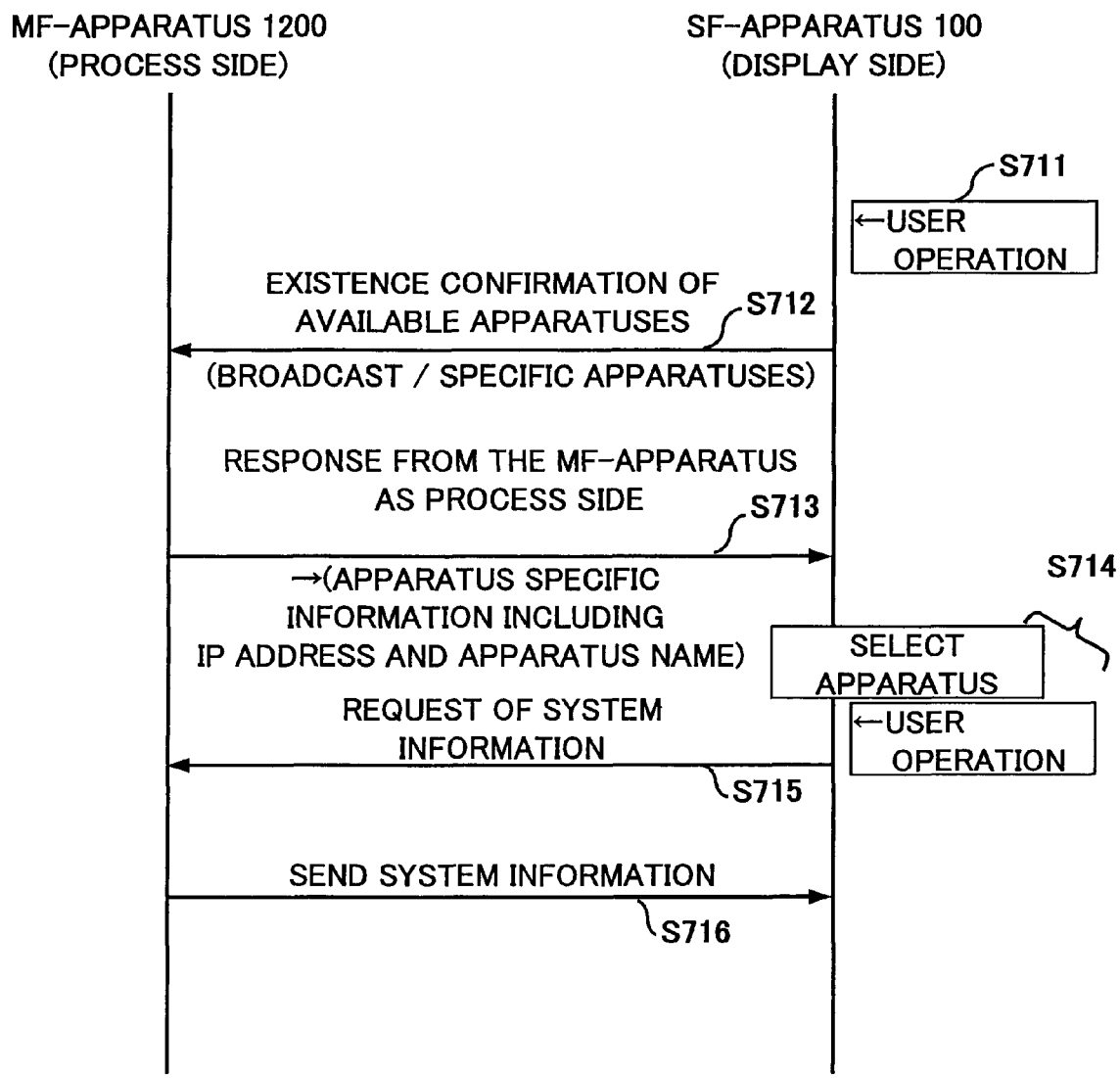
FIG. 46 is a flowchart diagram for explaining the process flow to realize a display of the output screen of the MF-apparatus at the SF-apparatus.

A process flow between the MF-apparatus 1200 and the SF-apparatus 100 in accordance with operations of the user at the input screen G600-1, the image process screen G630-1, and the output screen G640-1 will be described with reference to FIG. 46 and FIG. 47. FIG. 46 is a flowchart diagram for explaining the process flow to realize a display of the output screen of the MF-apparatus at the SF-apparatus.

In FIG. 46, when the input screen G600-1 is displayed at the operation panel of the SF-apparatus 100 (step S711), the SF-apparatus 100 confirms existence of available apparatuses for the output process in respect to all apparatuses connected through the network (step S712). The method for confirming the existence of the available apparatuses can be the same method described in a case of the process flow for realizing the display of the input screen G600 in FIG. 6 in the first embodiment. In response to an existence confirmation from the SF-apparatus 100, the MF-apparatus 1200 existing on the network replies to the SF-apparatus 100 with apparatus specific information including an IP address identifying the MF-apparatus 1200, an apparatus name, and a like (step S713). When the SF-apparatus 100 receives the apparatus specific information from the MF-apparatus 1200 and other apparatuses on the network, the SF-apparatus 100 displays the list of the apparatus names in the display area 610 at the input screen G600-1.

For example, the user selects the MF-apparatus 1200 as an available apparatus from the display area 610 (step S714), the SF-apparatus 100 requests the system information 452 of the MF-apparatus 1200 (step S715). The MF-apparatus 1200 sends the system information 452 to the SF-apparatus 100 by the FTP 3 in response to the request from the SF-apparatus 100 (step S716).

As described above, available apparatuses are displayed in the display area 610 at the input screen G600-1.

Figure 47:
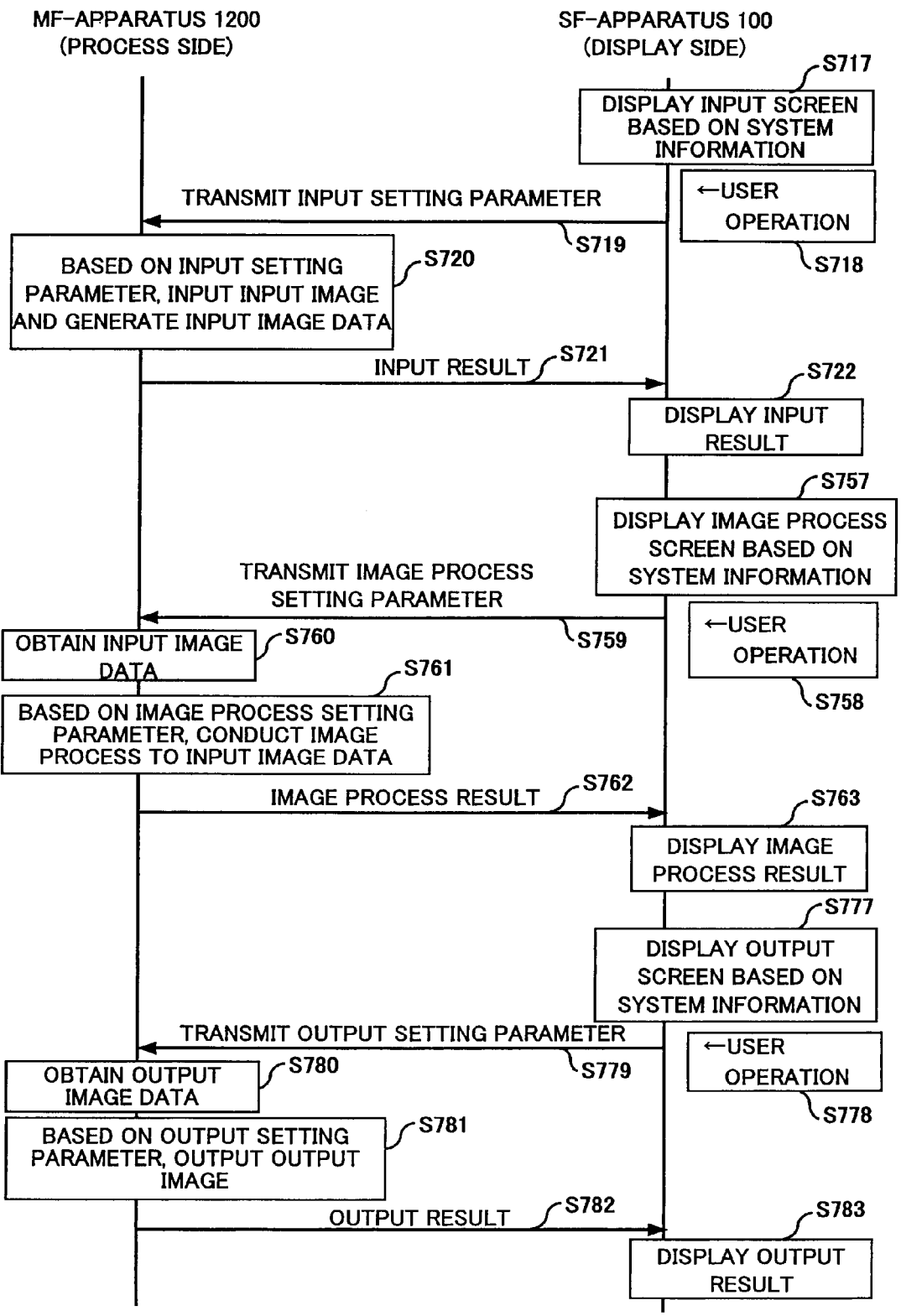
FIG. 47 is a flowchart diagram for explaining the process flow to realize a display of the output screen of the MF-apparatus at the SF-apparatus.

FIG. 47 is a flowchart diagram for explaining the process flow to realize a display of the output screen of the MF-apparatus at the SF-apparatus. In FIG. 47, when the SF-apparatus 100 receives the system information 452 from the MF-apparatus 1200, the SF-apparatus 100 generates input option information and an input screen coordinate parameter based on the system information 452, and displays the functions that the MF-apparatus 1200 can provide, in the display area 620 of the input screen G600 (FIG. 5) displayed at the operation panel of the SF-apparatus 100 by using the input screen coordinate parameter 462 (step S717). From the display area 620 displaying the functions, for example, the user selects "PICTURE", "AUTO DARKNESS", and "ONE SIDE" (step S718), an input UIF 112 (FIG. 48) of the SF-apparatus 100 generates the input setting parameter showing "PICTURE", "AUTO DARKNESS", and "ONE SIDE" corresponding position coordinates thereof, and the input setting parameter is transmitted to the MF-apparatus 1200 (step S719).

The MF-apparatus 1200 sets the input setting parameter 434 received from the SF-apparatus 100 as the input setting parameter 434. Subsequently, the input control module 410 reads in the input image 600 from the scanner 1324 in accordance with the input setting parameter 434, and generates the input image data 601 (step S720).

Since the image input/output application 1216 sets the input setting parameter received from the SF-apparatus 100 as the input setting parameter 434, the input control module 410 can conduct the input process as if the user sets at the operation panel 1310 of the MF-apparatus 1200. When the MF-apparatus 1200 completes the input process, the MF-apparatus 1200 sends an input result to the SF-apparatus 100 (step S721). At the operation panel, the SF-apparatus 100 displays the input result received from the MF-apparatus 1200 at the operation panel (step S722).

Therefore, it is possible for the user to select the desired functions from the list of the functions, which the MF-apparatus 1200 can provide, displayed at the operation panel of the SF-apparatus 100. Also, it is possible to have the MF-apparatus 1200 conduct the input process based on the desired functions of the user. For example, even if the SF-apparatus 100 does not have "PICTURE" function, it is possible for user to have the MF-apparatus 1200 conduct the input process by "PICTURE" function as one of the input setting parameter 434, from the SF-apparatus 100.

Subsequently, when the user select the button 62-1 for setting the functions of the image process, the SF-apparatus 100 generates image process option information and an image process screen coordinate parameter based on the system information 452, and displays the functions that the MF-apparatus 1200 can provide, in the display area 620 of the image process screen G630-1 (FIG. 44) displayed at the operation panel of the SF-apparatus 100 by using the image process screen coordinate parameter (step S757). From the display area 620 displaying the functions, for example, the user selects "ME ELIMINATION", "ACTUAL SIZE", and "DIVIDE" (step S758), an image process UIF of the SF-apparatus 100 generates the image process setting parameter showing "FRAME ELIMINATION", "ACTUAL SIZE", and "DIVIDE" corresponding to position coordinates thereof, and the image process setting parameter is transmitted to the MF-apparatus 1200 (step S759).

The MF-apparatus 1200 obtains the input image data 601 (step S760). When the input process is not conducted by the MF-apparatus 1200, the MF-apparatus 1200 obtains the input image data 601 from the SF-apparatus. The image input/output application 1216 sets the image process setting parameter received from the SF-apparatus 100 as the image process setting parameter 436. The image process module 440 conducts the image process in respect to the input image data 601 in accordance with the image process setting parameter 436 and generates the output image data 602 (step S761).

Since the image input/output application 1216 sets the image process setting parameter received from the SF-apparatus 100 as the image process setting parameter 436, the image process module 440 can conduct the image process as if the user sets at the operation panel 1310 of the MF-apparatus 1200. When the MF-apparatus 1200 completes the image process, the MF-apparatus 1200 sends an image process result to the SF-apparatus 100 (step S762). At the operation panel, the SF-apparatus 100 displays the image process result received from the MF-apparatus 1200 (step S763).

Subsequently, when the user select the button 63-1 for setting the functions of the output process, the SF-apparatus 100 generates output option information and an output screen coordinate parameter based on the system information 452, and displays the functions that the MF-apparatus 1200 provide, in the display area 620 of the input screen G640-1 (FIG. 45) displayed at the operation panel of the SF-apparatus 100 by using the output screen coordinate parameter (step S777). From the display area 620 displaying the functions, for example, the user selects one of four icons corresponding to the four stapling methods (step S778), the output UIF of the SF-apparatus 100 generates the output setting parameter indicating "SORT" and "STAPLE" corresponding to position coordinates thereof, and then the output setting parameter is transmitted to the MF-apparatus 1200 (step S779).

The MF-apparatus 1200 obtains the output image data 602 (step S780). When the output process is not conducted by the MF-apparatus 1200, the MF-apparatus 1200 obtains the output image data 602 from the SF-apparatus 100. The output setting parameter, which is received from the SF-apparatus 100, is set to be the output setting parameter 432. Then, the output control module 420 conducts the output process to the output image data 602 in accordance with the output setting parameter 432 so as to form an image on the sheet as the output image 603 and then outputs the output image 603 (step S781).

Since the output setting parameter received from the SF-apparatus 100 is set as the output setting parameter 432, the output control module 420 can conduct the output process as if the user set at the operation panel 1310 of the MF-apparatus 1200. When the MF-apparatus 1200 completes the output process, the output result is sent to the SF-apparatus 100 (step S682). At the operation panel, the SF-apparatus 100 displays the output result received from the MF-apparatus 1200 (step S683).

In FIG. 46 and FIG. 47, as for the output process, the process flow between the SF-apparatus 100 and the MF-apparatus 1200 is described. Also, the process flow shown in FIG. 37 can be realized between two MF-apparatuses 1200 and between two SF-apparatuses. It is possible for the user to select the desired functions from the list of the functions, which the MF-apparatus 1200 can provide, displayed at the operation panel of the SF-apparatus. Also, it is possible to have the MF-apparatus 1200 conduct the output process based on the desired functions of the user.

Figure 48:
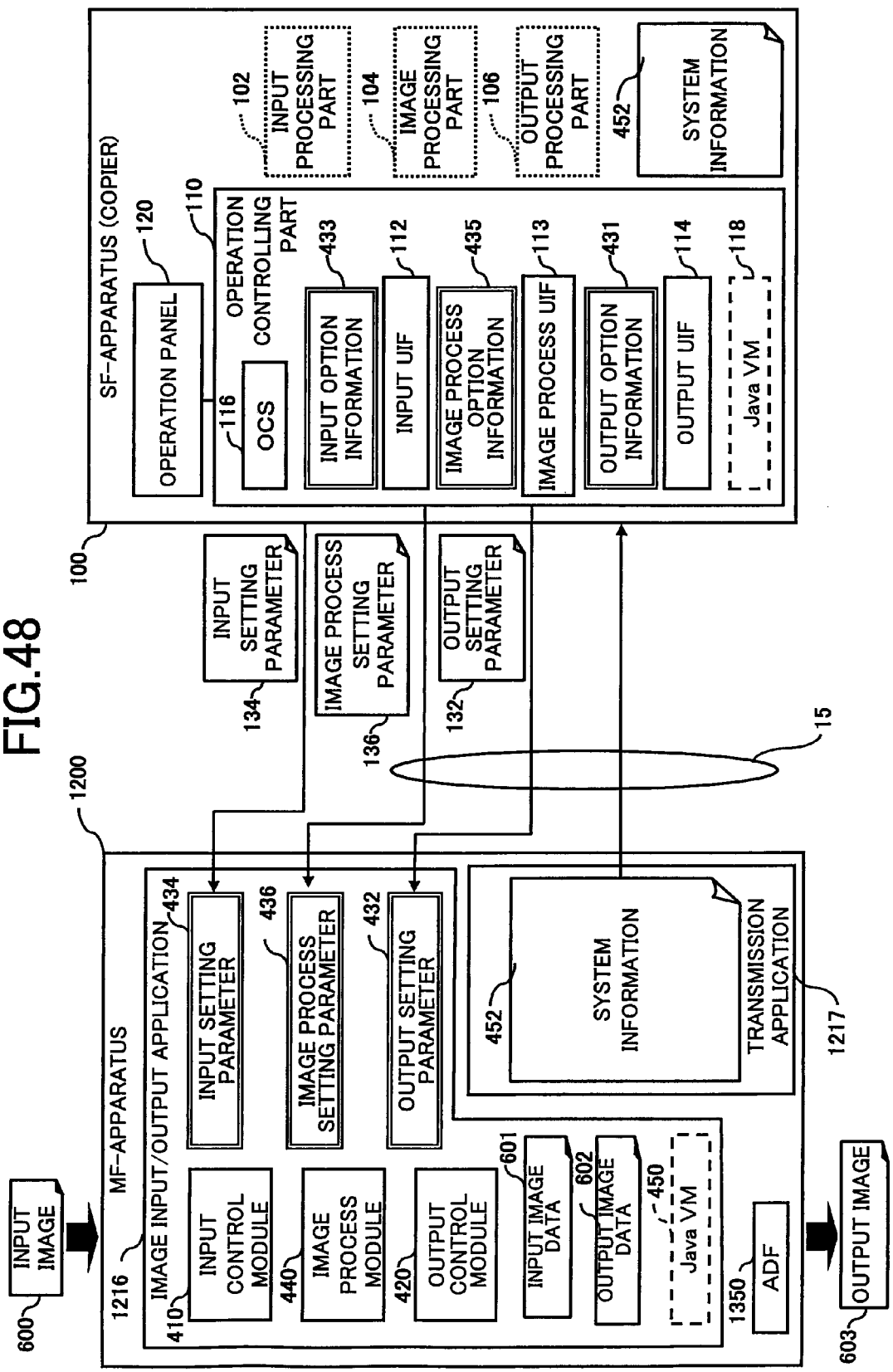
FIG. 48 is a diagram showing an example of the process using the user interface realized by the screens and the process flow described in FIG. 43 through FIG. 47.

An example of the process using the user interface realized by the screens and the process flow described in FIG. 4 through FIG. 8 will be described with reference to FIG. 48, according to the seventh embodiment of the present invention. FIG. 48 is a diagram showing an example of the process using the user interface realized by the screens and the process flow described in FIG. 43 through FIG. 47. For example, an SF-apparatus (single functional image processing apparatus) 100 shown in FIG. 48 is a single copier having only a copying function. For example, the SF-apparatus 100 includes an input processing part 102 for reading in the input image 600 formed on a sheet, an image processing part 104 for conducting the image process to the input image data generated by reading in the input image 600, an output processing part 106 for forming output image data 603, which the image process is conducted to, on the sheet and outputting the sheet as the output image 603, an operation panel 120 operated by the user, and an operation controlling part 110 for controlling a display of the operation panel 120.

Moreover, the operation controlling part 110 includes at least an input UIF 112 for generating the input screen coordinate parameter (not shown) so as to display the input screen G600-1 as shown FIG. 43, an image process UIF 113 for generating the image process screen coordinate parameter (not shown) so as to display the image process screen G630 as shown in FIG. 44, an output UIF 114 for generating the output screen coordinate parameter (not shown) so as to display the output screen G640 as shown in FIG. 45, an OCS 116 for controlling the operation panel 120 based on the screen information provided from each of the input UIF 112, the image process UIF 113, and the output UIF 114, in respect to the operation panel 120.

Furthermore, when each user interface program realizing the input UIF 112, the image process UIF 113, and the output UIF 114 is a Java™ program, the operation controlling part 110 includes a Java™ VM 118. In the SF-apparatus 100, all process parts including the OCS 116, the input UIF 112, the image process UIF 113, and the output UIF 114 can be realized by the Java™ programs. In this case, even if the OCS 116 is not included in the SF-apparatus 100, the SF-apparatus 100 can be compatible to the MF-apparatus 1200.

In FIG. 48, parts shown by dashed lines other than the Java™ VM 450 and the Java™ VM 118 are originally provided in the MF-apparatus 1200 and the SF-apparatus 100 but not used in this example of the process. In addition, parts shown by double lines are replaced with data file sent from the MF-apparatus 1200 or the SF-apparatus 100. In FIG. 48, only the display process is conducted by the SF-apparatus 100, and the input process, the image process, and the output process are conducted by the MF-apparatus 1200.

In FIG. 48, when the user selects the MF-apparatus 1200 as an apparatus for the input process, the image process, and the output process at the operation panel 120 of the SF-apparatus 100, the input UIF 112 originally provided in the SF-apparatus 100 generates the input option information 433 from the system information 452 obtained from the MF-apparatus 1200 and the generates the input screen coordinate parameter (not shown) similar to that of the MF-apparatus 1200 based on the input option information 433. The input UIF 112 displays the functions for the input process that the MF-apparatus 1200 can provide, at the operation panel 120 through the OCS 116 based on the input option information. When the user select the functions, the input UIF 12 generates the input setting parameter 134 indicating the function that is set by the user. The SF-apparatus 100 transmits the input setting parameter 134 to the MF-apparatus 1200.

In the MF-apparatus 1200, the input setting parameter 434 of the image input/output application 1216 is replaced with the input setting parameter 134 received from the SF-apparatus 100. The input image 600 is read in by the input control module 410 and then the input image data 601 is generated in the MF-apparatus 1200.

Similarly, the image process UIF 113 originally provided in the SF-apparatus generates the image process option information 435, which is the same as the MF-apparatus 1200, based on the system information 452. The image process screen of the MF-apparatus 1200 is displayed at the SF-apparatus 100 base on image process option information 435 generated in the SF-apparatus 100. The image process setting parameter 136 is generated so as to indicate the functions for the image process when the user sets the functions from the image process screen. The image process setting parameter 436 of the MF-apparatus 1200 is replaced with the image process setting parameter (not shown) that indicates the functions for the image process set by the user from the image process screen of the MF-apparatus 1200 and is received from the SF-apparatus 100. The image process module 440 generates the output image data 602 based on the image process setting parameter 436.

Similarly, the output UIF 114 originally provided in the SF-apparatus generates the output option information 431, which is the same as the MF-apparatus 1200, based on the system information 452. The output screen of the MF-apparatus 1200 is displayed at the SF-apparatus 100 base on output option information 431 generated in the SF-apparatus 100. The output setting parameter 136 is generated so as to indicate the functions for the output process when the user sets the functions from the output screen. The output setting parameter 432 of the MF-apparatus 1200 is replaced with the output setting parameter (not shown) that indicates the functions for the image process set by the user from the image process screen of the MF-apparatus 1200 and is received from the SF-apparatus 100. The output module 420 outputs the output image data 602 based on the output setting parameter 432.

As described above, it is possible for the user to have the MF-apparatus 1200 conduct all of the input process, the image process, and the output process through the network 15. Alternatively, the image process can be conducted at the SF-apparatus 100. In this case, the SF-apparatus 100 may obtain the input image data 601 from the MF-apparatus 1200, and send the output image data 602 generated after the image process is conducted to the input image data 601, as well as the output setting parameter 132.

In the seventh embodiment, a case in which the MF-apparatus 1200 and the SF-apparatus 100 are connected to each other through the network 15. Alternatively, the present invention can be applied to more than three image processing apparatuses connecting to each other through the network 15.

As described above, in the seventh embodiment, it is possible to input the input image 600 by utilizing an option (the ADF, a both sides ADF, or a like) pertaining to the MF-apparatus 1200 connected to any image processing apparatus through the network 15. For example, by using the MF-apparatus 1200 having the both sides ADF 1350, the user can consecutively input the input image 600 (a plurality of documents) having an image on both sides, and also can output from the SF-apparatus 100 (copier) having only a press board.

Moreover, by using an option (finisher such as a punch or a stapler) pertaining to the MF-apparatus 1200, the user can output the output image 603 at the MF-apparatus 1200 connected to any SF-apparatus 110 through the network 15. For example, by using higher functions by full options, it is possible to output the output image 603 from the copier having a single function or a personal computer (PC). Since the system information 452 is obtained through the network 15, a new user interface is not required for the SF-apparatus 100 at which the user operates. Accordingly, the user can instruct by the same operation under the interface provided by the MF-apparatus 1200 anywhere. Also, when a new function is added to the MF-apparatus 1200 connected to the network 15, even if the SF-apparatus 100 where the user operates, the user can utilize the interface for operating the new function of the MF-apparatus 1200 and operate as if the user uses the MF-apparatus 1200.

Furthermore, if the MF-apparatus 1200 having higher functions exists on the network 15, by sending the input image data 601 to the MF-apparatus 1200 and the output image data 602 to the SF-apparatus 100, even the SF-apparatus 100, which does not have the image process as the higher functions, can realize the same higher functions as the MF-apparatus 1200. In this case, means for providing and setting the higher functions for the image process is not required for the SF-apparatus 100 as an operation side. Accordingly, the user operates in the same way at any SF-apparatus 100.

In the seventh embodiment, on the network 15, only the plotter 1321 of the MF-apparatus 1200 as an output option, the scanner 1324 of the MF-apparatus 1200 as an input option, and the SF-apparatus 100 (copier) as the input option and the output option are provided, but a plurality of the input options and the output options can be provided. All options, for example, the apparatuses connected through the network 15 and a scanner, a printer, a copier, and a like can be shared as the functions. Also, as an output, it is not limited to printing on the sheet, but as an electronic data, output data can be stored to a server for managing a document. Also, the input side can be a document management server for managing the electronic data, instead of the paper sheet. As described above, by storing as a document, an existing image data can be utilized. Accordingly, data frequently used by the user are simply maintained on the network 15, it is possible to utilize the data in many output methods by various options.

The present invention is not limited to the specifically disclosed embodiments; and variations and modifications may be made without departing from the scope of the present invention.

The present application is based on the Japanese priority applications No. 2001-249279 filed on Aug. 20, 2001, No. 2001-344977 filed on Nov. 9, 2001, No. 2002-236657 filed on Aug. 14, 2002, No. 2002-236658 filed on Aug. 14, 2002, No. 2002-236659 filed on Aug. 14, 2002, and No. 2002-236660 filed on Aug. 14, 2002, entire contents of which are hereby incorporated by reference.

What is claimed is:

1. An image forming apparatus, comprising:
   a system information obtaining part obtaining system information identifying which hardware resources of the image forming apparatus that are available to be configured, the system information corresponding to a plurality of function options available to be selectively set for a predetermined process conducted by said hardware resources;
   a transmitting part transmitting said system information in response to an request from a second apparatus that is connected through a network;
   an input part displaying a screen providing input options generated based on the system information and receiving user selections from the screen as input parameters;
   a process controlling part controlling said predetermined process of said hardware resources based on the input parameters while no setting parameter has been received and based on the setting parameter in response to receiving, from the second apparatus, the setting parameter indicating a selected function option of the plurality of the function options that the second apparatus displays based on said system information; and
   a screen generating part generating screen information for displaying on the second apparatus the plurality of the function options based on said system information showing the plurality of the function options available for the predetermined process.

2. The image forming apparatus as claimed in claim 1, comprising:

an application including a screen generating part and said process controlling part;
a control service managing the hardware resource and controlling to utilize the hardware resource in response to a utilization request from said application; and
an operating system controlling the application and the control service,
wherein the predetermined process is a process concerning an image form.

3. The image forming apparatus as claimed in claim 1, comprising:
a responding part responding by supplying apparatus specific information including an apparatus address identifying said image forming apparatus on the network and an apparatus name in response to a request confirming whether or not the predetermined process is available, from the second apparatus.

4. The image forming apparatus as claimed in claim 1, comprising at least one of:
an input screen generating part generating input option information showing the plurality of the input function options concerning an input process for an image from the system information, and generating input screen information for displaying a plurality of function options based on the input option information;
an image process screen generating part generating image process option information showing the plurality of the image process function options concerning an image process for the image from the system information, and generating image process screen information for displaying a plurality of function options based on the image process information; and
an output process screen generating part generating output option information showing the plurality of the output function options concerning an output process for the image from the system information, and generating output screen information for displaying a plurality of function options based on the output option information.

5. The image forming apparatus as clamed in claim 1, comprising at least one of:
an input controlling part controlling an input process for an image and generating input image data;
an image process controlling part conducting an image process for the input image data and generating image output data to be output; and
an output controlling part controlling the output process for forming and outputting the image on a medium based on the image output data,
as said process controlling part.

6. The image forming apparatus as claimed in claim 5, wherein said input controlling part controls a scanner as said hardware resource to conduct said input process.

7. The image forming apparatus as claimed in claim 5, wherein said output controlling part controls a plotter as said hardware resource to conduct said output process.

8. An image forming apparatus, comprising:
a screen generating part generating and displaying first screen information including a plurality of first function options based on first option information and showing options available for a first predetermined process;
a replacing part replacing said first screen information with second screen information including a plurality of second function options available for a selected apparatus, wherein said second screen information is generated based on system information concerning hardware resources of the selected apparatus available to be configured and said second screen information is sent from the selected apparatus via a network; and
a process requesting part requesting said selected apparatus to conduct a second predetermined process by sending a setting parameter indicating at least one set second function option of the plurality of the second function options displayed based on the second screen information,
wherein the selected apparatus interrupts a local process selected from a screen providing input options generated based on the system information to conduct the second predetermined process in response to receiving the setting parameter sent by the processing requesting part.

9. The image forming apparatus as claimed in claim 8, comprising at least one of:
an input screen generating part generating, as the first screen information, an input screen information for displaying a plurality of input function options based on input option information showing the plurality of the input function options concerning an input process for an image, said input option information selected from said system information;
an image process screen generating part generating, as the first screen information, an image process screen information for displaying a plurality of image process function options based on image process option information showing the plurality of image process function options concerning an image process for the image, said image process option information selected from said system information; and
an output process screen generating part generating, as the first screen information, an output screen information for displaying a plurality of output function options based on output option information showing the plurality of output function options concerning an output process for the image, said output option information selected from said system information,
as said screen generating part.

10. The image forming apparatus as claimed in claim 8, comprising at least one of:
an input process requesting part requesting said apparatus to conduct the input process by sending input setting parameter showing at least one input function option that is set by the user from the plurality of the input function options available for the input process by said apparatus;
an image process requesting part requesting said apparatus to conduct the image process by sending image process setting parameter showing at least one image process function option set by the user from the plurality of the image process function options available for the image process by said apparatus; and
an output process requesting part requesting said apparatus to conduct the output process by sending output setting parameter showing at least one output function option set by the user from the plurality of the output function options available for the output process by said apparatus,
as said process requesting part.

11. An image forming method, comprising the steps of:
(a) obtaining system information identifying which hardware resources of an image forming apparatus that are available to be configured, the system information corresponding to a plurality of function options available to be selectively set for a predetermined process conducted by said hardware resources;

(b) transmitting said system information in response to a request from a second apparatus that is connected through a network;
(c) displaying a screen providing input options generated based on the system information;
(d) receiving user selections from the screen as input parameters;
(e) controlling said predetermined process of said hardware resources based on the input parameters while no setting parameter has been received and based on the setting parameter in response to receiving, from the second apparatus, the setting parameter indicating a selected function option of the plurality of the function options that the second apparatus displays based on said system information; and
(f) generating, at the image forming apparatus, screen information for displaying on the second apparatus the plurality of the function options based on said system information showing the plurality of the function options available for the predetermined process.

12. An image forming method, comprising the steps of:
(a) generating and displaying first screen information including a plurality of first function options based on first option information and showing options available for a first predetermined process;
(b) replacing said first screen information with second screen information including a plurality of second function options available for a selected apparatus, wherein said second screen information is generated based on system information concerning hardware resources of the selected apparatus available to be configured and said second screen information is sent from the selected apparatus via a network;
(c) requesting said selected apparatus to conduct a second predetermined process by sending a setting parameter indicating at least one set second function option of the plurality of the second function options displayed based on the second screen information; and
(d) interrupting, at the selected apparatus, a local process selected from a screen providing input options generated based on the system information, to conduct the second predetermined process in response to receiving the setting parameter.

* * * * *